(12) United States Patent
Gilge et al.

(10) Patent No.: US 12,617,461 B2
(45) Date of Patent: May 5, 2026

(54) REAR STEER KNUCKLES FOR OFF-ROAD VEHICLES

(71) Applicant: Arctic Cat Inc., Thief River Falls, MN (US)

(72) Inventors: Brent Thomas Gilge, Thief River Falls, MN (US); Todd Ethan MacDonald, Balderson (CA)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 19/082,924

(22) Filed: Mar. 18, 2025

(65) Prior Publication Data

US 2025/0304161 A1     Oct. 2, 2025

Related U.S. Application Data

(60) Provisional application No. 63/572,137, filed on Mar. 29, 2024, provisional application No. 63/572,125, filed on Mar. 29, 2024.

(51) Int. Cl.
  B62D 7/18       (2006.01)
  B60G 7/00       (2006.01)
  B62D 7/20       (2006.01)

(52) U.S. Cl.
  CPC .............. B62D 7/18 (2013.01); B60G 7/001 (2013.01); B62D 7/20 (2013.01)

(58) Field of Classification Search
  CPC .... B60G 2200/144; B60G 7/001; B62D 7/18; B62D 7/20
  See application file for complete search history.

(56) References Cited

U.S. PATENT DOCUMENTS

| | | | | |
|---|---|---|---|---|
| 5,327,989 | A * | 7/1994 | Furuhashi | B62D 21/183 180/908 |
| 6,460,907 | B2 * | 10/2002 | Usui | B62J 27/30 296/205 |
| 7,717,221 | B2 * | 5/2010 | Anderson | B60G 3/20 180/335 |
| 7,819,220 | B2 * | 10/2010 | Sunsdahl | B60N 2/01 180/312 |
| 8,075,007 | B2 | 12/2011 | Brady et al. | |
| 8,430,413 | B2 | 4/2013 | Kuwabara | |
| 8,444,160 | B2 | 5/2013 | Okamoto et al. | |

(Continued)

FOREIGN PATENT DOCUMENTS

| | | |
|---|---|---|
| CN | 210391299 U | 4/2020 |
| FR | 2712553 A1 | 5/1995 |

*Primary Examiner* — Paul N Dickson
*Assistant Examiner* — Shams Dhanani
(74) *Attorney, Agent, or Firm* — Billion & Armitage

(57) ABSTRACT

A steering and suspension system for an off-road vehicle includes a steering rack assembly and a tie rod, the inboard end of the tie rod coupled to the steering rack assembly. The steering and suspension system includes a knuckle having a top side defining an upper control arm connector arm and an aft side defining a tie rod connector arm, the tie rod connector arm having a distal end coupled to the outboard end of the tie rod. The steering and suspension system also includes an upper control arm having an outboard end coupled to the upper control arm connector arm. The distal end of the tie rod connector arm is positioned such that the tie rod has substantially the same elevation as the upper control arm.

20 Claims, 35 Drawing Sheets

(56) References Cited

U.S. PATENT DOCUMENTS

| | | | |
|---|---|---|---|
| 8,967,318 B2 | 3/2015 | Kuwabara et al. | |
| 8,997,908 B2 | 4/2015 | Kinsman et al. | |
| 9,334,144 B2 | 5/2016 | Upah et al. | |
| 9,586,613 B2 * | 3/2017 | Shinbori | B60G 7/001 |
| 9,587,689 B2 | 3/2017 | Pongo et al. | |
| 9,988,089 B2 | 6/2018 | Nakamoto et al. | |
| 10,000,364 B2 * | 6/2018 | Shiokawa | B66D 1/28 |
| 10,160,497 B2 * | 12/2018 | Wimpfheimer | B60G 3/20 |
| 10,246,153 B2 * | 4/2019 | Deckard | B60G 3/202 |
| 10,336,372 B1 * | 7/2019 | Upah | B62D 23/005 |
| 10,369,861 B2 * | 8/2019 | Deckard | B62D 33/0625 |
| 10,442,458 B2 * | 10/2019 | Heon | B62D 3/12 |
| 10,479,408 B2 * | 11/2019 | Upah | B62D 23/005 |
| 10,525,781 B2 * | 1/2020 | Upah | B60K 17/30 |
| 10,532,772 B2 * | 1/2020 | Upah | B62D 21/183 |
| 10,668,781 B2 * | 6/2020 | Yu | F16C 11/00 |
| 10,730,544 B2 | 8/2020 | Heon et al. | |
| 10,793,181 B2 * | 10/2020 | Bennett | B62D 21/183 |
| 10,821,794 B2 * | 11/2020 | Nakashima | B60G 3/20 |
| 10,899,590 B2 * | 1/2021 | Kukula | B66D 1/00 |
| 10,940,886 B2 * | 3/2021 | Gordon | B62D 27/023 |
| 10,946,736 B2 * | 3/2021 | Fischer | B60K 17/34 |
| 10,994,645 B2 * | 5/2021 | Deckard | B60J 5/0487 |
| 11,014,419 B2 * | 5/2021 | Danielson | B60N 3/04 |
| 11,027,779 B2 * | 6/2021 | Takakuwa | B62D 21/11 |
| 11,161,544 B2 * | 11/2021 | De Grammont | B62D 7/142 |
| 11,192,414 B1 * | 12/2021 | Berardi | B62K 25/24 |
| 11,491,836 B2 * | 11/2022 | Li | B60G 7/04 |
| 11,572,118 B2 * | 2/2023 | Holroyd | B62K 5/08 |
| 11,584,435 B2 | 2/2023 | Gordon | |
| 11,624,435 B2 * | 4/2023 | Hollman | B62D 21/09 |
| | | | 180/377 |
| 11,643,035 B2 * | 5/2023 | Kotrla | B60R 19/48 |
| | | | 293/117 |

| | | | |
|---|---|---|---|
| 2001/0028156 A1 * | 10/2001 | Handa | B60G 3/20 |
| | | | 280/124.135 |
| 2003/0081989 A1 * | 5/2003 | Kondoh | F16C 11/0671 |
| | | | 403/135 |
| 2004/0258462 A1 * | 12/2004 | Budde | F16C 11/0633 |
| | | | 403/135 |
| 2007/0140783 A1 * | 6/2007 | O' Bryan | F16C 11/0638 |
| | | | 403/122 |
| 2007/0187917 A1 * | 8/2007 | Hasegawa | B60G 7/008 |
| | | | 280/93.502 |
| 2011/0150563 A1 * | 6/2011 | Kuroda | F16C 11/0685 |
| | | | 29/527.1 |
| 2012/0018973 A1 * | 1/2012 | Fujii | B60G 3/20 |
| | | | 280/124.134 |
| 2012/0049477 A1 * | 3/2012 | Webster | B22D 18/04 |
| | | | 164/63 |
| 2014/0224561 A1 * | 8/2014 | Shinbori | B60G 7/001 |
| | | | 180/253 |
| 2015/0183286 A1 * | 7/2015 | Bruehl | B62D 7/18 |
| | | | 280/124.135 |
| 2015/0259011 A1 * | 9/2015 | Deckard | B60N 2/24 |
| | | | 280/781 |
| 2017/0136874 A1 * | 5/2017 | Harris | B60G 3/207 |
| 2019/0048922 A1 * | 2/2019 | Sugg | F16C 11/06 |
| 2019/0277334 A1 * | 9/2019 | Sugg | F16C 11/0657 |
| 2020/0010114 A1 * | 1/2020 | Gordon | B60G 3/20 |
| 2020/0180377 A1 * | 6/2020 | Kwon | F16C 11/0685 |
| 2021/0086575 A1 * | 3/2021 | Jeong | B29C 45/14 |
| 2021/0276383 A1 * | 9/2021 | Gordon | B60G 3/20 |
| 2021/0323400 A1 * | 10/2021 | Homme, Jr. | B60G 3/20 |
| 2023/0060485 A1 * | 3/2023 | Chila | F16C 11/0647 |
| 2023/0060865 A1 * | 3/2023 | Couture | B62D 55/104 |
| 2023/0191901 A1 * | 6/2023 | Rao | F02M 35/10013 |
| | | | 180/68.3 |
| 2024/0199118 A1 * | 6/2024 | Sun | B60G 11/08 |

* cited by examiner

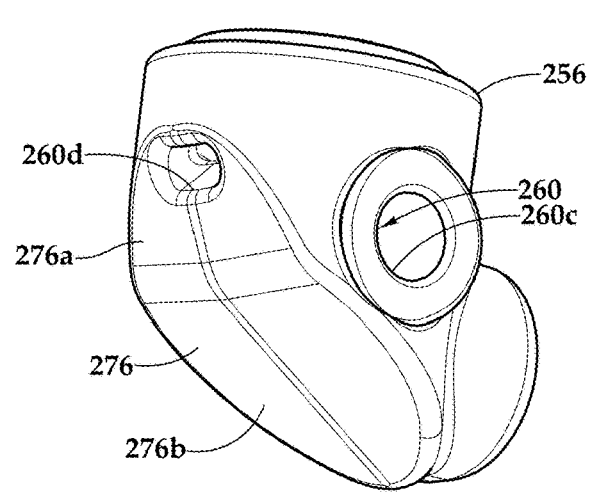
*Fig.8A*
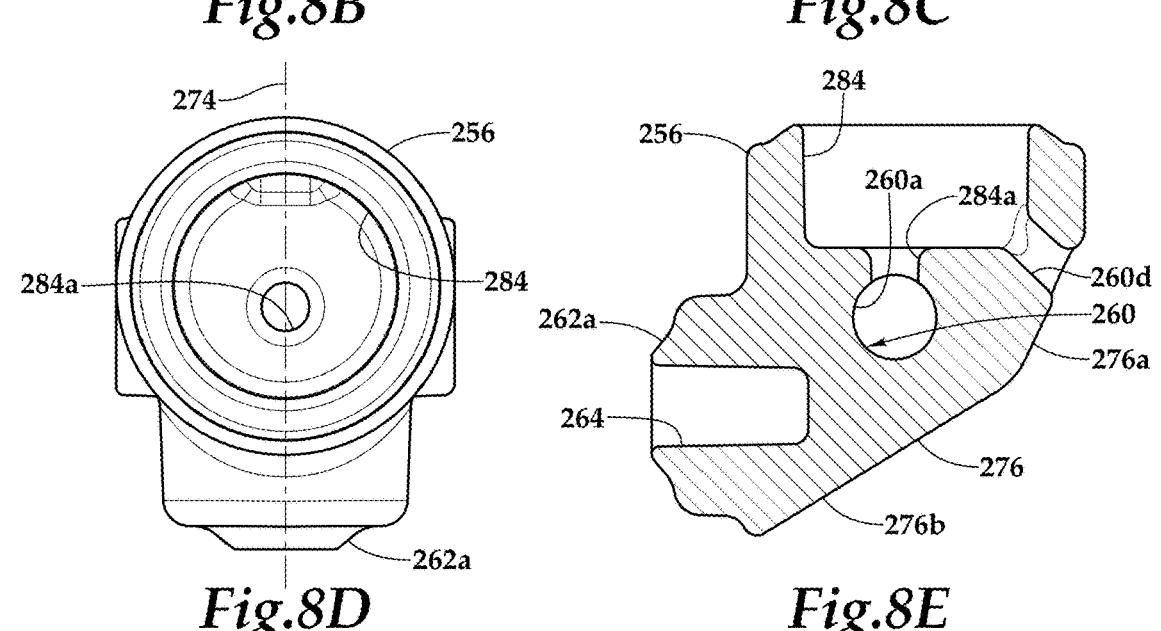
*Fig.8B*          *Fig.8C*
*Fig.8D*          *Fig.8E*

REAR STEER KNUCKLES FOR OFF-ROAD VEHICLES

CROSS-REFERENCE TO RELATED APPLICATIONS

The present application claims the benefit of U.S. Provisional Application No. 63/572,125, filed Mar. 29, 2024 and U.S. Provisional Application No. 63/572,137, filed Mar. 29, 2024, the entire contents of each are hereby incorporated by reference.

TECHNICAL FIELD OF THE DISCLOSURE

The present disclosure relates, in general, to steering systems for off-road vehicles and in particular, to front knuckles coupled to the steering system of an off-road vehicle, each knuckle defining a tie rod connector arm protruding from the aft side of the knuckle, the distal end of the tie rod connector arm coupled to the outboard end of the tie rod to elevate the tie rod in a rear steer configuration.

BACKGROUND

Off-road vehicles are popular land vehicles used to transport people, cargo and accessories. Off-road vehicles include all-terrain vehicles (ATV), light utility vehicles (LUV), side-by-side vehicles (SxS), utility-terrain vehicles (UTV), recreational off-highway vehicles (ROV) and multipurpose off-highway utility vehicles (MOHUV), to name a few. Certain off-road vehicles are primarily designed for utility applications and may offer high ground clearance, low gear ratios for towing, racks for hauling large loads, large cargo boxes and/or high payload capacity. Other off-road vehicles are primarily designed for recreational or sport applications and may offer high performance engines as well as safety features including rollover protection, hard tops, windshields and/or cab enclosure features such as body panels that restrict occupant egress in the event of a rollover. While some off-road vehicles have handlebar steering and motorcycle-style straddle seating, many off-road vehicles utilize automobile-style controls such as a steering wheel and foot pedals, and have side-by-side seating for the occupants. Off-road vehicles commonly have front and/or rear suspensions including shock absorbers that damp vibrations and reduce the rocking and swaying experience of the occupants making such off-road vehicles suitable for travel over a diversity of terrains, in various conditions and at an array of speeds.

The various systems of off-road vehicles are supported by a frame assembly, which includes a forward frame assembly at the front of the off-road vehicle, a middle frame assembly at least partially defining an occupant seating area and an aft frame assembly at the rear of the off-road vehicle. The forward frame assembly provides structural support for systems positioned at the front of the off-road vehicle such as the front suspension, the steering system and certain drivetrain components, each of which may be coupled to the forward frame assembly. Current front suspension systems utilize left and right shock absorbers positioned at a shallow orientation angle relative to a horizontal reference plane, thereby decreasing leverage on the spring and failing to take full advantage of the spring rate of the shock absorbers. At a shallow orientation angle, the front suspension may require stiffer and heavier shock absorbers, adding to the weight and expense of the vehicle. Current front suspension systems may also have kingpin axes that fail to provide adequate stability for the off-road vehicle for a wide range of tire sizes.

One accessory often located on the front end of an off-road vehicle is a winch assembly, which includes a winch and a fairlead to guide the winch cable. Winches installed on current off-road vehicles are integrated with the front bumper. For example, winches have been installed forward of the forward frame assembly and behind the front bumper such that the winch is sandwiched between the front bumper and the forward frame assembly and the fairlead is coupled to the front side of the front bumper. Additional components including a winch bracket are required to support the winch between the front bumper and the forward frame assembly, increasing the cost of parts for installation. In this existing configuration, the winch cannot be accessed for maintenance or replacement without removing numerous components on the front end of the off-road vehicle including the front bumper and winch bracket, resulting in additional installation time and labor costs. Also, replacing or repairing damage to the front bumper requires certain components of the winch assembly to be removed or replaced. In another current implementation, removable subframes have been fastened to the forward frame assembly and used to support a winch assembly, resulting in less desirable positioning and weaker structural support for the winch. Currently, winches are mounted such that the bolts retaining the winch are loaded in tension when the winch is in use, which contravenes the recommendations of certain winch manufacturers specifying that winch retaining bolts should be loaded in the shear direction.

The lower front end of the forward frame assembly may be particularly susceptible to damage as the off-road vehicle encounters debris while traveling. In current off-road vehicles, damage to the lower front end of the forward frame assembly may require costly replacement of some or all of the large tubular frame members forming the forward frame assembly. In addition, the lower front end of the forward frame assembly on current off-road vehicles provides limited or no accessory mounting options for vehicle accessories such as plows or protector plates, and may also fail to provide adequate spacing for front end components such as the winch or front gear case. In steering systems for current off-road vehicles, the tie rods connecting the steering rack assembly to the knuckles may be vulnerable to damage by oncoming debris due to placement of the tie rods forward of the knuckles and/or at a low elevation relative to the ground. Furthermore, the tie rods used in many current steering systems are connected to the knuckles with a tapered joint that provides no fail-safe mechanism for ensuring steering integrity in the event of a joint failure. The current positioning of tie rods on off-road vehicles may also limit the amount of space allowed for other components supported by the forward frame assembly. Current off-road vehicles may also fail to adequately protect the joints between the control arms and knuckles when the front suspension is in a vertically lower dropout position, and current attempts to do so may limit the pivoting range of motion of the knuckles in a normal riding and compressed position of the front suspension.

Rotational energy is provided to the wheels of an off-road vehicle using half shafts emanating from the front and rear drive units, or differentials, of the drivetrain. Drivetrains for off-road vehicles currently use front half shafts that are smaller and/or differently dimensioned than the rear half shafts. For example, the front half shafts may have a different length, shaft diameter or spline diameter than the rear half shafts. Using two or more differently dimensioned half shafts in the off-road vehicle results in a higher number of different parts for the off-road vehicle and nonuniform strength characteristics for the front half shafts versus the rear half shafts. Accordingly, a need has arisen for improved forward frame assemblies, suspension systems, steering systems and drivetrains that address these and other drawbacks of current off-road vehicles.

SUMMARY

In a first aspect, the present disclosure is directed to a steering and suspension system for an off-road vehicle. The steering and suspension system includes a steering rack assembly and a tie rod, the inboard end of the tie rod coupled to the steering rack assembly. The steering and suspension system includes a knuckle having a top side defining an upper control arm connector arm and an aft side defining a tie rod connector arm, the tie rod connector arm having a distal end coupled to the outboard end of the tie rod. The steering and suspension system also includes an upper control arm having an outboard end coupled to the upper control arm connector arm. The distal end of the tie rod connector arm is positioned such that the tie rod has substantially the same elevation as the upper control arm.

In some embodiments, the knuckle may have a bottom side defining a lower control arm connector arm, the tie rod connector arm positioned closer to the upper control arm connector arm than the lower control arm connector arm. In certain embodiments, the knuckle may include a support webbing between the upper control arm connector arm and the tie rod connector arm shaped to provide structural support to the tie rod connector arm. In some embodiments, the distal end of the tie rod connector arm may be positioned such that the tie rod is substantially parallel with the upper control arm. In certain embodiments, the distal end of the tie rod connector arm may be positioned such that the inboard end of the tie rod has a higher elevation than the outboard end of the tie rod to form a first slope and an inboard end of the upper control arm may have a higher elevation than the outboard end of the upper control arm to form a second slope. In such embodiments, the first slope may be substantially equal to the second slope. In some embodiments, the tie rod connector arm may include a proximal segment protruding in an upward and aft direction and a distal segment protruding in an inboard direction. In certain embodiments, the tie rod connector arm may include an intermediate twisting segment between the proximal and distal segments of the tie rod connector arm.

In some embodiments, the distal end of the tie rod connector arm may define a clevis including a top prong and a bottom prong. In certain embodiments, the steering and suspension system may include a bolt having a top end coupled to the top prong of the clevis and a bottom end coupled to the bottom prong of the clevis. In some embodiments, the outboard end of the tie rod may be coupled to the clevis defined by the distal end of the tie rod connector arm via a spherical joint including a ball swivel and an annular casing, the ball swivel secured between the prongs of the clevis by the bolt, the annular casing defined by the outboard end of the tie rod. In certain embodiments, the upper control arm connector arm may have a distal end defining a clevis, and the clevis defined by the distal end of the tie rod connector arm may have substantially the same elevation as the clevis defined by the distal end of the upper control arm connector arm. In some embodiments, the upper control arm may be an A-arm.

In a second aspect, the present disclosure is directed to an off-road vehicle having a frame assembly including a front frame assembly. The off-road vehicle includes a steering and suspension system supported by the front frame assembly. The steering and suspension system includes a steering rack assembly and a tie rod, the inboard end of the tie rod coupled to the steering rack assembly. The steering and suspension system includes a knuckle having a top side defining an upper control arm connector arm and an aft side defining a tie rod connector arm, the tie rod connector arm having a distal end coupled to the outboard end of the tie rod. The steering and suspension system also includes an upper control arm having an outboard end coupled to the upper control arm connector arm. The distal end of the tie rod connector arm is positioned such that the tie rod has substantially the same elevation as the upper control arm.

In some embodiments, the knuckle may include a center annulus defining a center hub aperture, the distal end of the tie rod connector arm positioned aft of the center annulus. In certain embodiments, the distal end of the tie rod connector arm may have a higher elevation than the center annulus. In some embodiments, the tie rod connector arm may protrude from an upper aft diagonal corner of the center annulus. In certain embodiments, the tie rod connector arm may protrude from an aft surface of the center annulus and the distal end of the tie rod connector arm may define a clevis including prongs pointing in an inboard direction. In such embodiments, the tie rod connector arm may have a curved profile twisting substantially ninety degrees from the aft surface of the center annulus to the inboard direction of the prongs. In some embodiments, the off-road vehicle may include a half shaft, the center hub aperture receiving the outboard end of the half shaft. In certain embodiments, the distal end of the tie rod connector arm may be positioned such that the inboard end of the tie rod has a higher elevation than the outboard end of the tie rod to form a first slope, and the inboard end of the half shaft may have a higher elevation than the outboard end of the half shaft to form a second slope. In such embodiments, the first slope may be substantially equal to the second slope. In some embodiments, the distal end of the tie rod connector arm may have a higher elevation than the outboard end of the half shaft.

In a third aspect, the present disclosure is directed to a suspension system for an off-road vehicle, the suspension system moveable between various vertical positions including a compressed position and a dropout position. The suspension system includes a knuckle having a pivoting range of motion between various positions in the dropout position of the suspension system including a forward position and an aft position. The knuckle defines a control arm connector arm including a clevis having a leading prong and a trailing prong. The suspension system also includes a control arm having an outboard end coupled to the control arm connector arm via a spherical joint interposed between the leading and trailing prongs of the clevis. The outboard end of the control arm includes a leading steering stop and a trailing steering stop. The leading steering stop contacts the leading prong in the forward position of the knuckle and the trailing steering stop contacts the trailing prong in the aft position of the knuckle, thereby limiting the pivoting range of motion of the knuckle in the dropout position of the suspension system.

In some embodiments, the outboard end of the control arm may include a leading ramp configured to receive the leading prong of the clevis in the forward position of the knuckle and a trailing ramp configured to receive the trailing prong of the clevis in the aft position of the knuckle, thereby increasing the pivoting range of motion of the knuckle. In certain embodiments, the leading ramp and the trailing ramp may each define an outboard-facing surface. In such embodiments, the leading steering stop may be positioned on the outboard-facing surface of the leading ramp and the trailing steering stop may be positioned on the outboard-facing surface of the trailing ramp. In some embodiments, the outboard end of the control arm may include an annular casing. In such embodiments, the leading ramp may be forward of the annular casing and the trailing ramp may be aft of the annular casing. In certain embodiments, the leading ramp may taper away from the annular casing in a forward direction such that the leading steering stop protrudes in a forward and outboard direction and the trailing ramp may taper away from the annular casing in an aft direction such that the trailing steering stop protrudes in an aft and outboard direction. In some embodiments, the outboard end of the control arm may include a knuckle fitting including the leading and trailing steering stops. In certain embodiments, the leading and trailing steering stops may be integral with the knuckle fitting.

In some embodiments, the outboard end of the control arm may include a vertically-oriented annular casing. In such embodiments, the leading steering stop may be forward of the annular casing and the trailing steering stop may be aft of the annular casing. In certain embodiments, the annular casing may be substantially aligned along a bisecting centerline of the control arm. In some embodiments, the spherical joint may include a ball swivel and an annular casing. In such embodiments, the suspension system may include a bolt having a leading end coupled to the leading prong of the clevis and a trailing end coupled to the trailing prong of the clevis, the bolt securing the ball swivel of the spherical joint. In certain embodiments, the outboard end of the control arm may include the annular casing of the spherical joint, the annular casing receiving the ball swivel of the spherical joint. In some embodiments, the annular casing may be a vertically-oriented annular casing defining an aperture, the annular casing formed about an axis passing through the aperture. In such embodiments, the axis may be substantially parallel with a longitudinal dimension of the off-road vehicle. In certain embodiments, the leading and trailing steering stops may be inboard of the spherical joint. In some embodiments, the leading and trailing steering stops may each include an elastomeric outer coating. In certain embodiments, the forward position of the knuckle, in which the leading steering stop contacts the leading prong, may be a forwardmost position of the knuckle in the dropout position of the suspension system, and the aft position of the knuckle, in which the trailing steering stop contacts the trailing prong, may be an aftmost position of the knuckle in the dropout position of the suspension system. In some embodiments, the suspension system may include a shock absorber compressible between various positions including a fully extended position. In such embodiments, the suspension system may be in the dropout position in the fully extended position of the shock absorber.

In a fourth aspect, the present disclosure is directed to an off-road vehicle having a frame assembly including a forward frame assembly. The off-road vehicle also includes a suspension system coupled to the forward frame assembly. The suspension system is moveable between various vertical positions including a compressed position and a dropout position. The suspension system includes a knuckle having a pivoting range of motion between various positions in the dropout position of the suspension system including a forward position and an aft position. The knuckle defines a control arm connector arm including a clevis having a leading prong and a trailing prong. The suspension system also includes a control arm having an inboard end pivotably coupled to the forward frame assembly and an outboard end coupled to the control arm connector arm via a spherical joint interposed between the leading and trailing prongs of the clevis. The outboard end of the control arm includes a leading steering stop and a trailing steering stop. The leading steering stop contacts the leading prong in the forward position of the knuckle and the trailing steering stop contacts the trailing prong in the aft position of the knuckle, thereby limiting the pivoting range of motion of the knuckle in the dropout position of the suspension system.

In some embodiments, the control arm may be an A-arm. In certain embodiments, the control arm may be a lower control arm and the suspension system may include an upper control arm having an inboard end pivotably coupled to the forward frame assembly and an outboard end coupled to the knuckle. In some embodiments, the suspension system may include a shock absorber having a top end coupled to the forward frame assembly and a bottom end coupled to the upper control arm.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 8A-8E are various views of an elbow joint for a forward frame assembly of an off-road vehicle in accordance with embodiments of the present disclosure;

DETAILED DESCRIPTION

Figure 1A:
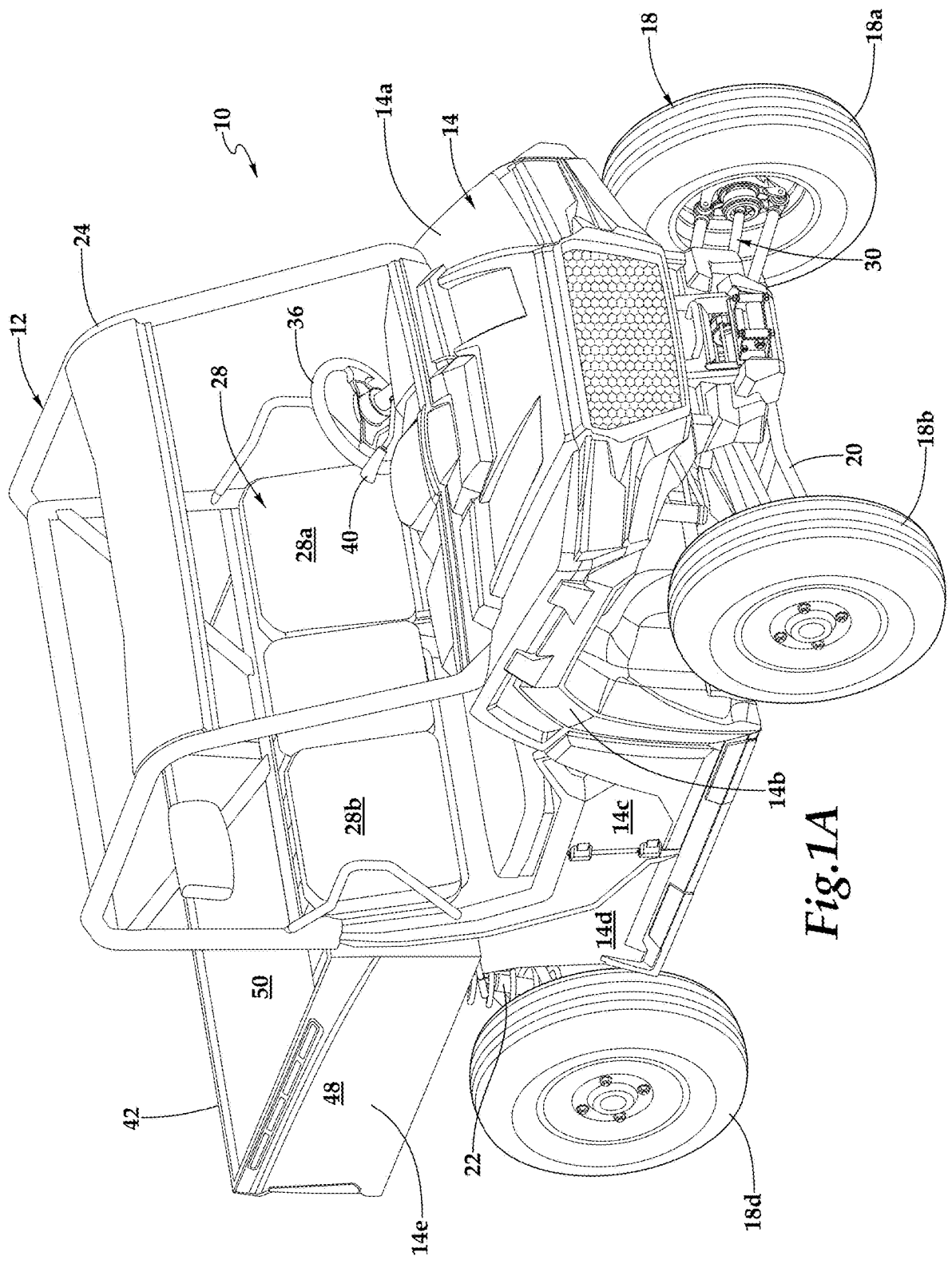
FIGS. 1A-1E are schematic illustrations of an off-road vehicle in accordance with embodiments of the present disclosure.
Figure 1B:
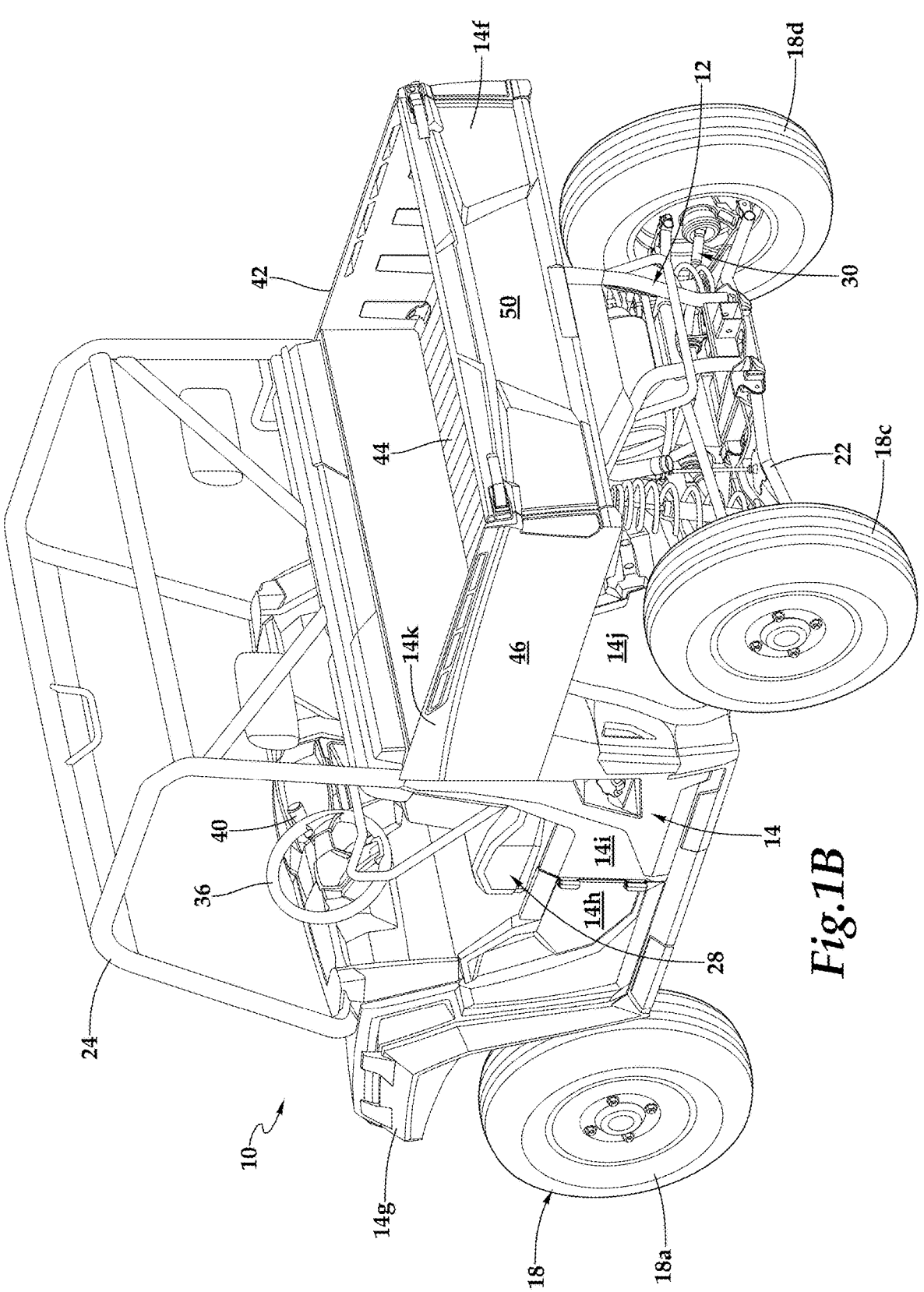

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1E in the drawings, a land vehicle depicted as an off-road vehicle is schematically illustrated and generally designated 10. In the illustrated embodiment, off-road vehicle 10 is a side-by-side vehicle. In other embodiments, off-road vehicle 10 may be an all-terrain vehicle, a light utility vehicle, a utility-terrain vehicle, a recreational off-highway vehicle, a multipurpose off-highway utility vehicle or the like. Structural support for off-road vehicle 10 is provided by a frame assembly 12, on or around which the various systems and components of off-road vehicle 10 are assembled. Off-road vehicle 10 includes a plurality of body panels that cover and protect certain components of off-road vehicle 10 such as hood panel 14a, right front fender panel 14b, right door panel 14c, right occupant space panel 14d, right wheel well panel (not shown), right bedside wall outer panel 14e and tailgate outer panel 14f. It should be understood by those having ordinary skill in the art that off-road vehicle 10 has similar body panels on the left side of the vehicle including left front fender panel 14g, left door panel 14h, left occupant space panel 14i, left wheel well panel 14j and left bedside wall outer panel 14k with the body panels of off-road vehicle 10 being collectively referred to herein as body panels 14. Body panels 14 may be formed from sheet metal or metal alloy, such as steel or aluminum, and/or polymeric materials such as fiber reinforced polymer composites. In addition, it should be understood by those having ordinary skill in the art that the right side and the left side of off-road vehicle 10 will be with reference to a forward-facing occupant of off-road vehicle 10 with the right side of off-road vehicle 10 corresponding to the right side of the occupant and the left side of off-road vehicle 10 corresponding to the left side of the occupant. The forward direction of off-road vehicle 10 is indicated by forward arrow 16a and the backward direction of off-road vehicle 10 is indicated by backward arrow 16b in FIGS. 1C and 1D. The forward and backward directions also represent the longitudinal direction of off-road vehicle 10 with the lateral direction of off-road vehicle 10 being normal thereto and represented by a leftward arrow 16c and a rightward arrow 16d in FIG. 1E. The backward direction may also be referred to herein as the aftward direction.

Figure 1C:
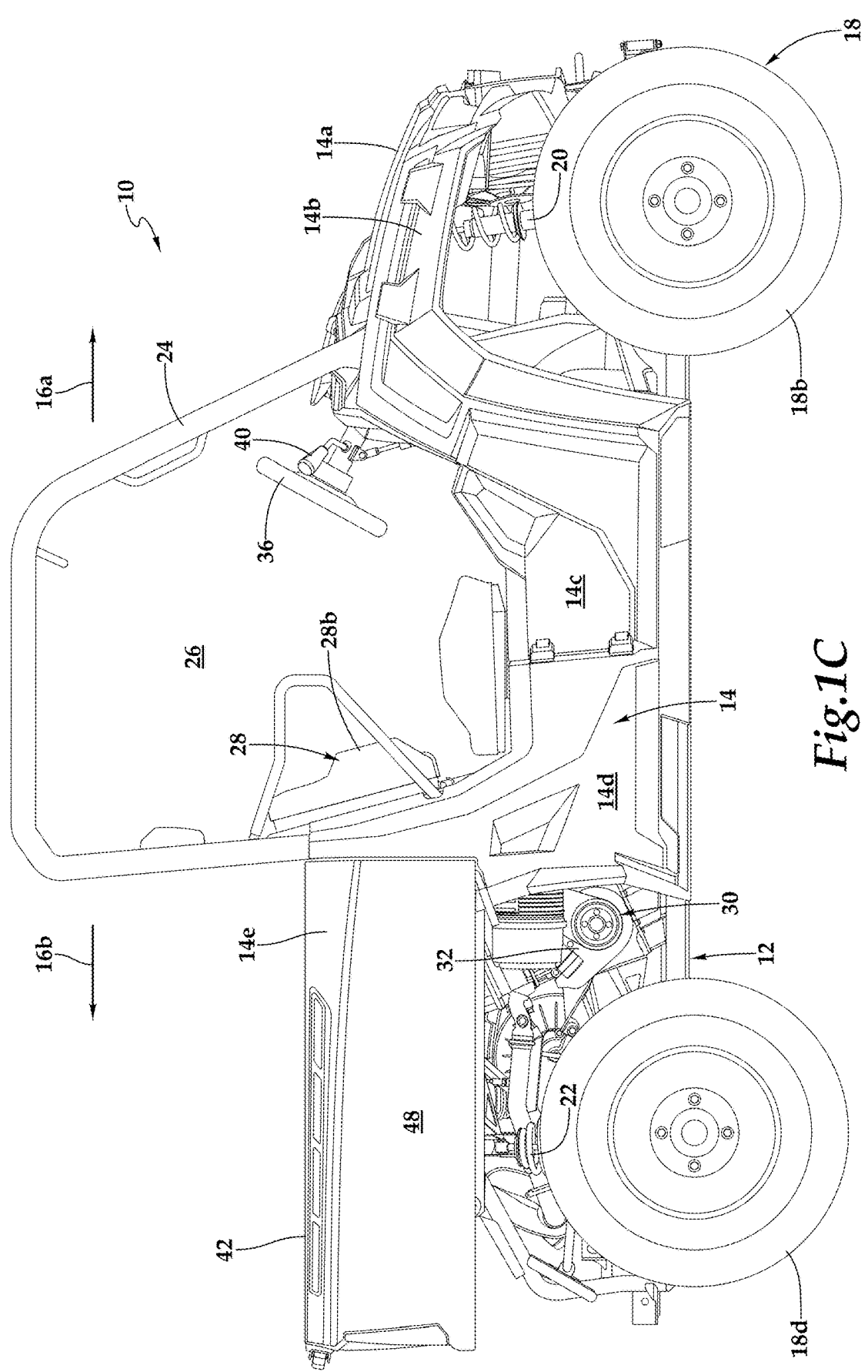
Figure 1D:
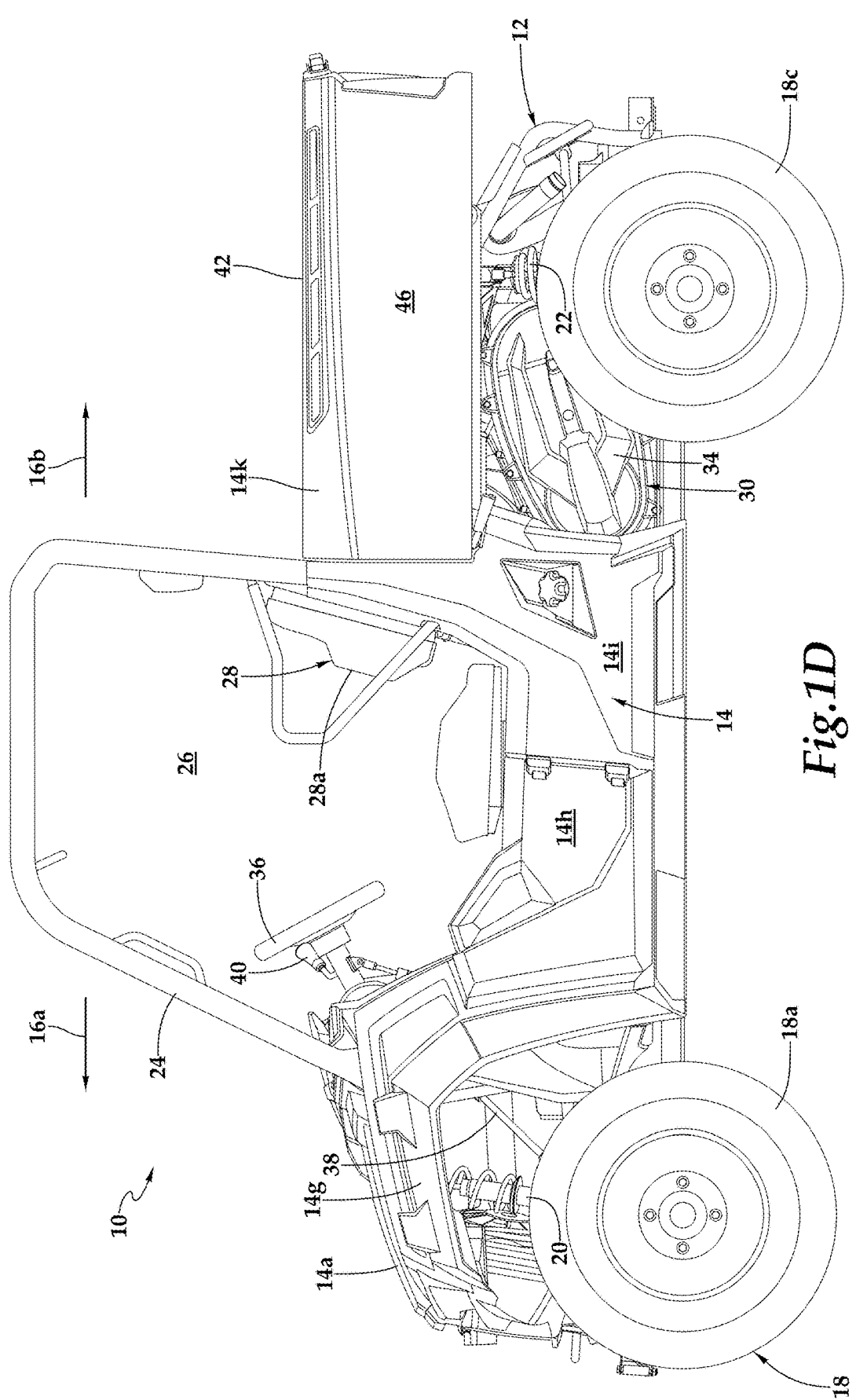
Figure 1E:
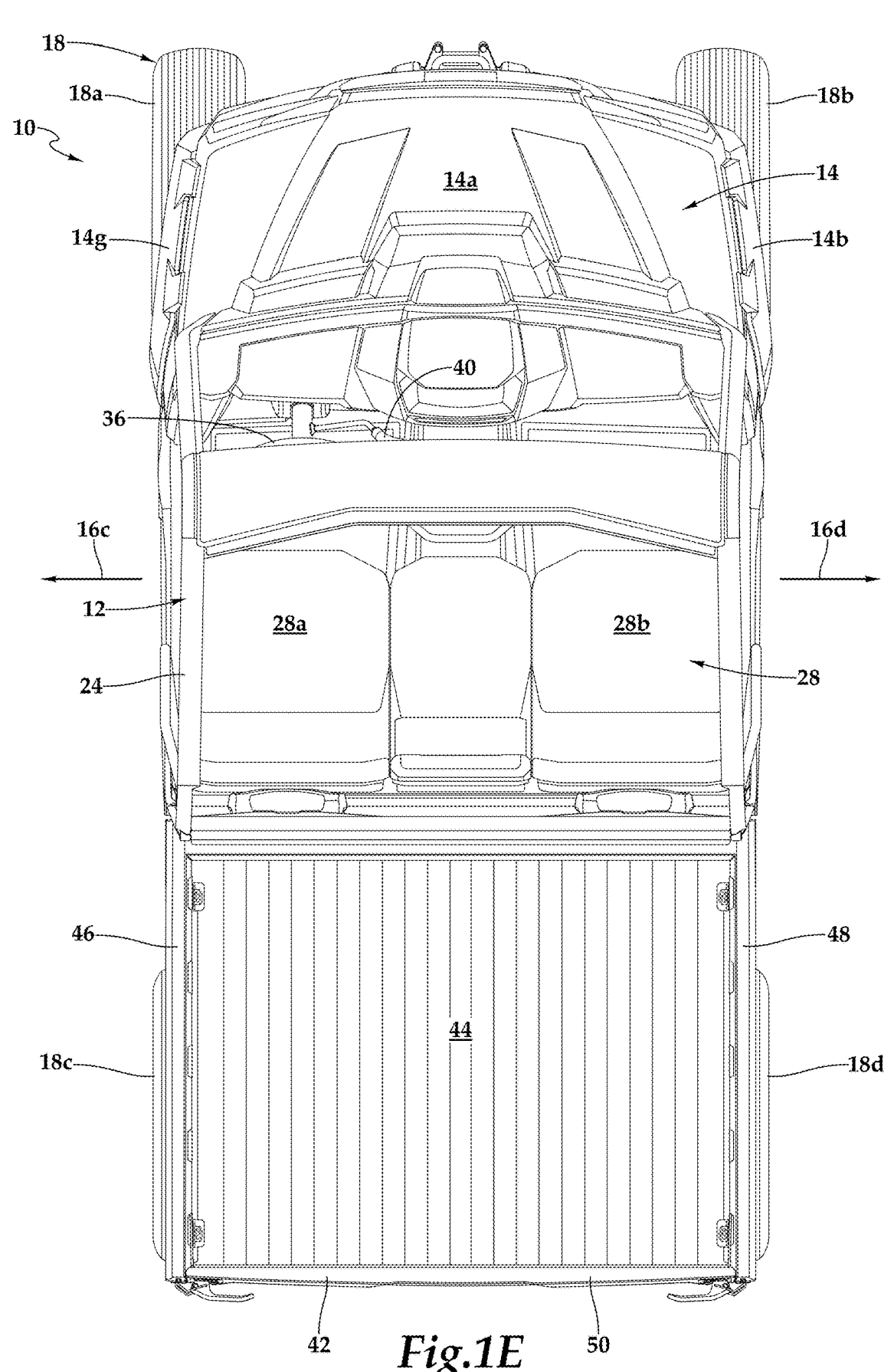

Off-road vehicle 10 includes a plurality of ground engaging members depicted as four wheels 18 including front wheels 18a, 18b that are coupled to frame assembly 12 by a front suspension 20 and rear wheels 18c, 18d that are coupled to frame assembly 12 by a rear suspension 22. Frame assembly 12 includes a rollover protection structure 24 that at least partially defines an occupant space 26 within off-road vehicle 10 as best seen in FIGS. 1C and 1D. In the illustrated embodiment, occupant space 26 includes a seating assembly 28 depicted as a pair of bucket seats, namely, a driver seat 28a and a passenger seat 28b in a side-by-side arrangement. In other embodiments, the seating assembly of an off-road vehicle may have a bench seating arrangement. In still other embodiments, the seating assembly of an off-road vehicle may have front and rear seats to accommodate additional occupants such as a total of four, five, six or more occupants.

In FIGS. 1C and 1D, left wheel well panel 14j and the right wheel well panel have been removed from off-road vehicle 10 to reveal certain additional systems and components of off-road vehicle 10. For example, off-road vehicle 10 has a powertrain 30 that includes an engine 32 shown in FIG. 1C and a transmission 34 shown in FIG. 1D, both of which are coupled to frame assembly 12. Engine 32 may be any type of engine such as a two-stroke engine, a four-stroke engine, an electric motor or other prime mover. Engine 32 may be naturally aspirated or may include a power adder such as a supercharger or a turbocharger. Transmission 34 may be a continuously variable transmission, an electrically variable transmission or other suitable transmission type for varying the ratio of the engine output speed to the input speed to wheels 18. In the illustrated embodiment, off-road vehicle 10 is a four-wheel drive vehicle in which powertrain 30 is operatively coupled to front wheels 18a, 18b via a front drive unit, or differential, and to rear wheels 18c, 18d via a rear drive unit, or differential, which is coupled to the front drive unit via a drive shaft. In other embodiments, off-road vehicle 10 may be a two-wheel drive vehicle such as a rear-wheel drive vehicle in which powertrain 30 is coupled to only rear wheels 18c, 18d or a front-wheel drive vehicle in which powertrain 30 is coupled to only front wheels 18a, 18b. In yet other embodiments, off-road vehicle 10 may be selectable between a two-wheel drive mode and a four-wheel drive mode. Off-road vehicle 10 may have an equal vehicle weight distribution between front wheels 18a, 18b and rear wheels 18c, 18d or may have an uneven vehicle weight distribution favoring front wheels 18a, 18b or rear wheels 18c, 18d. For example, it may be desirable to have a weight distribution of 40/60 front to rear, with approximately 40 percent of the vehicle weight bearing on front wheels 18a, 18b and 60 percent of the vehicle weight bearing on rear wheels 18c, 18d. In other examples, suitable front to rear weight distributions may be in a range between 35/65 and 45/55.

Positioned within occupant space 26, off-road vehicle 10 includes a steering wheel 36 that is coupled to front wheels 18a, 18b via a steering linkage 38. In certain embodiments, off-road vehicle 10 may include an electric power steering system that is coupled to steering linkage 38. In other embodiments, off-road vehicle 10 may have hydraulically assisted power steering, electric power steering without a mechanical linkage such as a drive-by-wire system, electric assisted power steering or other suitable steering system. Also disposed within occupant space 26, off-road vehicle 10 includes a gear shift selector 40 that is coupled to transmission 34 and enables the driver to shift off-road vehicle 10 between various driving modes including forward and reverse driving modes. Positioned aft of seating assembly 28, off-road vehicle 10 includes a cargo box 42 coupled to frame assembly 12. Cargo box 42 may be used to transport large items and/or materials. Cargo box 42 includes a floor 44 to which a left bedside wall 46 and a right bedside wall 48 are coupled and to which a tailgate 50 is hingeably coupled.

It should be appreciated that off-road vehicle 10 is merely illustrative of a variety of vehicles that can implement the embodiments disclosed herein. Indeed, the illustrative embodiments disclosed herein may be implemented on any ground-based vehicle. Other vehicle implementations can include motorcycles, snowmobiles, snow bikes, all-terrain vehicles (ATVs), utility vehicles including light utility vehicles, utility-terrain vehicles, recreational vehicles including recreational off-highway vehicles, multipurpose off-highway utility vehicles, scooters, automobiles, mopeds, straddle-type vehicles and the like. As such, those skilled in the art will recognize that the illustrative embodiments disclosed herein can be integrated into a variety of vehicle configurations. It should be appreciated that even though ground-based vehicles are particularly well-suited to implement the embodiments of the present disclosure, airborne vehicles and devices such as aircraft can also implement the embodiments.

Figure 2A:
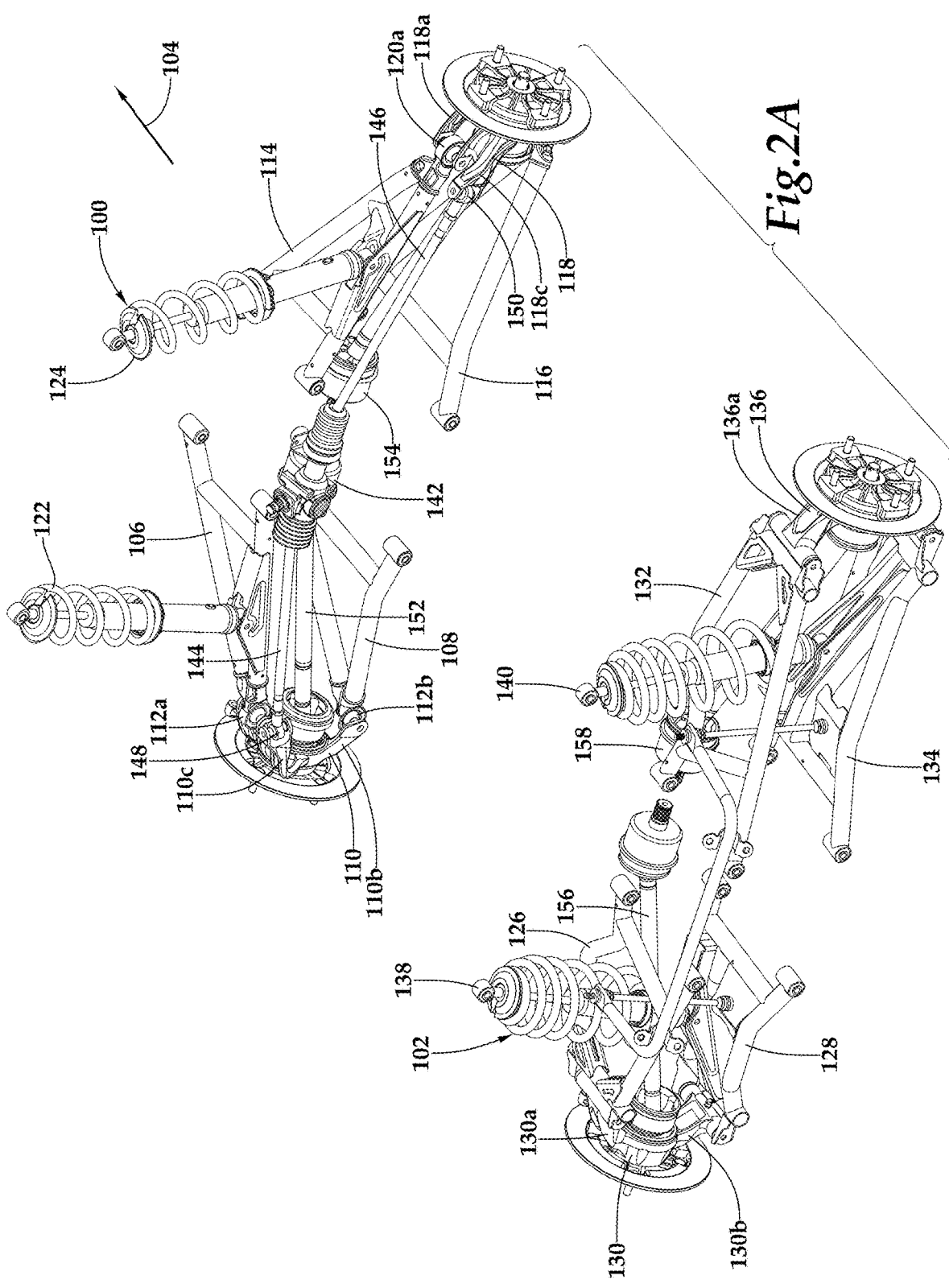
FIGS. 2A-2D are various views of front and rear suspension systems for an off-road vehicle as well as certain components of a steering system and drivetrain including universal half shafts in accordance with embodiments of the present disclosure.
Figure 2B:
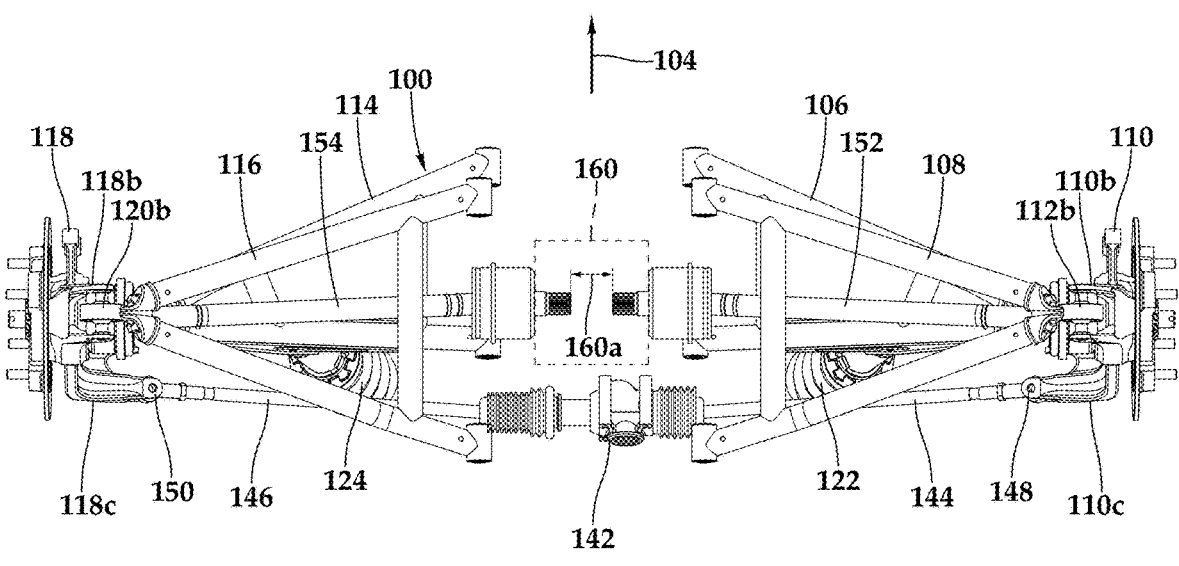
Figure 2B:
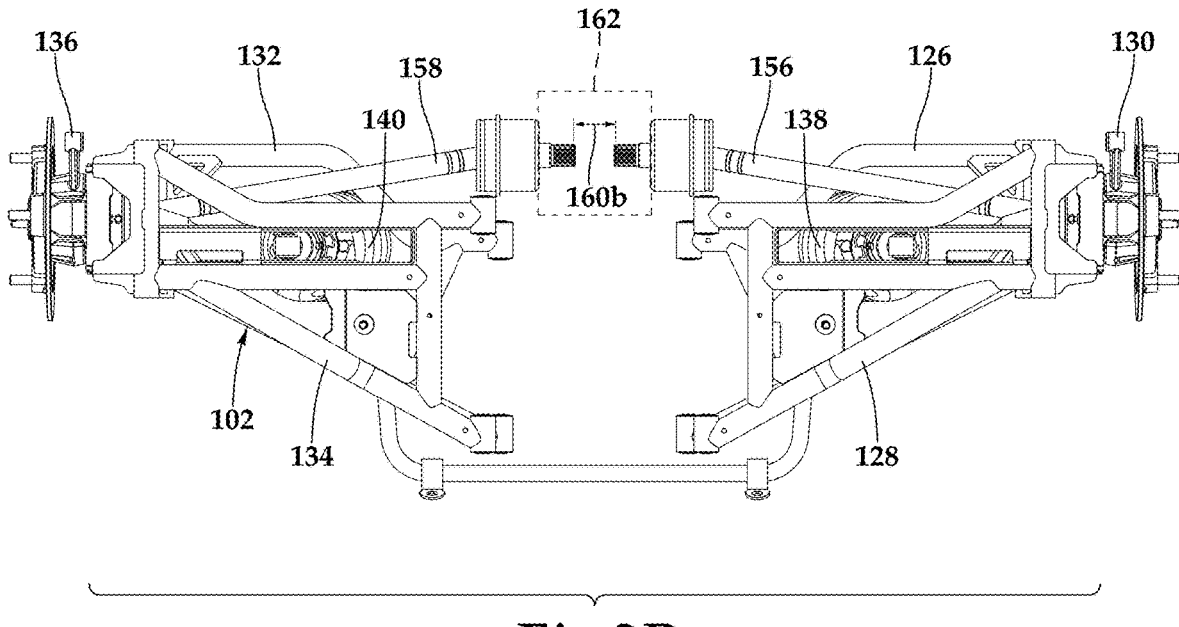
Figure 2C:
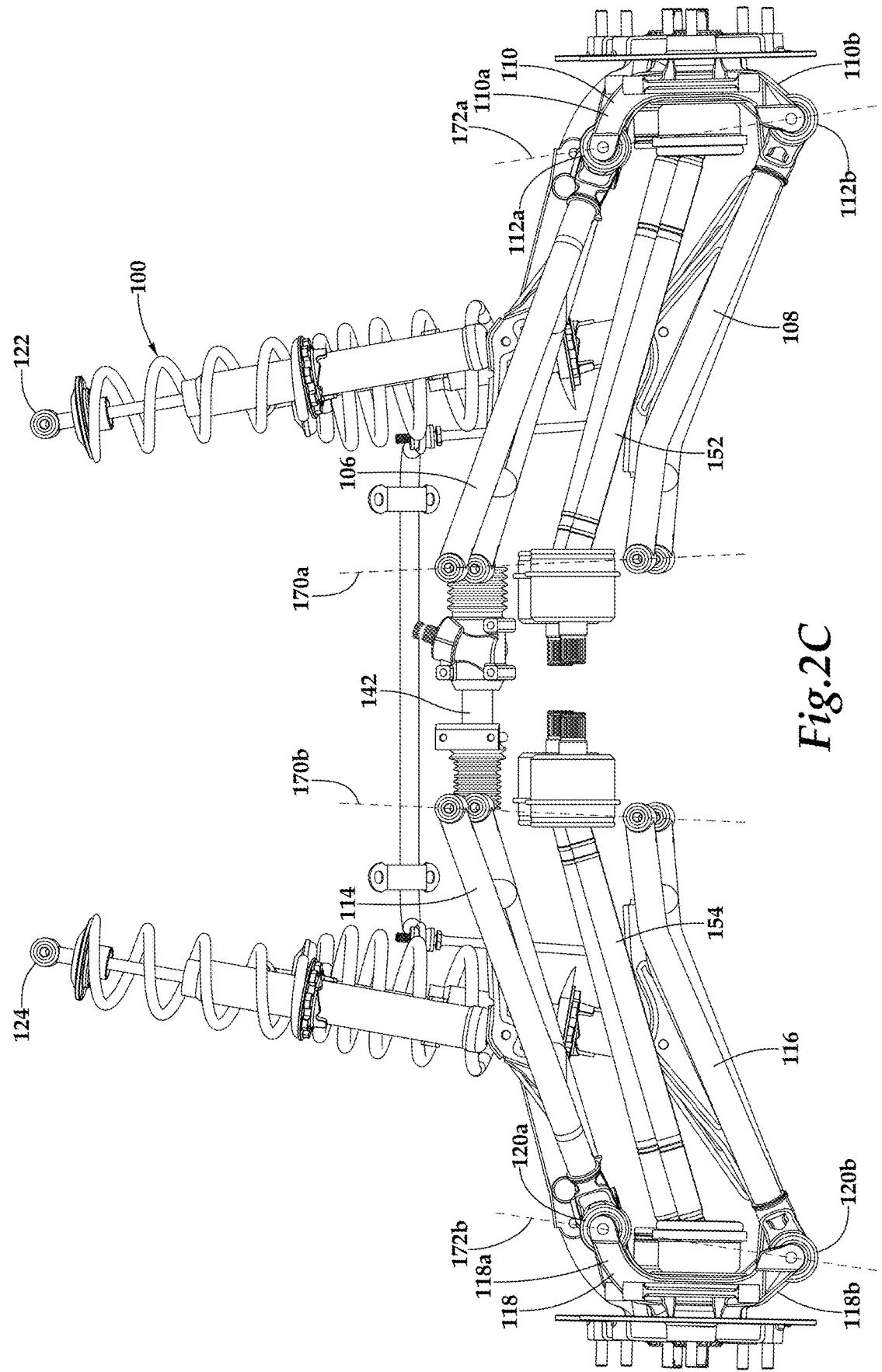
Figure 2D:
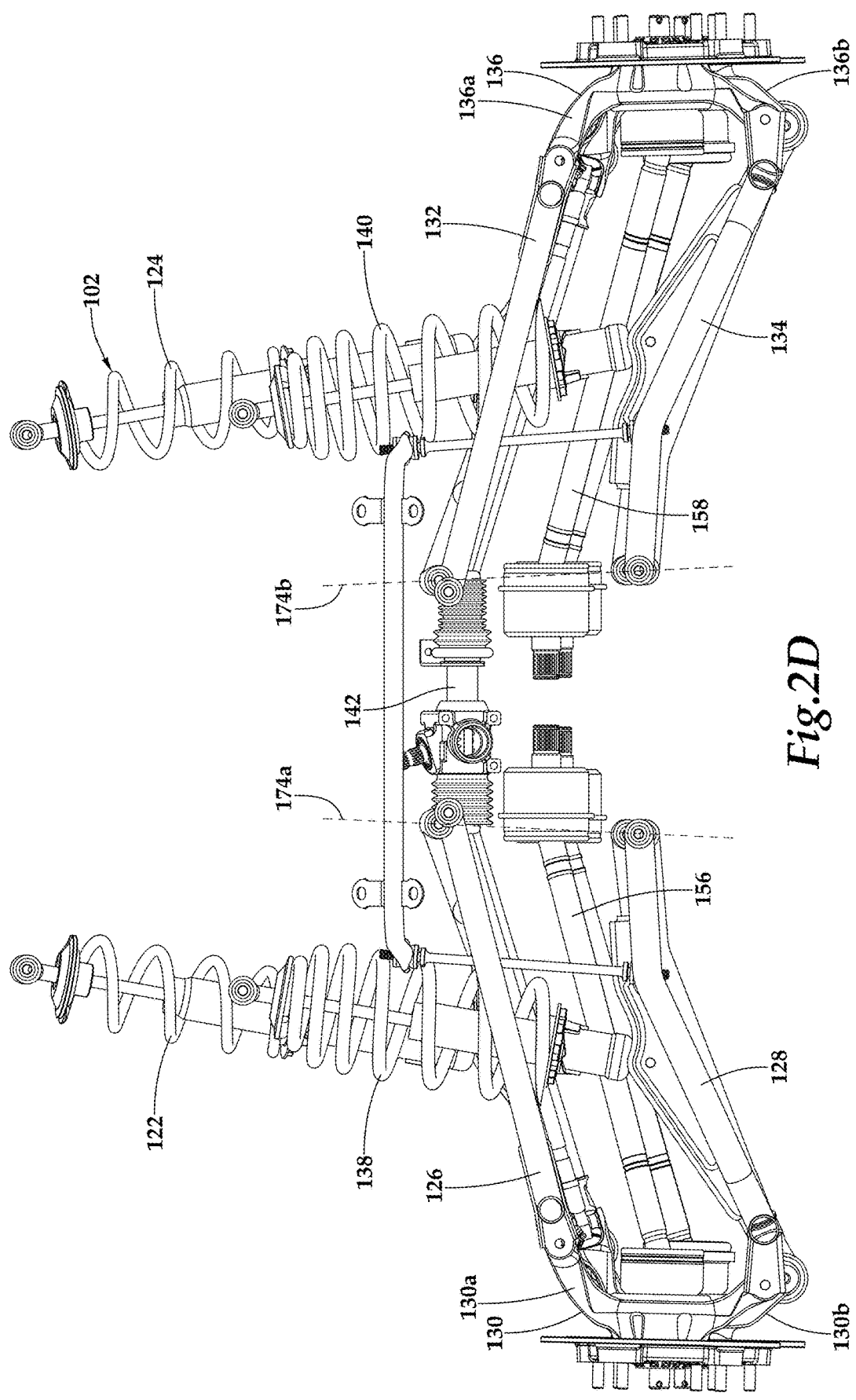

Referring to FIGS. 2A-2D in the drawings, a front suspension system 100, a rear suspension system 102 as well as steering and drivetrain components of an off-road vehicle such as off-road vehicle 10 in FIGS. 1A-1E are schematically illustrated. FIG. 2A is an isometric view of front and rear suspension systems 100, 102 with the forward direction of the off-road vehicle indicated by forward arrow 104. FIG. 2B is a bottom view of front and rear suspension systems 100, 102 with the forward direction of the off-road vehicle indicated by forward arrow 104. FIG. 2C is a front view of front and rear suspension systems 100, 102 and FIG. 2D is a rear view of front and rear suspension systems 100, 102. Front suspension system 100 includes left upper and lower control arms 106, 108 having outboard ends coupled to a left knuckle 110. Left knuckle 110 includes an upper control arm connector arm 110a and a lower control arm connector arm 110b to which the outboard ends of left upper and lower control arms 106, 108 are rotatably coupled via spherical joints 112a, 112b, respectively. Spherical joints 112a, 112b may be a type of ball joint, heim joint, rose joint or rod end bearing. Front suspension system 100 also includes right upper and lower control arms 114, 116 having outboard ends coupled to right knuckle 118. Right knuckle 118 includes upper control arm connector arm 118a and lower control arm connector arm 118b to which the outboard ends of right upper and lower control arms 114, 116 are rotatably coupled via spherical joints 120a, 120b, respectively. The inboard ends of control arms 106, 108, 114, 116 are pivotably coupled to the frame assembly of the off-road vehicle. Control arms 106, 108, 114, 116 are each depicted as an A-arm. Front suspension system 100 also includes shock absorbers 122, 124 having bottom ends pivotably coupled to upper control arms 106, 114.

Rear suspension system 102 includes left upper and lower control arms 126, 128 having outboard ends coupled to left knuckle 130. Left knuckle 130 includes upper control arm connector arm 130a and lower control arm connector arm 130b to which the outboard ends of left upper and lower control arms 126, 128 are rotatably coupled, respectively. Rear suspension system 102 also includes right upper and lower control arms 132, 134 having outboard ends coupled to right knuckle 136. Right knuckle 136 includes upper control arm connector arm 136a and lower control arm connector arm 136b to which the outboard ends of left upper and lower control arms 132, 134 are rotatably coupled, respectively. The inboard ends of control arms 126, 128, 132, 134 are pivotably coupled to the frame assembly of the off-road vehicle. Rear suspension system 102 also includes shock absorbers 138, 140 having bottom ends pivotably coupled to lower control arms 128, 134. The front end of the off-road vehicle also includes a steering system including a steering rack assembly 142 and left and right tie rods 144, 146 having inboard ends coupled to steering rack assembly 142. Front knuckles 110, 118 each include a tie rod connector arm 110c, 118c to which the outboard ends of tie rods 144, 146 are rotatably coupled via spherical joints 148, 150.

Drivetrains for off-road vehicles currently use front half shafts that are smaller and/or differently dimensioned than the rear half shafts. For example, the front half shafts may have a different length, shaft diameter or spline diameter than the rear half shafts. Using two or more differently dimensioned half shafts in the off-road vehicle results in a higher number of different parts for the off-road vehicle and nonuniform strength characteristics for the front half shafts versus the rear half shafts. To address these and other issues of previously-implemented half shafts, four universal half shafts 152, 154, 156, 158 are included as part of the drivetrain of the off-road vehicle. Front universal half shafts 152, 154 transfer rotational energy from a front drive unit, or differential, 160 to the front wheels and rear universal half shafts 156, 158 transfer rotational energy from a rear drive unit, or differential, 162 to the rear wheels. Universal half shafts 152, 154, 156, 158 are identical in all respects, being the same part and part number, and can be interchangeably used in any of the four locations of the off-road vehicle including the front left position coupled to the front left wheel, the front right position coupled to the front right wheel, the rear left position coupled to the rear left wheel or the rear right position coupled to the rear right wheel.

Figure 3:
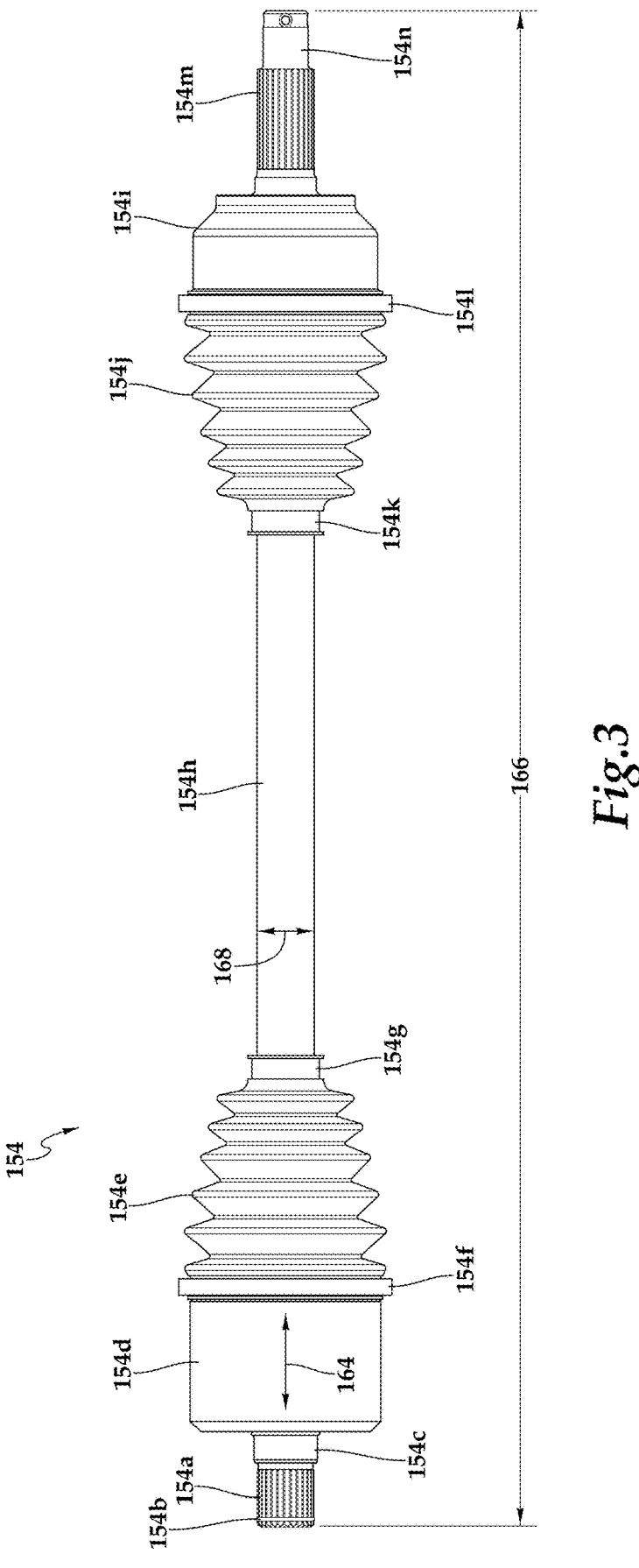
FIG. 3 is a plan view of a universal half shaft in accordance with embodiments of the present disclosure.

Referring additionally to FIG. 3 in the drawings, universal half shaft 154, which connects front drive unit 160 to the front right wheel of the off-road vehicle, is depicted in greater detail. Universal half shaft 154 is structurally identical to the remaining three universal half shafts 152, 156, 158 of the off-road vehicle therefore, for sake of efficiency, certain features will be disclosed only with regard to universal half shaft 154. One having ordinary skill in the art, however, will fully appreciate an understanding of universal half shafts 152, 156, 158 based upon the disclosure herein of universal half shaft 154. The inboard end of universal half shaft 154 defines an inboard spline 154*a* that is received by a complementary bore on the right side of front drive unit 160. Because universal half shafts 152, 154, 156, 158 have identical inboard splines 154*a* with the same inboard spline diameter, the complementary bores formed by both front and rear drive units 160, 162, which receive the inboard splines 154*a* of universal half shafts 152, 154, 156, 158, have identical bore diameters. A retaining ring 154*b* facilitates a secure connection between inboard spline 154*a* and front drive unit 160. Front and rear drive units 160, 162 may enclose a sealed oil bath such that when, for example, universal half shaft 154 is removed from front drive unit 160, the oil bath contained by front drive unit 160 is sealed from outside exposure or leaking. A pilot diameter 154*c* secures inboard spline 154*a* within the complementary bore formed by front drive unit 160 and reduces or prevents undesirable rocking of universal half shaft 154.

Universal half shaft 154 has an inboard CV joint 154*d*, which is a pivotable and plungeable joint providing flexibility for universal half shaft 154 when being connected to front drive unit 160 and the front right wheel. The flexibility of inboard CV joint 154*d* also allows for slight variations in the geometry and positioning of components to which universal half shaft 154 is connected. Inboard CV joint 154*d* can plunge inward along directional arrow 164 to retract the overall length 166 of universal half shaft 154. Conversely, inboard CV joint 154*d* can plunge outward along directional arrow 164 to expand the overall length 166 of universal half shaft 154. In one non-limiting example, the plunge distance though which inboard CV joint 154*d* can plunge is in a range between 10 millimeters and 90 millimeters such as 45 millimeters. Due to the ability of inboard CV joint 154*d* to plunge inward or outward, universal half shaft 154 has a variable length 166. In a non-limiting example in which the plunge distance of inboard CV joint 154*d* is 45 millimeters, universal half shaft 154 may have a collapsed length of 718 millimeters and an extended length of 763 millimeters. However, the collapsed and extended lengths of universal half shaft 154 may vary widely depending on the needs of the off-road vehicle, the plunge distance of inboard CV joint 154*d* as well as other factors. In addition, while the amounts that inboard CV joint 154*d* of each universal half shaft 152, 154, 156, 158 plunges or pivots may vary due to the particular geometry and positioning of adjacent components, universal half shafts 152, 154, 156, 158 remain structurally identical and therefore have identical inboard CV joints 154*d*. Inboard CV joint 154*d* is protected by an inboard CV joint boot 154*e* secured by boot clamps 154*f*, 154*g*.

Universal half shaft 154 includes a main shaft 154*h*. In previous off-road vehicles, the front half shafts often had thinner main shafts than the rear half shafts. In the illustrative embodiments, universal half shafts 152, 154, 156, 158 each have an identical main shaft diameter 168 to provide equal strength to all four half shafts. Universal half shafts 152, 154, 156, 158 also each have an identical main shaft length. Universal half shaft 154 includes an outboard CV joint 154*i* protected by an outboard CV joint boot 154*j* secured by boot clamps 154*k*, 154*l*. Outboard CV joint 154*i*, which is identical on each universal half shaft 152, 154, 156, 158, pivots to accommodate the pivoting motion of knuckle 118 as the off-road vehicle steers through turns. An outboard spline 154*m* and an axle nut thread 154*n* are coupled to the front right wheel of the off-road vehicle to transfer rotational energy thereto. The diameter and all other dimensions of outboard spline 154*m* and axle nut thread 154*n* are identical on each universal half shaft 152, 154, 156, 158.

Despite being identical in structure, the flexibility provided by inboard CV joint 154*d* and outboard CV joint 154*i* allows universal half shafts 152, 154, 156, 158 to be plunged and pivoted at different positions. For example, as best seen in FIG. 2B the inboard ends of rear universal half shafts 156, 158 are forward of the outboard ends of rear universal half shafts 156, 158 while the inboard and outboard ends of front universal half shafts 152, 154 are approximately even in the longitudinal direction of the off-road vehicle. Also, the distance 160*a* between the inboard ends of front universal half shafts 152, 154 within front drive unit 160 is greater than the distance 160*b* between the inboard ends of rear universal half shafts 156, 158 within rear drive unit 162. As best seen in FIGS. 2C and 2D, the inboard ends of universal half shafts 152, 154, 156, 158 have a higher elevation than the outboard ends of universal half shafts 152, 154, 156, 158. It will be appreciated by one of ordinary skill in the art, however, that the elevations and longitudinal and lateral positions of the inboard and outboard ends of universal half shafts 152, 154, 156, 158 may vary based on the configuration and other needs of the off-road vehicle.

As best seen in FIG. 2C, the inboard ends of front left upper and lower control arms 106, 108 lie along a common plane 170*a* and the inboard ends of front right upper and lower control arms 114, 116 lie along a common plane 170*b*. The spacing between the inboard ends of front lower control arms 108, 116 provides additional space for other components of the off-road vehicle such as front drive unit 160. The inboard CV joints of front universal half shafts 152, 154 lie along common planes 170*a*, 170*b*, respectively, which can minimize the amount of plunge required of front universal half shafts 152, 154 and provide smoother vertical movement of front suspension system 100. Upper and lower spherical joints 112*a*, 112*b*, which couple the outboard ends of front left upper and lower control arms 106, 108 to upper and lower control arm connector arms 110*a*, 110*b* of front left knuckle 110, form kingpin axis 172*a*. The outboard CV joint of universal half shaft 152 lies along kingpin axis 172*a* for smoother steering of the off-road vehicle. Similarly, upper and lower spherical joints 120*a*, 120*b*, which couple the outboard ends of front right upper and lower control arms 114, 116 to upper and lower control arm connector arms 118*a*, 118*b* of right knuckle 118, form kingpin axis 172*b*. The outboard CV joint of universal half shaft 154 lies along kingpin axis 172*b*. As best seen in FIG. 2D, the inboard ends of rear left upper and lower control arms 126, 128 lie along a common plane 174*a* and the inboard ends of rear right upper and lower control arms 132, 134 lie along a common plane 174*b*. The inboard CV joints of rear universal half shafts 156, 158 lie along common planes 174*a*, 174*b*, respectively. It will be appreciated by one of ordinary skill in the art that universal half shafts 152, 154, 156, 158 may be utilized on any off-road vehicle without the requirement that the inboard and outboard CV joints lie along common planes 170*a*, 170*b*, 174*a*, 174*b* and/or kingpin axes 172*a*, 172*b*. The use of universal half shafts 152, 154, 156, 158 in the design of a vehicle requires less parts and part numbers to be stocked for assembly of the vehicle, resulting in lower manufacturing and installation costs.

Figure 4:
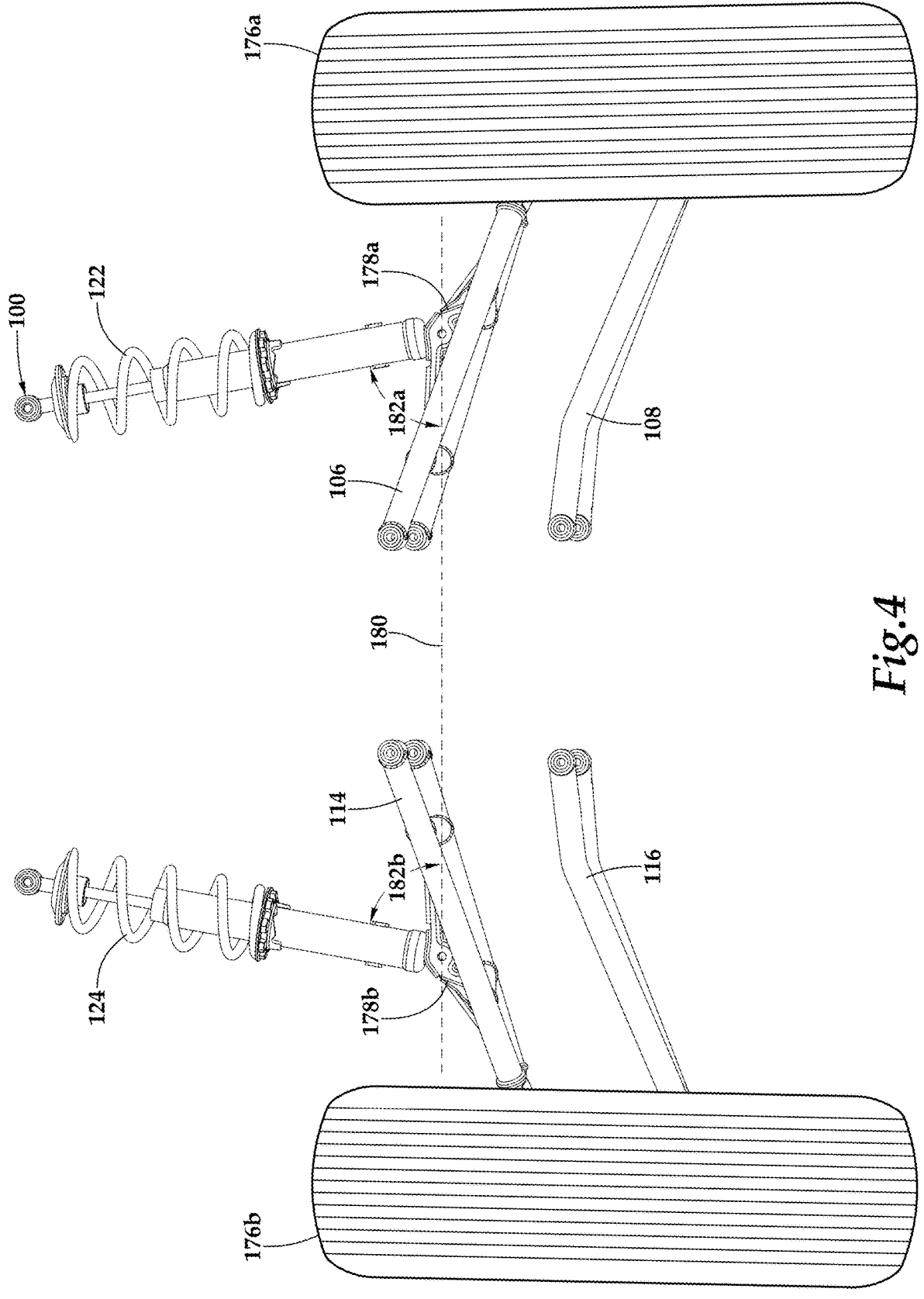
FIG. 4 is a front view of a front suspension system for an off-road vehicle having near-vertical shock absorbers in accordance with embodiments of the present disclosure.

Referring additionally to FIG. 4 in the drawings, front suspension system 100 including left upper and lower control arms 106, 108 and right upper and lower control arms 114, 116 is depicted. Front suspension system 100 is shown with left and right tires 176a, 176b at the outboard ends of left control arms 106, 108 and right control arms 114, 116, respectively. The bottom ends of shock absorbers 122, 124 are pivotably coupled to upper control arms 106, 114 via shock absorber fittings 178a, 178b, respectively. The top ends of shock absorbers 122, 124 are coupled to the frame assembly of the off-road vehicle. Front suspension system 100 is moveable between various vertical positions including a compressed position in which shock absorbers 122, 124 are compressed and a dropout, or lockout, position in which shock absorbers 122, 124 are fully extended. When shock absorbers 122, 124 are fully compressed, front suspension system 100 is in a fully compressed position. FIG. 4 shows front suspension system 100 in the compressed position under normal riding conditions. As front suspension system 100 moves from the compressed position to the dropout position, the outboard ends of control arms 106, 108, 114, 116 move lower relative to the inboard ends of control arms 106, 108, 114, 116, increasing the slope of control arms 106, 108, 114, 116 relative to a horizontal reference plane 180. Conversely, as front suspension system 100 moves from the dropout position to the compressed position shown in FIG. 4, the outboard ends of control arms 106, 108, 114, 116 move higher relative to the inboard ends of control arms 106, 108, 114, 116, decreasing the slope of control arms 106, 108, 114, 116 relative to horizontal reference plane 180.

Current front suspension systems utilize shock absorbers positioned at a shallow orientation angle relative to horizontal reference plane 180, thereby decreasing leverage on the spring and failing to take full advantage of the spring rate of the shock absorbers. At a shallow orientation angle, the front suspension may require stiffer and heavier shock absorbers, adding to the weight and expense of the vehicle. Front suspension system 100 addresses these and other drawbacks by increasing the inboard orientation angles 182a, 182b of shock absorbers 122, 124 relative to horizontal reference plane 180, thereby orienting shock absorbers 122, 124 in more vertical positions. As compared to prior front suspension systems, the bottom ends of shock absorbers 122, 124 have been moved more inboard and the top ends of shock absorbers 122, 124 have been moved more outboard. In the fully compressed position of front suspension system 100, shock absorbers 122, 124 are oriented as close to perpendicular to horizontal reference plane 180 as possible without inboard orientation angles 182a, 182b exceeding 90 degrees. In one non-limiting example, inboard orientation angles 182a, 182b are in a range from 80 degrees to 89.9 degrees such as 87 degrees in the fully compressed position of front suspension system 100. Orienting shock absorbers 122, 124 in this manner provides increased vertical wheel travel of tires 176a, 176b between the fully compressed and dropout positions of front suspension system 100, improving the ratio of vertical wheel travel distance to shock absorber travel distance. In one non-limiting example, the ratio of vertical wheel travel to shaft stroke may be in a range between 1.5:1 to 2.5:1 such as 1.56:1 or 2:1. A more vertical orientation of shock absorbers 122, 124 also increases leverage on the springs of shock absorbers 122, 124, taking fuller advantage of the springs and allowing for a lighter spring rate to prevent the off-road vehicle from bottoming out.

Figure 5:
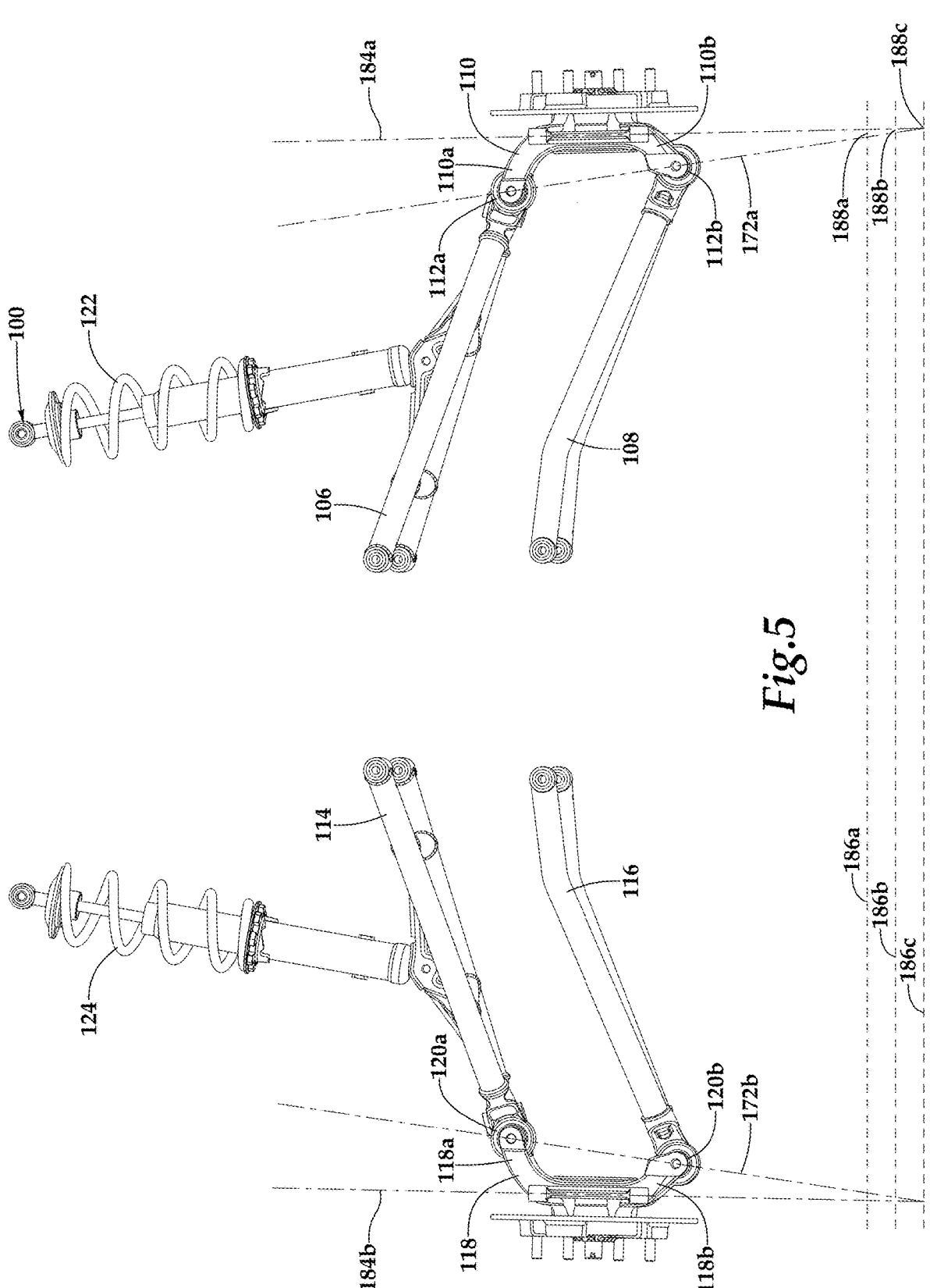
FIG. 5 is a front view of a front suspension system for an off-road vehicle illustrating the kingpin axes and ground contact patches for various tire sizes in accordance with embodiments of the present disclosure.

Referring additionally to FIG. 5 in the drawings, front suspension system 100 including left upper and lower control arms 106, 108, right upper and lower control arms 114, 116 and shock absorbers 122, 124 is depicted. Upper and lower spherical joints 112a, 112b, which couple the outboard ends of left upper and lower control arms 106, 108 to upper and lower control arm connector arms 110a, 110b of left knuckle 110, form kingpin axis 172a. Similarly, upper and lower spherical joints 120a, 120b, which couple the outboard ends of right upper and lower control arms 114, 116 to upper and lower control arm connector arms 118a, 118b of right knuckle 118, form kingpin axis 172b. Tire bisecting plane 184a vertically bisects tire 176a shown in FIG. 4 and tire bisecting plane 184b vertically bisects tire 176b shown in FIG. 4. Small, medium and large tire contact patches 186a, 186b, 186c represent different levels of contact with the ground for different sizes of tires 176a, 176b. More specifically, small tire contact patch 186a is the level of contact between small tires and the ground, medium tire contact patch 186b is the level of contact between medium tires and the ground and large tire contact patch 186c is the level of contact between large tires and the ground. In one non-limiting example, the small tire size represented by small tire contact patch 186a is in a range from 25-29 inches such as 27 inches and the large tire size represented by large tire contact patch 186c is in a range from 30-34 inches such as 32 inches, although the exact range of tire sizes of tires 176a, 176b may vary for each off-road vehicle. The distance between kingpin axis 172a and tire bisecting plane 184a at each contact patch 186a, 186b, 186c defines the scrub radius on the left side of the off-road vehicle and the distance between kingpin axis 172b and tire bisecting plane 184b at each contact patch 186a, 186b, 186c defines the scrub radius on the right side of the off-road vehicle. In particular, for small sizes of tires 176a, 176b, the off-road vehicle has a scrub radius 188a as defined by the distance between kingpin axis 172a and tire bisecting plane 184a and between kingpin axis 172b and tire bisecting plane 184b at small tire contact patch 186a. For medium sizes of tires 176a, 176b, the off-road vehicle has a scrub radius 188b as defined by the distance between kingpin axis 172a and tire bisecting plane 184a and between kingpin axis 172b and tire bisecting plane 184b at medium tire contact patch 186b. For large sizes of tires 176a, 176b, the off-road vehicle has a scrub radius 188c as defined by the distance between kingpin axis 172a and tire bisecting plane 184a and between kingpin axis 172b and tire bisecting plane 184b at large tire contact patch 186c.

Current front suspension systems often have kingpin axes that fail to provide adequate stability for the off-road vehicle for a wide range of tire sizes. Front suspension system 100 addresses this and other drawbacks by providing a kingpin inclination angle that keeps scrub radii 188a, 188b, 188c at or inboard of tire bisecting planes 184a, 184b for a wide range of sizes of tires 176a, 176b. In the illustrated embodiment, scrub radius 188a for small tire sizes is inboard of tire bisecting planes 184a, 184b. Scrub radius 188b for medium tire sizes, while smaller than scrub radius 188a, is also inboard of tire bisecting planes 184a, 184b. Kingpin axes 172a, 172b and tire bisecting planes 184a, 184b intersect, respectively, at large tire contact patch 186c such that the scrub radius 188c for large tire sizes is approximately or substantially zero. By keeping scrub radii 188a, 188b, 188c at or inboard of tire bisecting planes 184a, 184b for a wide range of tire sizes, the off-road vehicle is better able to accommodate tires of different sizes while maintaining the stability of the vehicle, which is beneficial for off-road vehicle operators who choose to replace their existing tires with tires of a different size.

Referring to FIGS. 6A-6D in the drawings, a frame assembly for an off-road vehicle such as off-road vehicle 10 in FIGS. 1A-1E is schematically illustrated and generally designated 200. Frame assembly 200 is formed of a plurality of structural members that are interconnected by welds, bolts, pins, adhesive and/or other suitable fastening means. Some of the structural members may be tubular members including round or square tubular members that may be hollow and may be formed from metal or metal alloy, such as steel or aluminum. Other structural members may be in the form of stamped sheets such as stamped sheet metal formed from steel or aluminum. Alternatively or additionally, certain structural members may be formed from polymeric materials such as a fiber reinforced polymer composite. Frame assembly 200 includes a forward frame assembly 202 at the front of the off-road vehicle, a middle frame assembly 204 defining an occupant seating area of the off-road vehicle and an aft frame assembly 206 at the rear of the off-road vehicle.

Figure 6A:
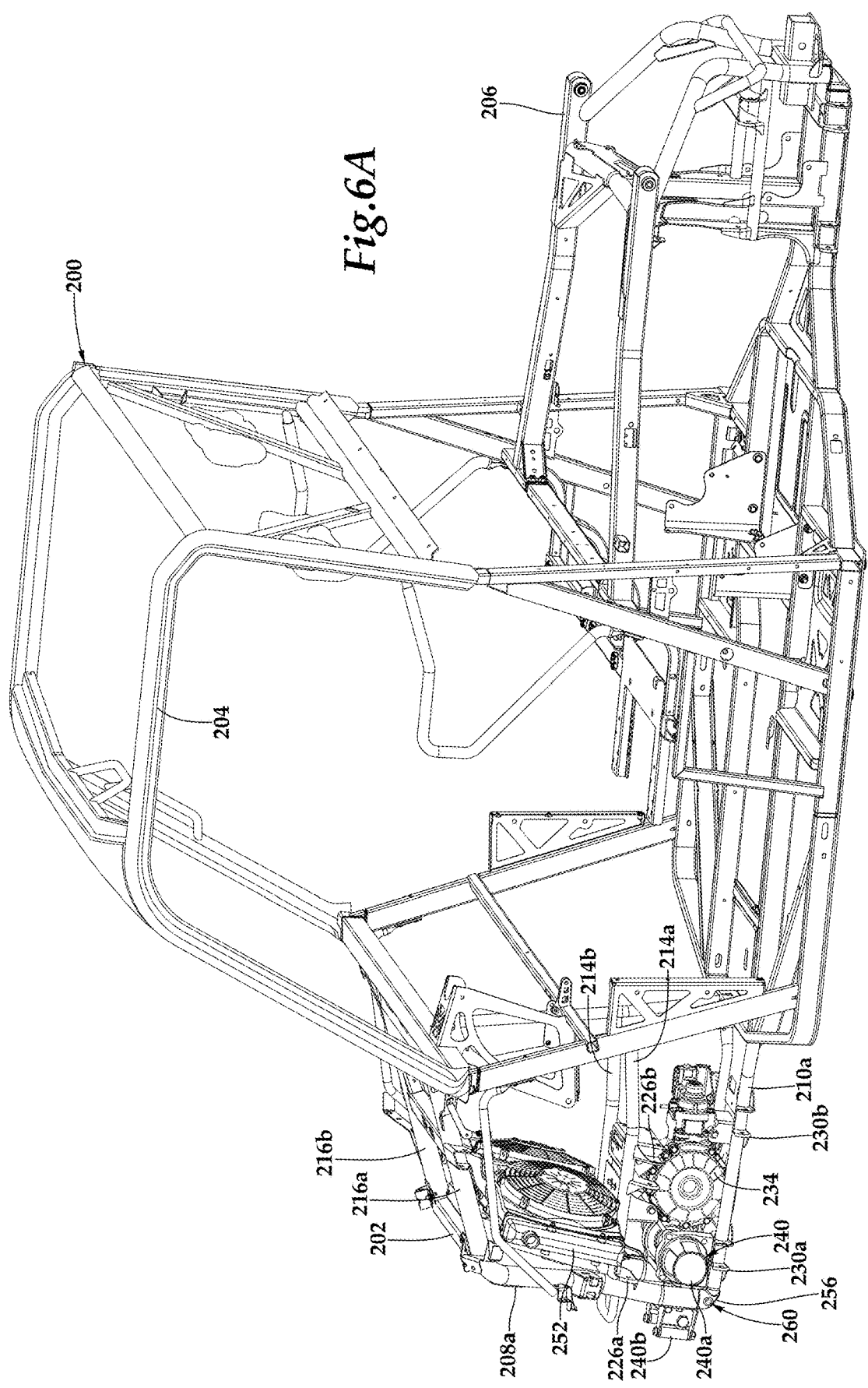
FIGS. 6A-6D are various views of a frame assembly supporting a winch and other components of an off-road vehicle in accordance with embodiments of the present disclosure.
Figure 6B:
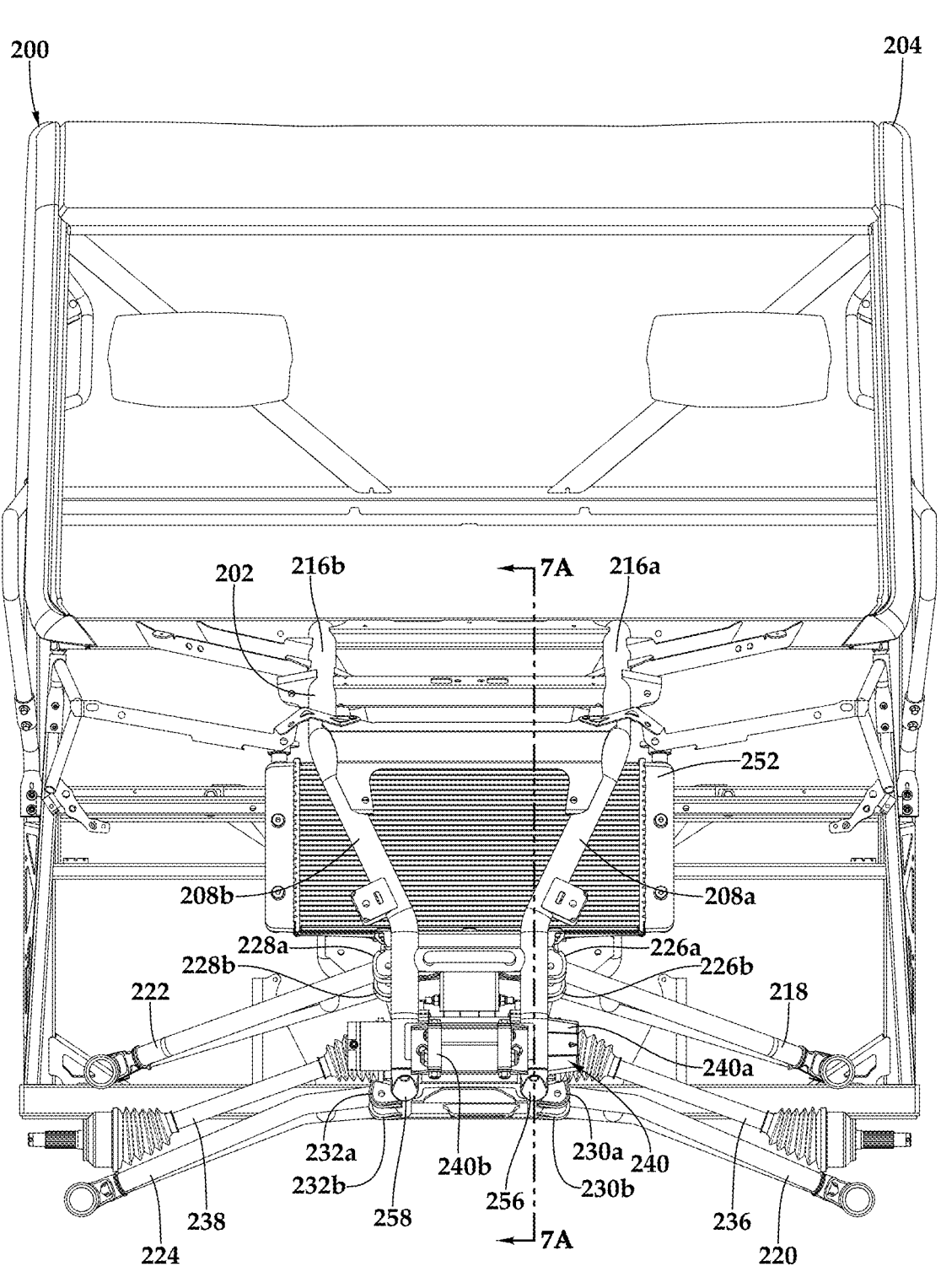
Figure 6C:
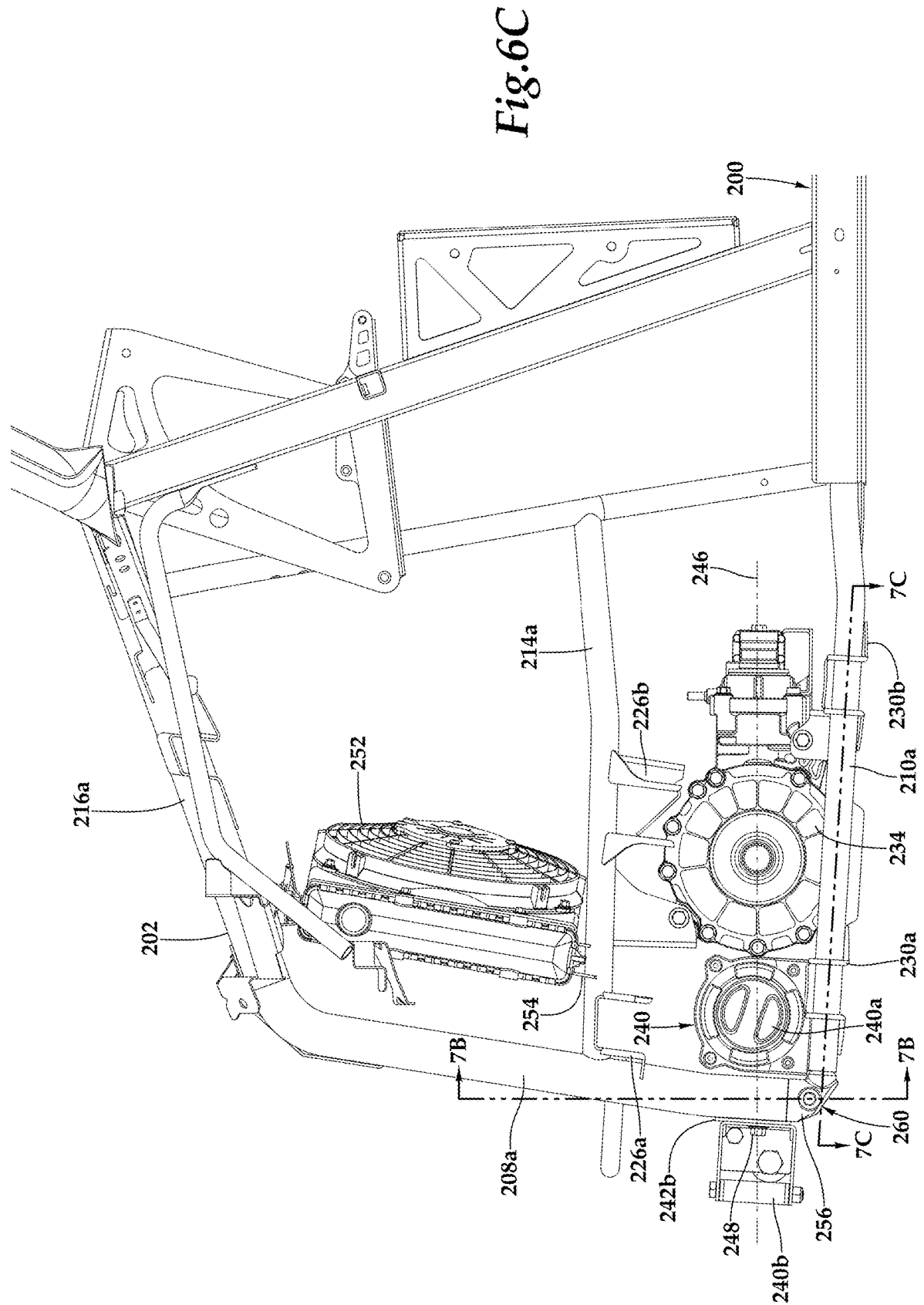

Forward frame assembly 202 is a multilevel forward frame assembly that includes left and right upright leading frame members 208a, 208b that define the forwardmost end of frame assembly 200. As best seen in FIG. 6B, the bottom portions of upright leading frame members 208a, 208b are substantially parallel while the top portions of upright leading frame members 208a, 208b are nonparallel and gradually diverge from one another from lower to higher elevation. Forward frame assembly 202 also includes left and right bottom level longitudinal frame members 210a, 210b, which are substantially horizontal as best seen in FIG. 6C. The forward portions of bottom level longitudinal frame members 210a, 210b are substantially parallel, with the aft portions of bottom level longitudinal frame members 210a, 210b diverging away from one another as they extend toward middle frame assembly 204. The bottom ends of upright leading frame members 208a, 208b are fixedly coupled to the forward ends of bottom level longitudinal frame members 210a, 210b, respectively. Forward frame assembly 202 also includes left and right middle level longitudinal frame members 214a, 214b, which are substantially horizontal, positioned above bottom level longitudinal frame members 210a, 210b and have forward ends fixedly coupled to upright leading frame members 208a, 208b, respectively. Bottom level longitudinal frame members 210a, 210b and middle level longitudinal frame members 214a, 214b are smaller diameter frame members than upright leading frame members 208a, 208b. Forward frame assembly 202 also includes left and right top level longitudinal frame members 216a, 216b that are positioned above middle level longitudinal frame members 214a, 214b and have forward ends coupled to the top ends of upright leading frame members 208a, 208b. Top level longitudinal frame members 216a, 216b are substantially parallel and slope upward from upright leading frame members 208a, 208b toward middle frame assembly 204. Top level longitudinal frame members 216a, 216b may have the same or similar diameters as upright leading frame members 208a, 208b. In certain embodiments, top level longitudinal frame members 216a, 216b may be integral with upright leading frame members 208a, 208b, respectively.

Forward frame assembly 202 includes a number of control arm mounting brackets to hingeably couple the inboard ends of control arms 218, 220, 222, 224 to middle level longitudinal frame members 214a, 214b and bottom level longitudinal frame members 210a, 210b. More specifically, forward frame assembly 202 includes forward and aft left upper control arm mounting brackets 226a, 226b coupled to left middle level longitudinal frame member 214a. The inboard ends of left upper control arm 218 are hingeably coupled to left middle level longitudinal frame member 214a via left upper control arm mounting brackets 226a, 226b. Forward frame assembly 202 includes forward and aft right upper control arm mounting brackets 228a, 228b coupled to right middle level longitudinal frame member 214b. The inboard ends of right upper control arm 222 are hingeably coupled to right middle level longitudinal frame member 214b via right upper control arm mounting brackets 228a, 228b. Forward frame assembly 202 includes forward and aft left lower control arm mounting brackets 230a, 230b coupled to left bottom level longitudinal frame member 210a. The inboard ends of left lower control arm 220 are hingeably coupled to left bottom level longitudinal frame member 210a via left lower control arm mounting brackets 230a, 230b. Forward frame assembly 202 includes forward and aft right lower control arm mounting brackets 232a, 232b coupled to right bottom level longitudinal frame member 210b. The inboard ends of right lower control arm 224 are hingeably coupled to right bottom level longitudinal frame member 210b via right lower control arm mounting brackets 232a, 232b. In some embodiments, forward upper control arm mounting brackets 226a, 228a may be formed from a single monolithic structural member, aft upper control arm mounting brackets 226b, 228b may be formed from a single monolithic structural member, forward lower control arm mounting brackets 230a, 232a may be formed from a single monolithic structural member and/or aft lower control arm mounting brackets 230b, 232b may be formed from a single monolithic structural member. Coupled atop bottom level longitudinal frame members 210a, 210b is a gear case, or differential gear case, 234 housing a front drive unit such as front drive unit 160 in FIG. 2B. For additional support, the top side of gear case 234 is coupled to the underside of middle level longitudinal frame members 214a, 214b. Gear case 234 receives the inboard ends of left and right half shafts 236, 238 to provide rotational energy to the front wheels of the off-road vehicle. The frame geometry of forward frame assembly 202 accommodates large gear cases to provide increased horsepower, although gear cases of any size may be installed in forward frame assembly 202.

One accessory often located on the front end of an off-road vehicle is a winch assembly. Winches installed on current off-road vehicles are integrated with the front bumper. For example, winches have been installed forward of the forward frame assembly and behind the front bumper such that the winch is sandwiched between the front bumper and the forward frame assembly and the fairlead is coupled to the front side of the front bumper. Additional components including a winch bracket are required to support the winch between the front bumper and the forward frame assembly, increasing the cost of parts for installation. In this existing configuration, the winch cannot be accessed for maintenance or replacement without removing numerous components on the front end of the off-road vehicle including the front bumper and winch bracket, resulting in additional installation time and labor costs. Also, replacing or repairing damage to the front bumper requires certain components of the winch assembly to be removed or replaced. In another current example, removable subframes have been fastened to the forward frame assembly and used to support a winch assembly, resulting in less desirable positioning and weaker structural support for the winch. Currently, winches are mounted such that the bolts retaining the winch are loaded in tension when the winch is in use, which contravenes the recommendations of certain winch manufacturers specifying that winch retaining bolts should be loaded in the shear direction.

Figure 6D:
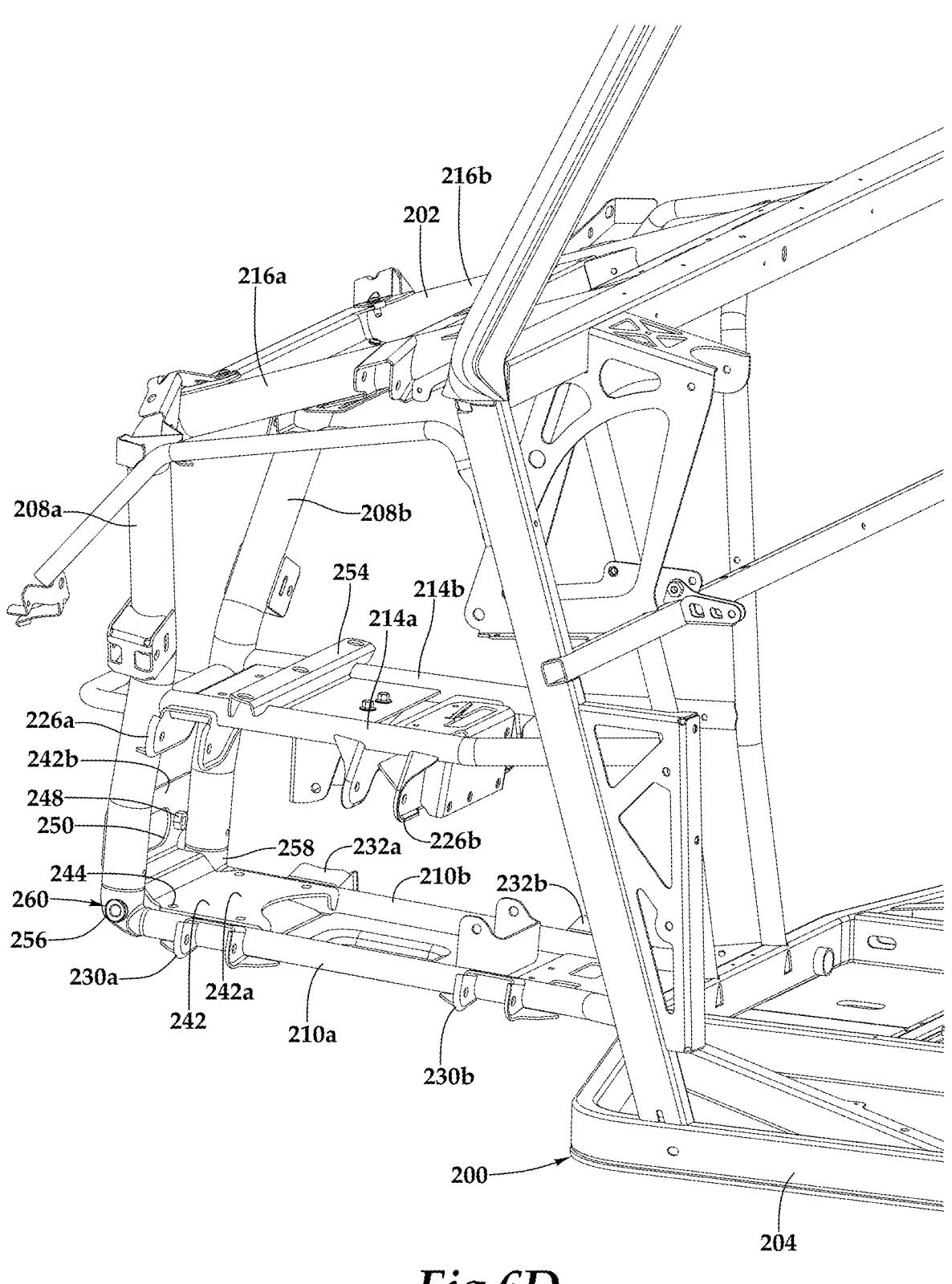

Winch assembly 240 of the illustrative embodiments is positioned to address these and other drawbacks of current winch installations. Winch assembly 240 includes a winch 240a including a winch motor, a fairlead 240b including roller guides and a winch cable (not shown). As best seen in FIG. 6D, a monolithic, or integral, winch-fairlead support plate 242 provides support for winch assembly 240. In the illustrated embodiment, winch-fairlead support plate 242 is a stamped plate, although winch-fairlead support plate 242 may be manufactured using any additive, subtractive or formative manufacturing technique. Winch-fairlead support plate 242 includes a horizontally-oriented winch support plate 242a coupled to the top sides of bottom level longitudinal frame members 210a, 210b. Winch 240a is coupled to bottom level longitudinal frame members 210a, 210b via winch support plate 242a. In addition to providing support for winch 240a, winch support plate 242a allows winch 240a to be conveniently bolted thereon using bolts accessible from the bottom of the off-road vehicle. The bolts are insertable through bolt holes 244 defined by winch support plate 242a. Thus, while under the off-road vehicle, winch 240a can be easily uninstalled by removing the bolts from bolt holes 244 and installed by inserting the bolts through bolt holes 244 to secure winch 240a to winch support plate 242a. Also in this configuration, the bottom side of winch 240a is bolted to the top of winch support plate 242a, which loads the bolts securing winch 240a in the shear direction during use. In alternative embodiments, winch support plate 242a may be coupled to the underside of bottom level longitudinal frame members 210a, 210b. In yet other embodiments, winch 240a may be coupled directly to bottom level longitudinal frame members 210a, 210b.

When coupled to bottom level longitudinal frame members 210a, 210b, winch 240a is positioned aft of upright leading frame members 208a, 208b, which provides protection for winch 240a and eliminates the need for winch 240a to be installed between forward frame assembly 202 and the front bumper of the off-road vehicle. Because winch 240a is protected by the fixed frame assembly 200 of the off-road vehicle, and is enclosed within its confines, winch 240a need not be mounted onto a removable frame assembly of the vehicle. In the illustrated embodiment, winch 240a is horizontally interposed between gear case 234 and upright leading frame members 208a, 208b. As best seen in FIG. 6C, winch 240a also has the same elevation 246 as both gear case 234 and fairlead 240b. As best seen in FIG. 6B, winch 240a has a higher elevation than lower control arm mounting brackets 230a, 230b, 232a, 232b and the inboard ends of lower control arms 220, 224. Winch 240a has a lower elevation than upper control arm mounting brackets 226a, 226b, 228a, 228b and the inboard ends of upper control arms 218, 222. Winch 240a is also positioned at substantially the same elevation as the inboard ends of half shafts 236, 238.

Winch-fairlead support plate 242 also includes a vertically-oriented fairlead support plate 242b coupled to the forward sides of upright leading frame members 208a, 208b. Fairlead 240b is coupled to the forward sides of upright leading frame members 208a, 208b via fairlead support plate 242b using one or more fasteners such as bolts 248. From the front view of FIG. 6B, fairlead support plate 242b is interposed between upright leading frame members 208a, 208b. Fairlead 240b is positioned forward of upright leading frame members 208a, 208b such that upright leading frame members 208a, 208b are horizontally interposed between fairlead 240b and winch 240a. In other embodiments, fairlead support plate 242b may be coupled to the aft side of upright leading frame members 208a, 208b or fairlead 240b may be coupled directly to upright leading frame members 208a, 208b. Fairlead support plate 242b defines an aperture 250 through which the winch cable of winch assembly 240 passes. While winch-fairlead support plate 242 is illustrated as a monolithic structure, in other embodiments winch support plate 242a and fairlead support plate 242b may be separate structures independently coupled to bottom level longitudinal frame members 210a, 210b and upright leading frame members 208a, 208b, respectively. In some implementations, winch-fairlead support plate 242 may be pre-installed on off-road vehicles in factory assembly, thereby reducing the cost and installation time required to afterward install winch assembly 240 on the off-road vehicle. Mounting winch assembly 240 to forward frame assembly 202 as described reduces the number of factory parts required to install winch assembly 240 and reduces or altogether eliminates the need for aftermarket installation components. Because winch assembly 240 including winch 240a and fairlead 240b are mounted independent of the front bumper of the off-road vehicle, the front bumper need not be removed when installing or removing winch assembly 240, and damage to the front bumper does not necessitate the removal of winch assembly 240 or supporting components.

The cooling system of the off-road vehicle includes a radiator 252 positioned above winch 240a and gear case 234. Forward frame assembly 202 includes a radiator bottom support bar 254 coupled atop middle level longitudinal frame members 214a, 214b. The bottom end of radiator 252 is coupled to middle level longitudinal frame members 214a, 214b via radiator bottom support bar 254. In other embodiments, the bottom end of radiator 252 may be directly coupled to middle level longitudinal frame members 214a, 214b. The top end of radiator 252 is coupled to top level longitudinal frame members 216a, 216b. Thus, radiator 252 is interposed between top level longitudinal frame members 216a, 216b and middle level longitudinal frame members 214a, 214b. Radiator 252 is also positioned aft of upright leading frame members 208a, 208b, enclosing radiator 252 within forward frame assembly 202 and therefore affording additional protection for radiator 252.

In current off-road vehicles, the lower front end of the forward frame assembly may be particularly susceptible to damage as the off-road vehicle encounters debris while traveling. Damage to the lower front end of the forward frame assembly may require costly replacement of some or all of the large tubular frame members forming the forward frame assembly. In addition, the lower front end of the forward frame assembly on current off-road vehicles provides limited or no accessory mounting options for vehicle accessories such as plows or protector plates, and may also fail to provide adequate spacing for front end components such as a winch or gear case. To address these and other drawbacks of current off-road vehicles, forward frame assembly 202 includes left and right elbow joints 256, 258 each defining one or more utility holes 260.

Figure 7A:
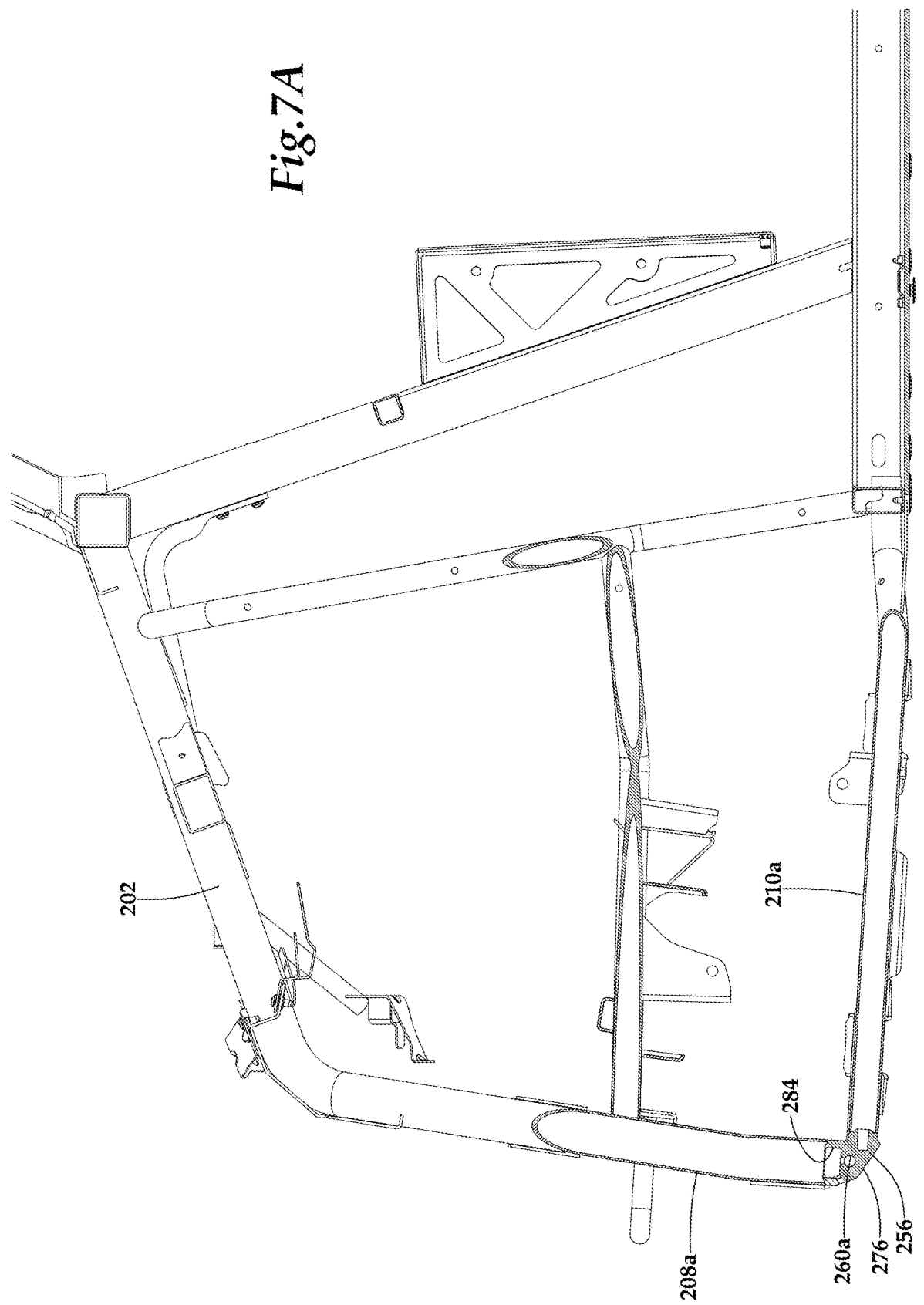
FIGS. 7A-7C are various views of a forward frame assembly for an off-road vehicle including elbow joints in accordance with embodiments of the present disclosure.
Figure 7B:
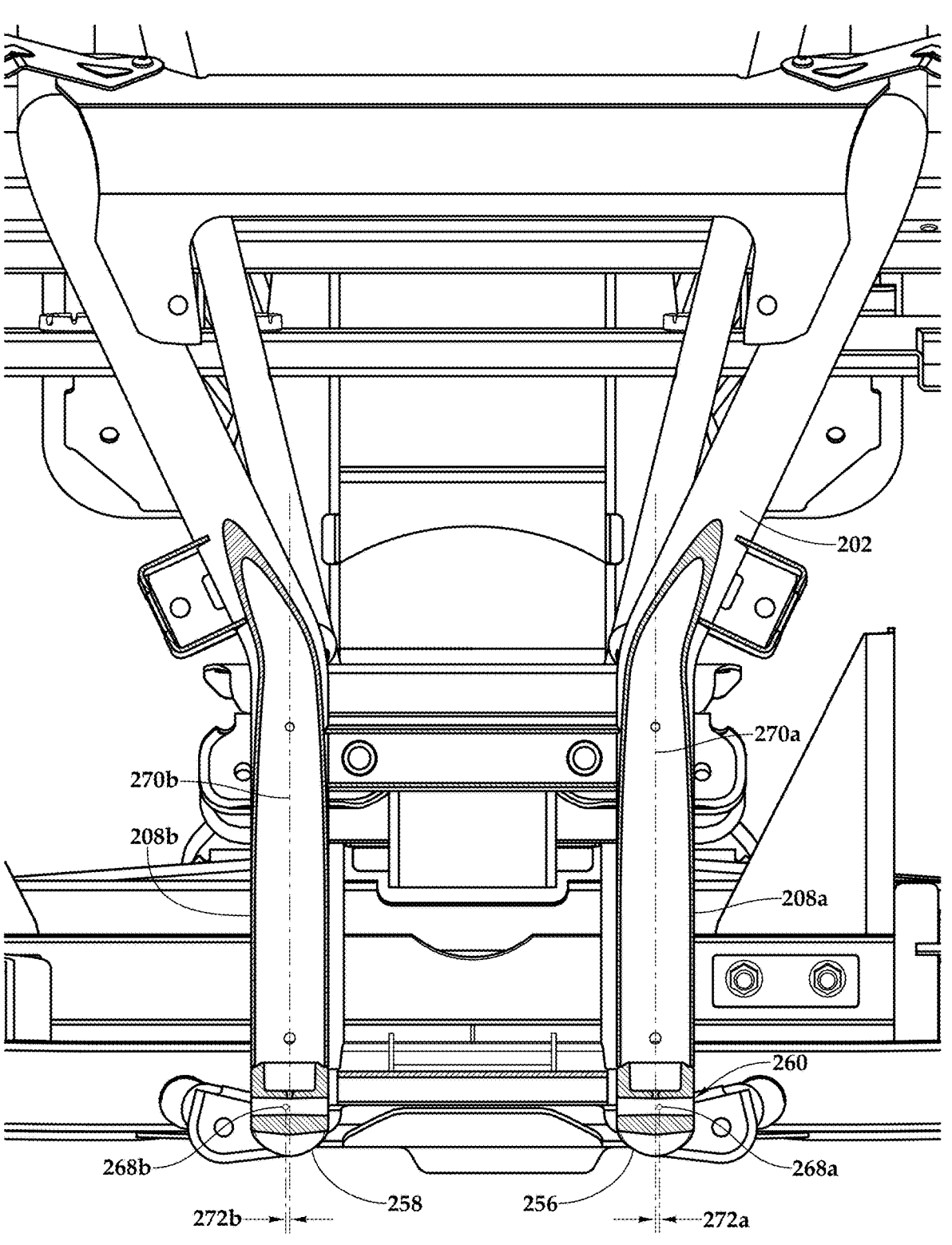
Figure 7C:
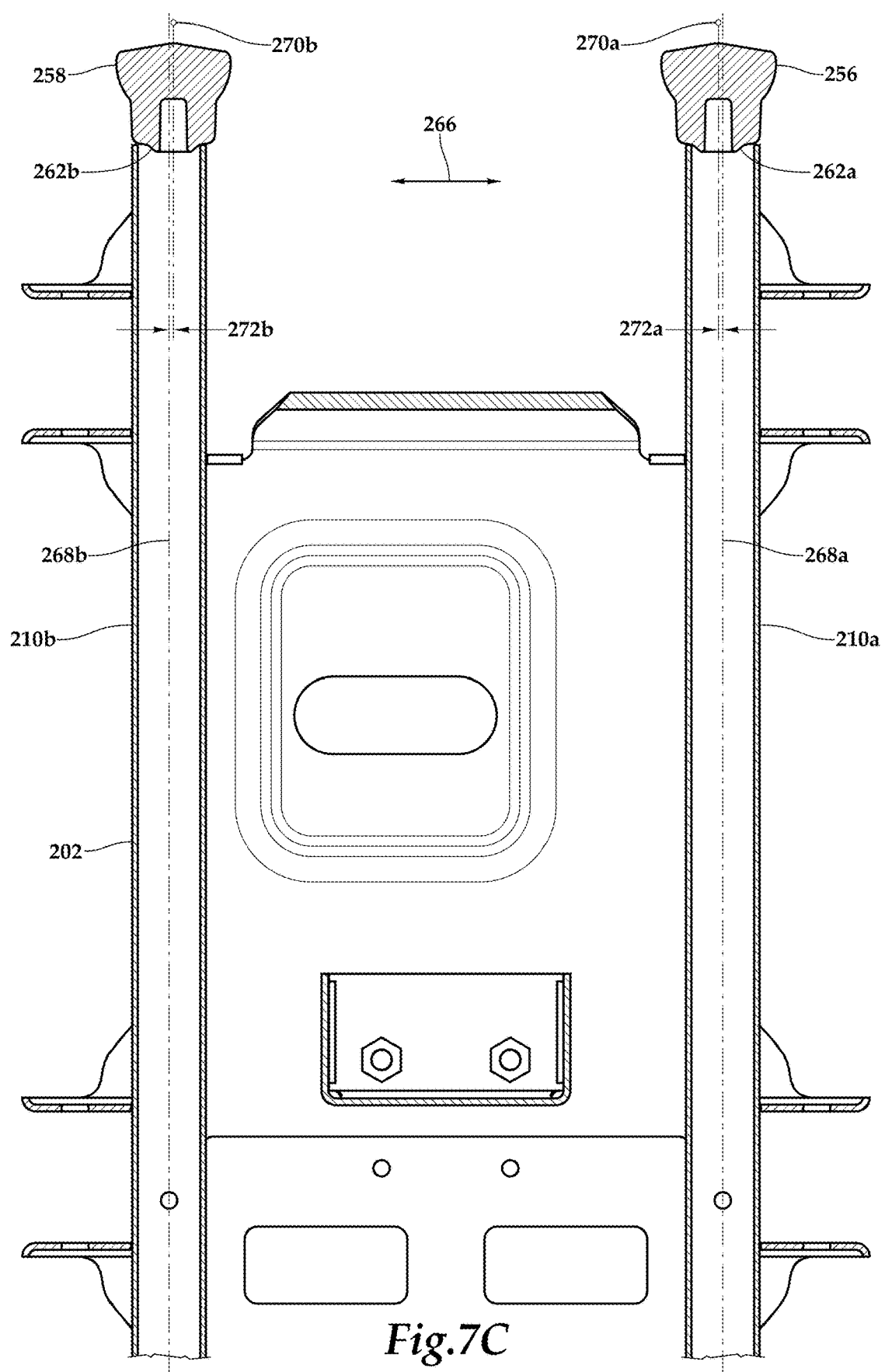

Referring additionally to FIGS. 7A-7C in the drawings, various views of forward frame assembly 202 are depicted. Specifically, FIG. 7A is a cross-sectional view taken along line 7A-7A of FIG. 6B, FIG. 7B is a cross-sectional view taken along line 7B-7B in FIG. 6C and FIG. 7C is a cross-sectional view taken along line 7C-7C in FIG. 6C, with certain non-frame components removed for ease of reference. The rear side of left elbow joint 256 is coupled to the forward end of left bottom level longitudinal frame member 210*a* and the top side of left elbow joint 256 is coupled to the bottom end of left upright leading frame member 208*a* such that left bottom level longitudinal frame member 210*a* is coupled to left upright leading frame member 208*a* via left elbow joint 256. Similarly, the rear side of right elbow joint 258 is coupled to the forward end of right bottom level longitudinal frame member 210*b* and the top side of right elbow joint 258 is coupled to the bottom end of right upright leading frame member 208*b* such that right bottom level longitudinal frame member 210*b* is coupled to right upright leading frame member 208*b* via right elbow joint 258. Elbow joints 256, 258 may be welded to upright leading frame members 208*a*, 208*b* and bottom level longitudinal frame members 210*a*, 210*b*, respectively.

Referring additionally to FIGS. 8A-8E in the drawings, various views of left elbow joint 256 are illustrated. Left elbow joint 256 is substantially similar or identical to right elbow joint 258 therefore, for sake of efficiency, certain features will be disclosed only with regard to left elbow joint 256. One having ordinary skill in the art, however, will fully appreciate an understanding of right elbow joint 258 based upon the disclosure herein of left elbow joint 256. The rear side of left elbow joint 256 defines an attachment nipple 262*a* to which the forward end of left bottom level longitudinal frame member 210*a* is welded or otherwise coupled. Attachment nipple 262*a* is noncircular and has an oval shape with a horizontally-oriented major axis. In other embodiments, attachment nipple 262*a* may have an elliptical, polygonal, circular, irregular or other shape. A weight-saving cavity 264 is defined at the center of attachment nipple 262*a*. As best seen in FIG. 7C, the noncircular shape of attachment nipples 262*a*, 262*b* allows the forward ends of bottom level longitudinal frame members 210*a*, 210*b* to be welded or otherwise coupled to the rear sides of elbow joints 256, 258 in a plurality of different lateral positions in the lateral direction 266 of the off-road vehicle, providing flexibility to the structural arrangement of forward frame assembly 202. The symmetrical shape of attachment nipples 262*a*, 262*b* allows elbow joints 256, 258 to be used interchangeably on either side of forward frame assembly 202, reducing the different part types needed for assembly.

In the illustrated embodiment, bottom level longitudinal frame members 210*a*, 210*b* have been moved outboard to provide additional room for other components of the off-road vehicle. More particularly, longitudinal centerlines 268*a*, 268*b* of bottom level longitudinal frame members 210*a*, 210*b* are offset in the outboard direction from longitudinal centerlines 270*a*, 270*b* of upright leading frame members 208*a*, 208*b* by offset distances 272*a*, 272*b*, respectively. Thus, longitudinal centerlines 270*a*, 270*b* of upright leading frame members 208*a*, 208*b* are inboard of longitudinal centerlines 268*a*, 268*b* of bottom level longitudinal frame members 210*a*, 210*b*. In one non-limiting example, offset distances 272*a*, 272*b* are each in a range between one millimeter and thirteen millimeters such as eight millimeters. In addition, longitudinal centerlines 270*a*, 270*b* of upright leading frame members 208*a*, 208*b* are substantially aligned with longitudinal centerlines 274 of elbow joints 256, 258 while longitudinal centerlines 268*a*, 268*b* of bottom level longitudinal frame members 210*a*, 210*b* are offset in the outboard direction from longitudinal centerlines 274 of elbow joints 256, 258 by offset distances 272*a*, 272*b*. Pushing bottom level longitudinal frame members 210*a*, 210*b* in the outboard direction allows upright leading frame members 208*a*, 208*b* to maintain a large diameter while providing additional space for other components of the off-road vehicle such as winch support plate 242*a*, winch 240*a* and/or gear case 234. For example, with bottom level longitudinal frame members 210*a*, 210*b* offset in the outboard direction, bolt holes 244 defined by winch support plate 242*a* may be properly positioned for receiving the bolts that secure winch 240*a* to winch support plate 242*a*. The positioning flexibility provided by attachment nipples 262*a*, 262*b* also allows the distance between upright leading frame members 208*a*, 208*b* to be maintained to preserve the geometry of upper control arms 218, 222 and allow for the alignment of the inboard CV joints of half shafts 236, 238 with the inboard joints for control arms 218, 220, 222, 224, as previously described in FIG. 2C. In alternative configurations, longitudinal centerlines 268*a*, 268*b* of bottom level longitudinal frame members 210*a*, 210*b* may be offset in the inboard direction from longitudinal centerlines 270*a*, 270*b* of upright leading frame members 208*a*, 208*b* by desired offset distances.

As best seen in FIG. 8B, the front of elbow joint 256 defines a multiplanar forward deflection surface 276 including an upper planar surface 276*a* along plane 278*a* and a lower planar surface 276*b* along plane 278*b*, which intersects plane 278*a*. Plane 278*b*, along which lower planar surface 276*b* lies, may form any acute angle 280*a* with horizontal reference plane 282 including, in some examples, an angle in a range between 10 degrees and 80 degrees such as 30 degrees, 45 degrees or 60 degrees. In the illustrated embodiment, plane 278*a*, along which upper planar surface 276*a* lies, forms a larger acute angle 280*b* with horizontal reference plane 282 than plane 278*b*. Forward deflection surface 276 deflects debris and obstacles often impacting the lower front ends of forward frame assemblies of off-road vehicles during operation, providing resilience to forward frame assembly 202. In other embodiments, forward deflection surface 276 may be a single-plane forward deflection surface, or alternatively may define more than two planar surfaces. Elbow joints 256, 258 may be cast elbow joints. In other embodiments, elbow joints 256, 258 may be manufactured using any additive, subtractive or formative manufacturing technique including, but not limited to, extrusion, machining, 3D printing, laser cutting, stamping or welding as well as others.

Elbow joints 256, 258 each include one or more utility holes 260 that may be used for a variety of purposes. As best seen in FIGS. 8A-8E, elbow joint 256 defines a through-hole 260*a* laterally traversing elbow joint 256 and oriented along lateral direction 266 of the off-road vehicle. The inboard end of through-hole 260*a* defines an inboard utility hole 260*b* on the inboard surface of elbow joint 256. The outboard end of through-hole 260*a* defines an outboard utility hole 260*c* on the outboard surface of elbow joint 256. The top side of elbow joint 256 defines an inner chamber 284. As best seen in FIG. 7A, inner chamber 284 is interposed between left upright leading frame member 208*a* and through-hole 260*a*, which defines inboard and outboard utility holes 260*b*, 260*c*. Forward deflection surface 276 defines a forward utility hole 260*d* providing fluid communication between inner chamber 284 and the front of elbow joint 256. Passageway 284*a* provides fluid communication between inner chamber 284 and through-hole 260*a*. Thus, inner chamber 284 fluidly intercouples, or provides fluid communication between, inboard utility hole 260*b*, outboard utility hole 260*c* and forward utility hole 260*d*. In some embodiments, the fluid intercoupling of utility holes 260*b*, 260*c*, 260*d* via inner chamber 284 allows fluid that drains into inner chamber 284 during manufacturing or operation to be discharged via utility holes 260b, 260c, 260d. For example, paints, sealants or other coatings applied to upright leading frame members 208a, 208b during manufacturing may drip onto elbow joint 256 and into inner chamber 284 then drain out of inner chamber 284 via utility holes 260b, 260c, 260d. In the illustrated embodiment, inboard and outboard utility holes 260b, 260c are accessory mounting holes and forward utility hole 260d is a drain hole, although liquid may drain out of inner chamber 284 via any combination of utility holes 260b, 260c, 260d. Thus, drainage capability may still be provided by utility holes 260b, 260c, 260d if one or two of utility holes 260b, 260c, 260d becomes clogged. In another example, drain hole 260d drains inner chamber 284 if inboard and outboard utility holes 260b, 260c are being used to mount an accessory for the off-road vehicle. Depending on the embodiment, each utility hole 260b, 260c, 260d may be either a drain hole or an accessory mounting hole, in any combination. In some embodiments, inboard utility hole 260b and/or outboard utility hole 260c, when being used as accessory mounting holes, may be internally-threaded to form a threaded and secure connection with one or more accessories. Inboard and outboard utility holes 260b, 260c provide multiple mounting options for a wide array of vehicle accessories.

Figure 9B:
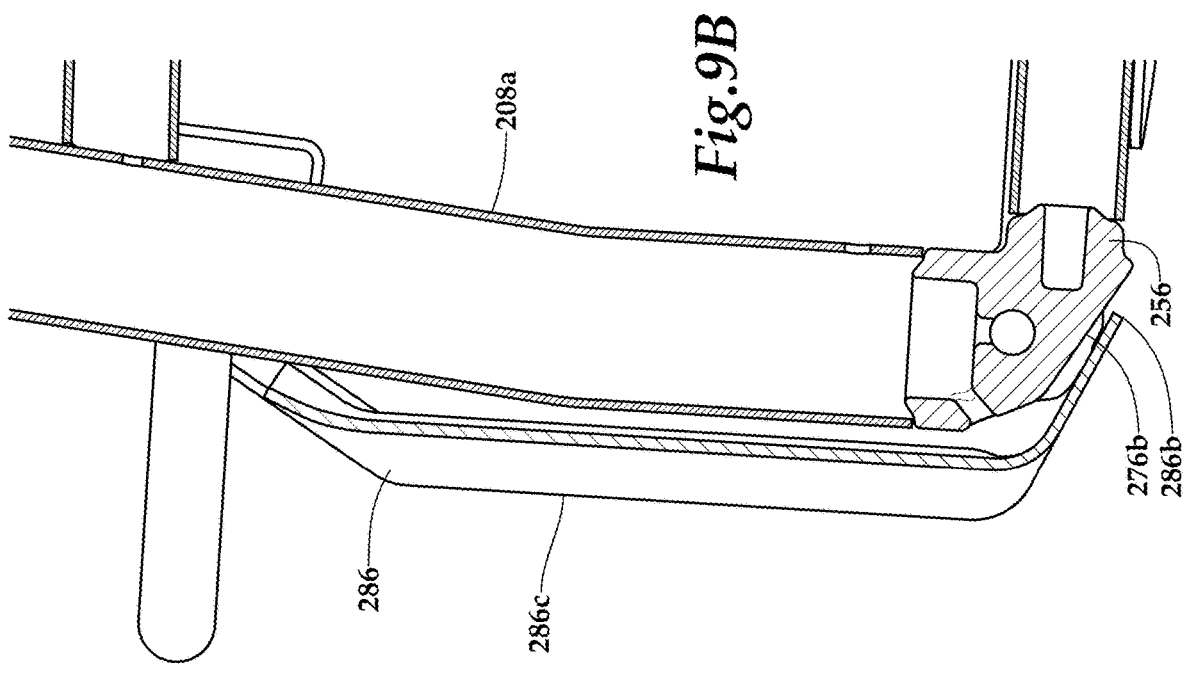
FIGS. 9A-9C are various views of a forward frame assembly for an off-road vehicle including elbow joints supporting a forward protector plate in accordance with embodiments of the present disclosure.
Figure 9A:
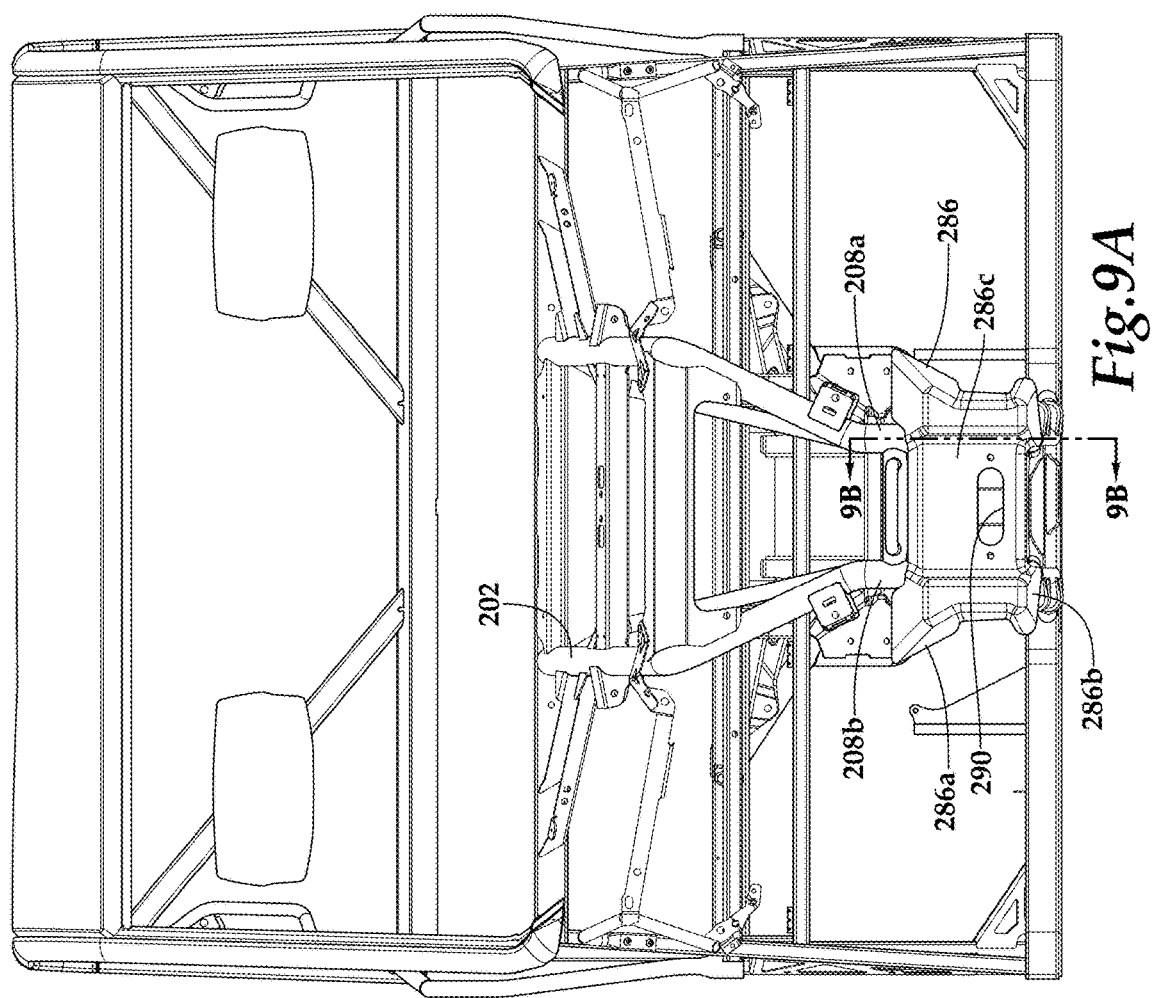
Figure 9C:
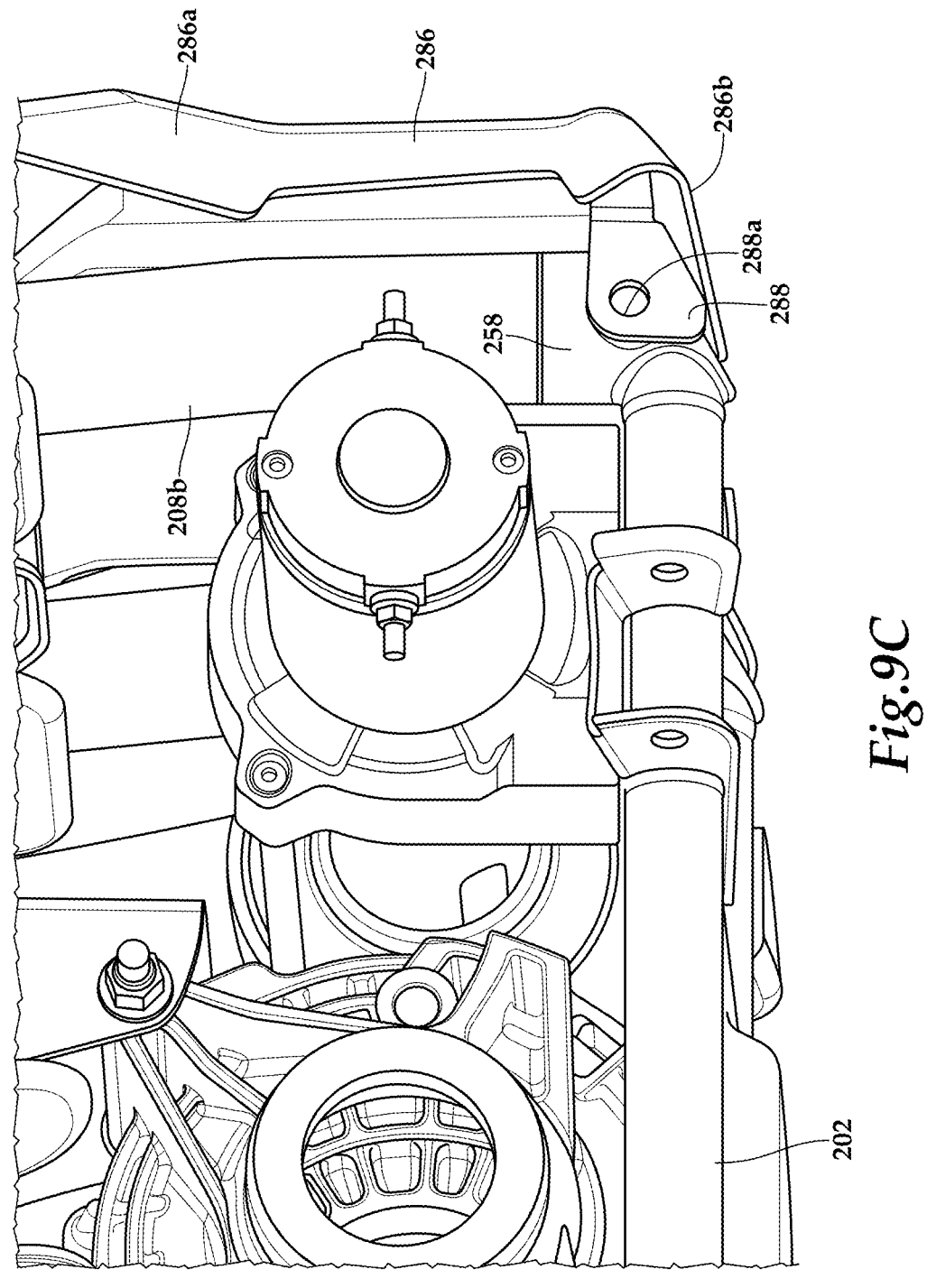

Referring additionally to FIGS. 9A-9C in the drawings, a forward protector plate, or skid plate, 286 is coupled to elbow joints 256, 258 to provide additional protection to forward frame assembly 202 including upright leading frame members 208a, 208b and elbow joints 256, 258. As best seen in FIG. 9A, forward protector plate 286 is wider than the bottom span of upright leading frame members 208a, 208b to provide adequate protection thereto. The top edge, sides edges 286a and bottom edge 286b of forward protector plate 286 are angled aftward. The bottom portion of forward protector plate 286 includes mounting brackets 288 defining fastener holes 288a. Forward protector plate 286 is mounted to forward frame assembly 202 by fastening or otherwise coupling mounting brackets 288 to outboard utility holes 260c of elbow joints 256, 258. In alternative embodiments, forward protector plate 286 may be mounted to forward frame assembly 202 by fastening or otherwise coupling mounting brackets 288 to inboard utility holes 260b of elbow joints 256, 258. As best seen in FIG. 9B, bottom edge 286b of forward protector plate 286 has a higher elevation than the bottom edge of elbow joints 256, 258, thereby preventing forward protector plate 286 from collecting debris or hindering the movement of the off-road vehicle when traveling in reverse. In other embodiments, however, bottom edge 286b of forward protector plate 286 may have the same or lower elevation than the bottom edge of elbow joints 256, 258. Bottom edge 286b of forward protector plate 286 is also substantially parallel with lower planar surface 276b of elbow joints 256, 258. The center portion of forward protector plate 286 is a fairlead support plate 286c onto which fairlead 240b may be fastened. Fairlead support plate 286c defines an aperture 290 through which the winch cable of winch assembly 240 passes. Forward protector plate 286 as well as elbow joints 256, 258 are cheaper and more convenient to replace in the event that the lower front end of forward frame assembly 202 is damaged during operation. For example, forward protector plate 286 and elbow joints 256, 258 are cheaper and more convenient to replace than upright leading frame members 208a, 208b and bottom level longitudinal frame members 210a, 210b. A wide array of vehicle accessories other than forward protector plate 286 may be mounted to forward frame assembly 202 using utility holes 260 of elbow joints 256, 258. For example, winch support plate 242a and/or fairlead support plate 242b may be mounted to inboard and/or outboard utility holes 260b, 260c of elbow joints 256, 258. In another non-limiting example, a front bumper or plow may be mounted to inboard and/or outboard utility holes 260b, 260c of elbow joints 256, 258.

Figure 10A:
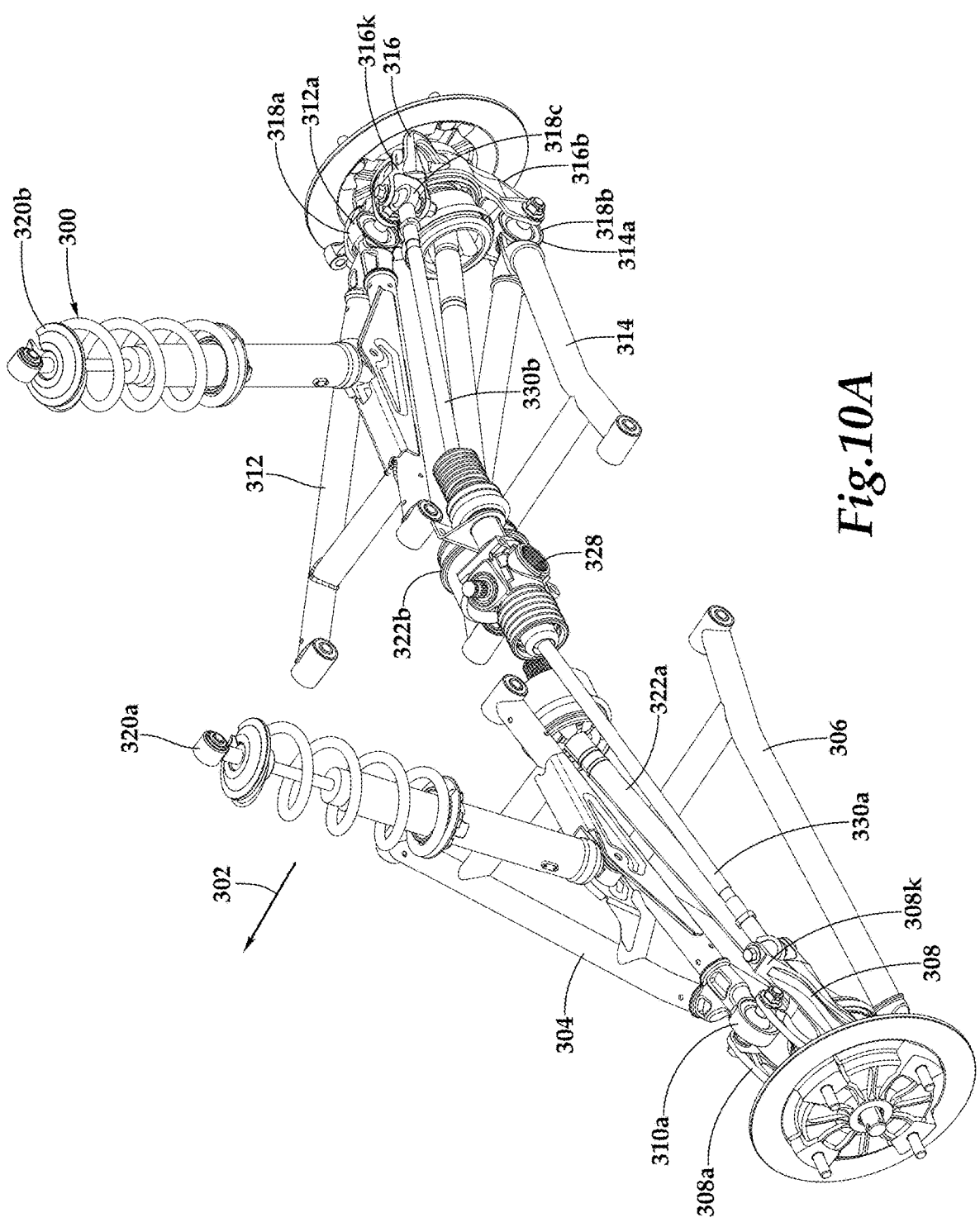
FIGS. 10A-10C are various views of a steering and front suspension system for an off-road vehicle in accordance with embodiments of the present disclosure.
Figure 10B:
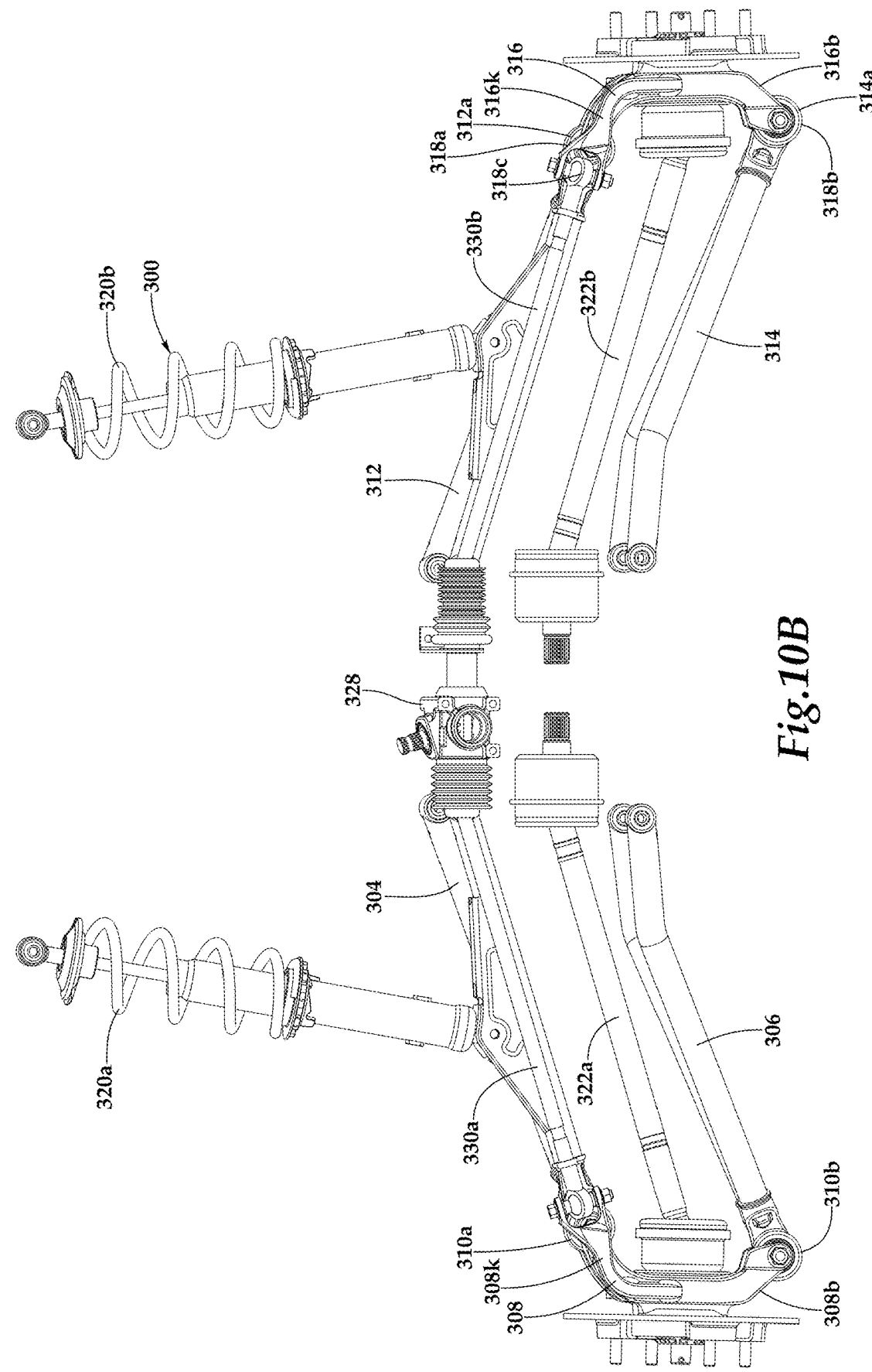
Figure 10C:
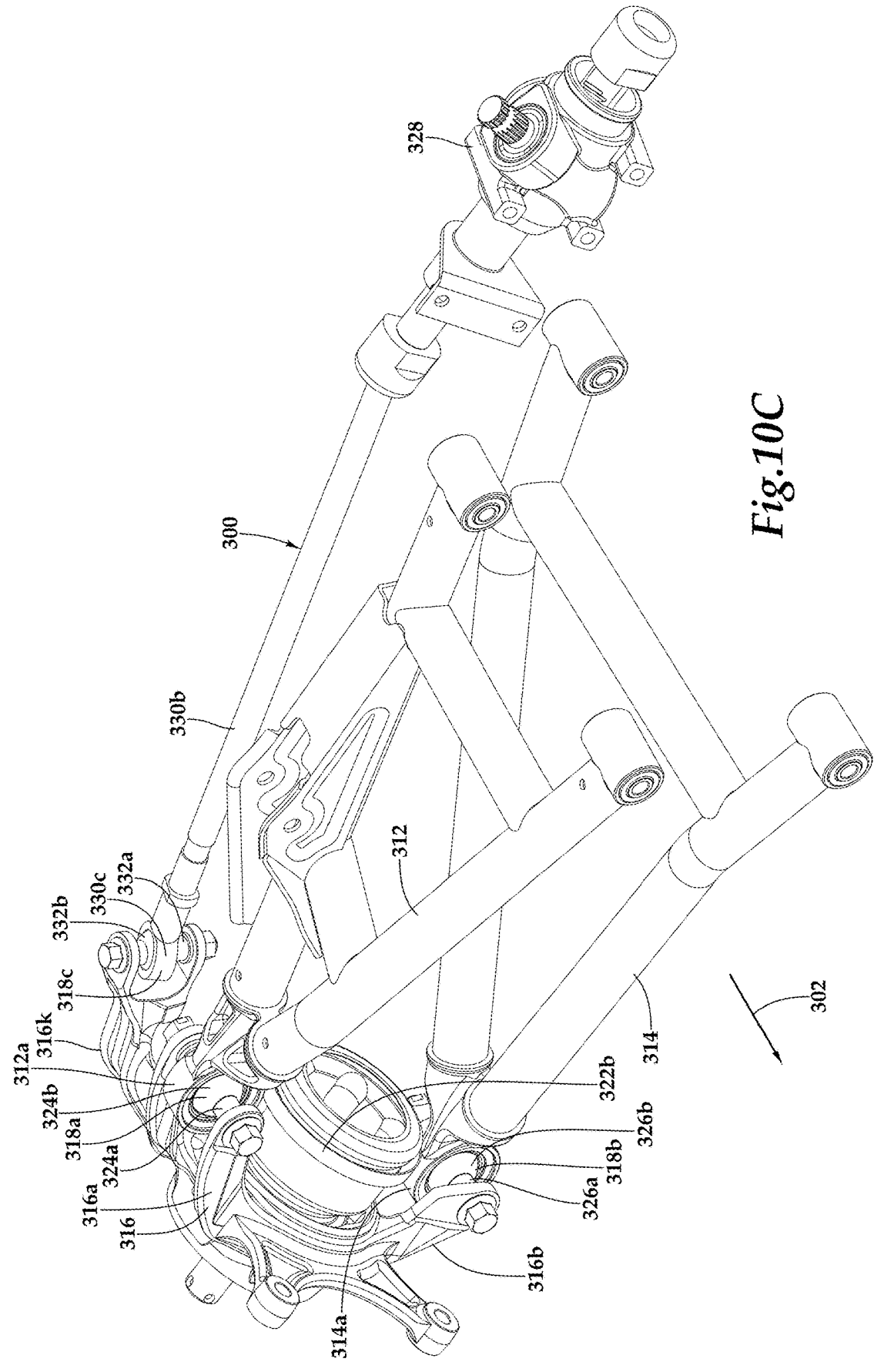

Referring to FIGS. 10A-10C in the drawings, a front suspension system 300 as well as steering and drivetrain components of an off-road vehicle such as off-road vehicle 10 in FIGS. 1A-1E are schematically illustrated. FIG. 10A is an isometric view of front suspension system 300 with the forward direction of the off-road vehicle indicated by forward arrow 302. FIG. 10B is a rear view of front suspension system 300. FIG. 10C is an isometric view of the right side of front suspension system 300 with the forward direction of the off-road vehicle indicated by forward arrow 302. Front suspension system 300 includes left upper and lower control arms 304, 306 having outboard ends coupled to a left knuckle 308. Left knuckle 308 includes an upper control arm connector arm 308a and a lower control arm connector arm 308b to which the outboard ends of left upper and lower control arms 304, 306 are rotatably coupled via spherical joints 310a, 310b, respectively. Front suspension system 300 also includes right upper and lower control arms 312, 314 having outboard ends coupled to right knuckle 316. Right knuckle 316 includes upper control arm connector arm 316a and lower control arm connector arm 316b to which the outboard ends of right upper and lower control arms 312, 314 are rotatably coupled via spherical joints 318a, 318b, respectively. The inboard ends of control arms 304, 306, 312, 314 are pivotably coupled to the forward frame assembly of the off-road vehicle such as forward frame assembly 202 in FIGS. 6A-6D. Control arms 304, 306, 312, 314 are each depicted as an A-arm. Front suspension system 300 also includes shock absorbers 320a, 320b having bottom ends pivotably coupled to upper control arms 304, 312 and top ends coupled to the forward frame assembly of the off-road vehicle. Front suspension system 300 is shown in the compressed position under normal riding conditions. The drivetrain of the off-road vehicle includes front left and right half shafts 322a, 322b providing rotational energy from a front drive unit to the front tires of the off-road vehicle.

Referring additionally to FIGS. 11A-11D in the drawings, various views of right knuckle 316 are illustrated. Right knuckle 316 and the right side of front suspension system 300 as depicted in FIGS. 10C and 11A-11D are substantially similar to left knuckle 308 and the left side of front suspension system 300 therefore, for sake of efficiency, certain features will be disclosed only with regard to right knuckle 316 and the right side of front suspension system 300. One having ordinary skill in the art, however, will fully appreciate an understanding of left knuckle 308 and the left side of front suspension system 300 based upon the disclosure herein of right knuckle 316 and the right side of front suspension system 300. Knuckle 316 has a center annulus 316c defining a center hub aperture 316d. Center hub aperture 316d receives the outboard end of half shaft 322b. The top side of knuckle 316 defines upper control arm connector arm 316a, which has a curved profile protruding upward and inboard from the top side of center annulus 316c. Upper control arm connector arm 316a defines a clevis 316e having leading and trailing prongs 316f, 316g. A bolt 324a having a leading end coupled to leading prong 316f of clevis 316e and a trailing end coupled to trailing prong 316g of clevis 316e secures a ball swivel 324b. The outboard end of upper control arm 312 includes an annular casing 312a that receives ball swivel 324*b* to form spherical joint 318*a*. Thus, spherical joint 318*a* is interposed between leading and trailing prongs 316*f*, 316*g* of clevis 316*e*. Annular casing 312*a* is vertically-oriented and defines an aperture into which ball swivel 324*b* is received. An axis passing through the aperture about which annular casing 312*a* is formed is substantially parallel with the longitudinal direction or dimension of the off-road vehicle. The bottom side of knuckle 316 defines lower control arm connector arm 316*b*, which protrudes downward and inboard from the bottom side of center annulus 316*c*. Lower control arm connector arm 316*b* defines a clevis 316*h* having leading and trailing prongs 316*i*, 316*j*. A bolt 326*a* having a leading end coupled to leading prong 316*i* of clevis 316*h* and a trailing end coupled to trailing prong 316*j* of clevis 316*h* secures a ball swivel 326*b*. The outboard end of lower control arm 314 includes an annular casing 314*a* that receives ball swivel 326*b* to form spherical joint 318*b*. Thus, spherical joint 318*b* is interposed between leading and trailing prongs 316*i*, 316*j* of clevis 316*h*. Annular casing 314*a* is vertically-oriented and defines an aperture into which ball swivel 326*b* is received. An axis passing through the aperture about which annular casing 314*a* is formed is substantially parallel with the longitudinal direction or dimension of the off-road vehicle.

The steering system for the off-road vehicle includes a steering rack assembly 328 and left and right tie rods 330*a*, 330*b* having inboard ends coupled to steering rack assembly 328. In steering systems for current off-road vehicles, the tie rods connecting the steering rack assembly to the knuckles may be vulnerable to damage by oncoming debris due to placement of the tie rods forward of the knuckles and/or at a low elevation relative to the ground. Furthermore, the tie rods used in many current steering systems are connected to the knuckles with a tapered joint that provides no fail-safe mechanism for ensuring steering integrity in the event of a joint failure. The current positioning of tie rods on off-road vehicles may also limit the amount of space allowed for other components supported by the forward frame assembly. The outboard end of tie rod 330*b* is coupled to tie rod connector arm 316*k*, which is defined by the aft side of knuckle 316, to position tie rod 330*b* in a manner that addresses these and other drawbacks of current steering systems. Tie rod connector arm 316*k* protrudes from an aft surface of the upper aft diagonal corner of center annulus 316*c* such that tie rod connector arm 316*k* is positioned closer to upper control arm connector arm 316*a* than lower control arm connector arm 316*b*. Tie rod connector arm 316*k* includes a proximal segment 316*l* protruding in an upward and aft direction and a distal segment 316*m* protruding in an inboard and slightly upward direction. Tie rod connector arm 316*k* also includes an intermediate twisting segment 316*n* between proximal and distal segments 316*l*, 316*m*. A support webbing 316*o* between upper control arm connector arm 316*a* and tie rod connector arm 316*k* is shaped to provide structural support to tie rod connector arm 316*k*.

Figures 11A, 11B:
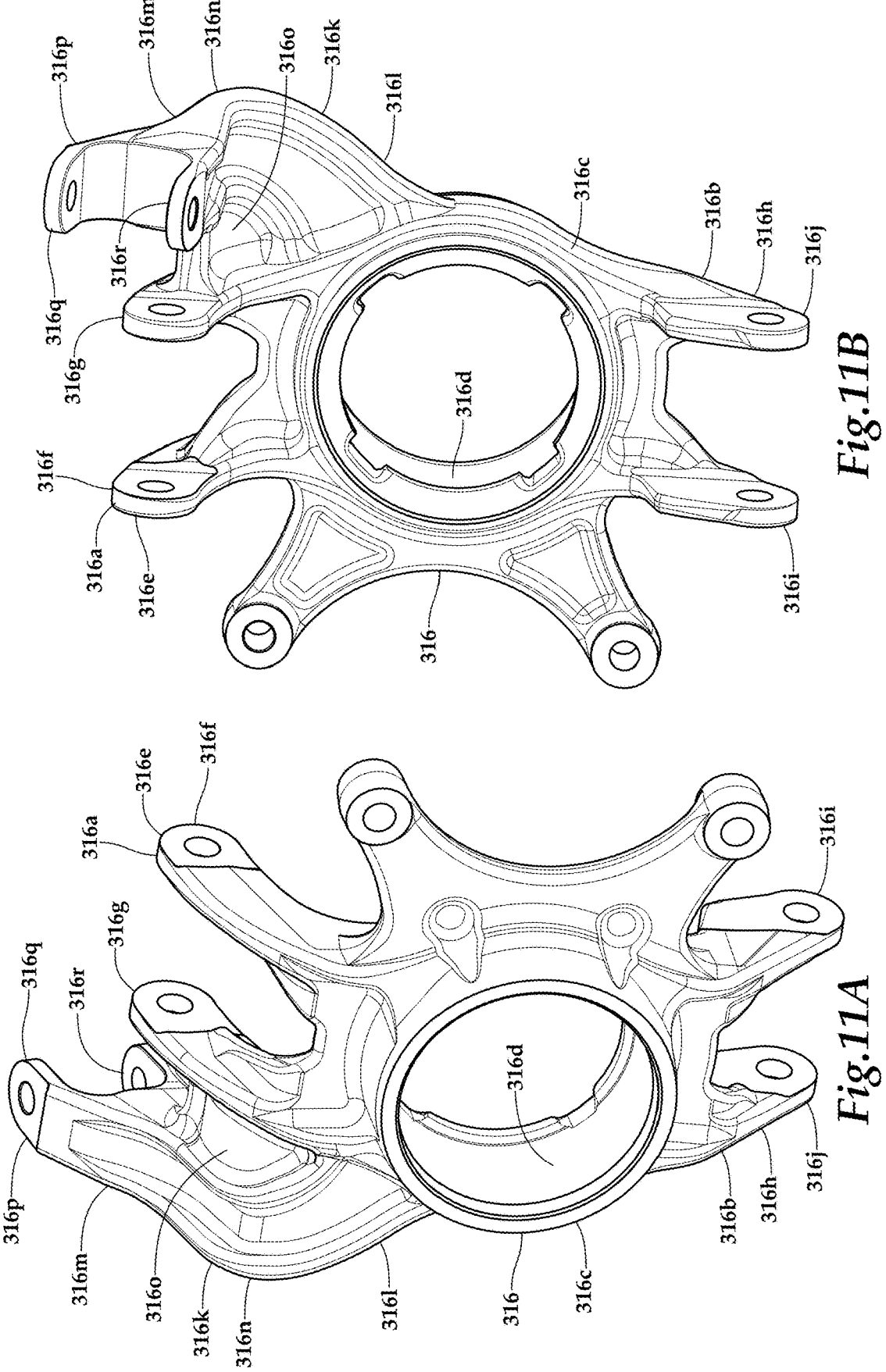
FIGS. 11A-11D are various views of a knuckle for an off-road vehicle in accordance with embodiments of the present disclosure.
Figures 11C, 11D:
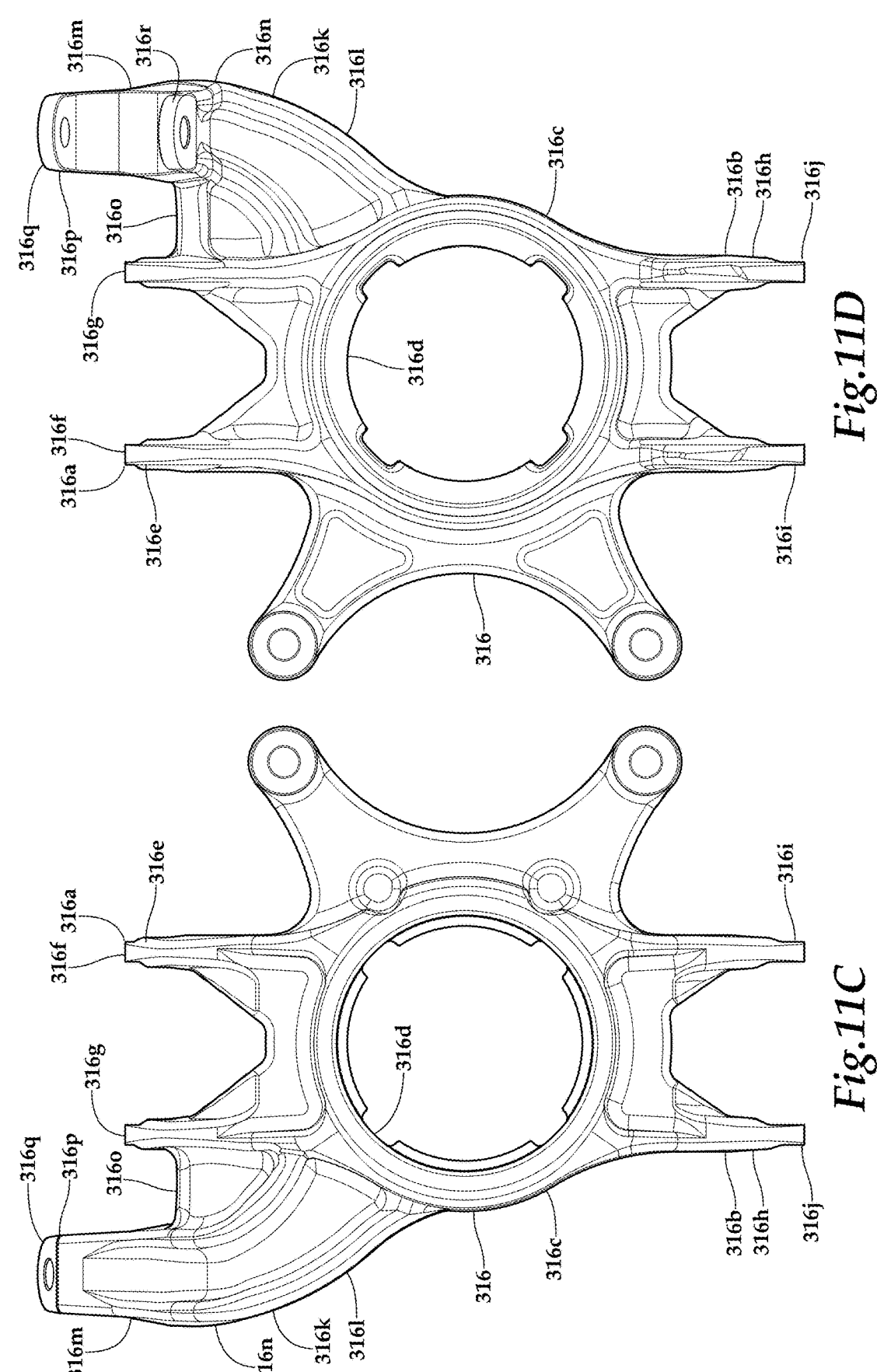

The distal end of tie rod connector arm 316*k*, which is positioned aft of center annulus 316*c* and has a higher elevation than center annulus 316*c*, defines a clevis 316*p* including top prong 316*q* and bottom prong 316*r*. Top and bottom prongs 316*q*, 316*r* point in an inboard direction of the off-road vehicle. Overall, tie rod connector arm 316*k* has a curved profile that twists approximately or substantially 90 degrees from the aft surface of center annulus 316*c* to the inboard direction of prongs 316*q*, 316*r*. As best seen in FIG. 11D, clevis 316*p* defined by the distal end of tie rod connector arm 316*k* has substantially the same elevation as clevis 316*e* defined by upper control arm connector arm 316*a*. In addition, the distal end of tie rod connector arm 316*k* has a higher elevation than the outboard end of half shaft 322*b*. A bolt 332*a* having a top end coupled to top prong 316*q* of clevis 316*p* and a bottom end coupled to bottom prong 316*r* of clevis 316*p* secures a ball swivel 332*b*. The outboard end of tie rod 330*b* defines an annular casing 330*c* that receives ball swivel 332*b* to form spherical joint 318*c*, which may be a type of ball joint, heim joint, rose joint or rod end bearing. Thus, spherical joint 318*c* and constituent parts thereof including ball swivel 332*b* and annular casing 330*c* are interposed between top and bottom prongs 316*q*, 316*r* of clevis 316*p*. Bolt 332*a* captures annular casing 330*c* if spherical joint 318*c* fails such as if ball swivel 332*b* becomes dislodged from annular casing 330*c*. Thus, bolt 332*a* prevents the outboard end of tie rod 330*b* from completely detaching from knuckle 316 in the event of failure of spherical joint 318*c*, ensuring at least a base level of driving and steering functionality should spherical joint 318*c* fail. Spherical joint 318*c* is also less complex and therefore more reliable than traditional tapered joints currently used to secure tie rods.

The aft positioning of tie rod connector arm 316*k* as described herein positions tie rods 330*a*, 330*b* in a unique rear steer configuration with spatial and protective benefits. As best seen in FIG. 10B, the distal ends of tie rod connector arms 308*k*, 316*k* to which the outboard ends of tie rods 330*a*, 330*b* are coupled position tie rods 330*a*, 330*b* such that tie rods 330*a*, 330*b* have substantially the same elevation as upper control arms 304, 312, respectively. In the compressed position of front suspension system 300, the distal ends of tie rod connector arms 308*k*, 316*k* are positioned such that the inboard ends of tie rods 330*a*, 330*b* have a higher elevation than the outboard ends of tie rods 330*a*, 330*b*. The inboard ends of upper control arms 304, 312 have a higher elevation than the outboard ends of upper control arms 304, 312 such that tie rods 330*a*, 330*b* and upper control arms 304, 312 have substantially the same slope, respectively. In addition, the inboard ends of half shafts 322*a*, 322*b* have a higher elevation than the outboard ends of half shafts 322*a*, 322*b* such that tie rods 330*a*, 330*b* and half shafts 322*a*, 322*b* have substantially the same slope, respectively. Tie rods 330*a*, 330*b* are also substantially parallel with upper control arms 304, 312, respectively. Such positioning of tie rods 330*a*, 330*b* moves tie rods 330*a*, 330*b* higher off the ground during operation, thereby protecting tie rods 330*a*, 330*b* from interference by ground elements such as rocks, trees and other debris. The positioning of tie rods 330*a*, 330*b* directly behind upper control arms 304, 312 offers further protection for tie rods 330*a*, 330*b* from debris coming from the forward direction of the off-road vehicle. The protection afforded tie rods 330*a*, 330*b* in the illustrative embodiments lessens the likelihood that tie rods 330*a*, 330*b* will be bent or otherwise damaged during operation. In addition, the placement of tie rods 330*a*, 330*b* along upper control arms 304, 312 provides additional room for other components and systems of the off-road vehicle such as gear case 234 and winch 240*a* in FIGS. 6A-6C.

Figure 12A:
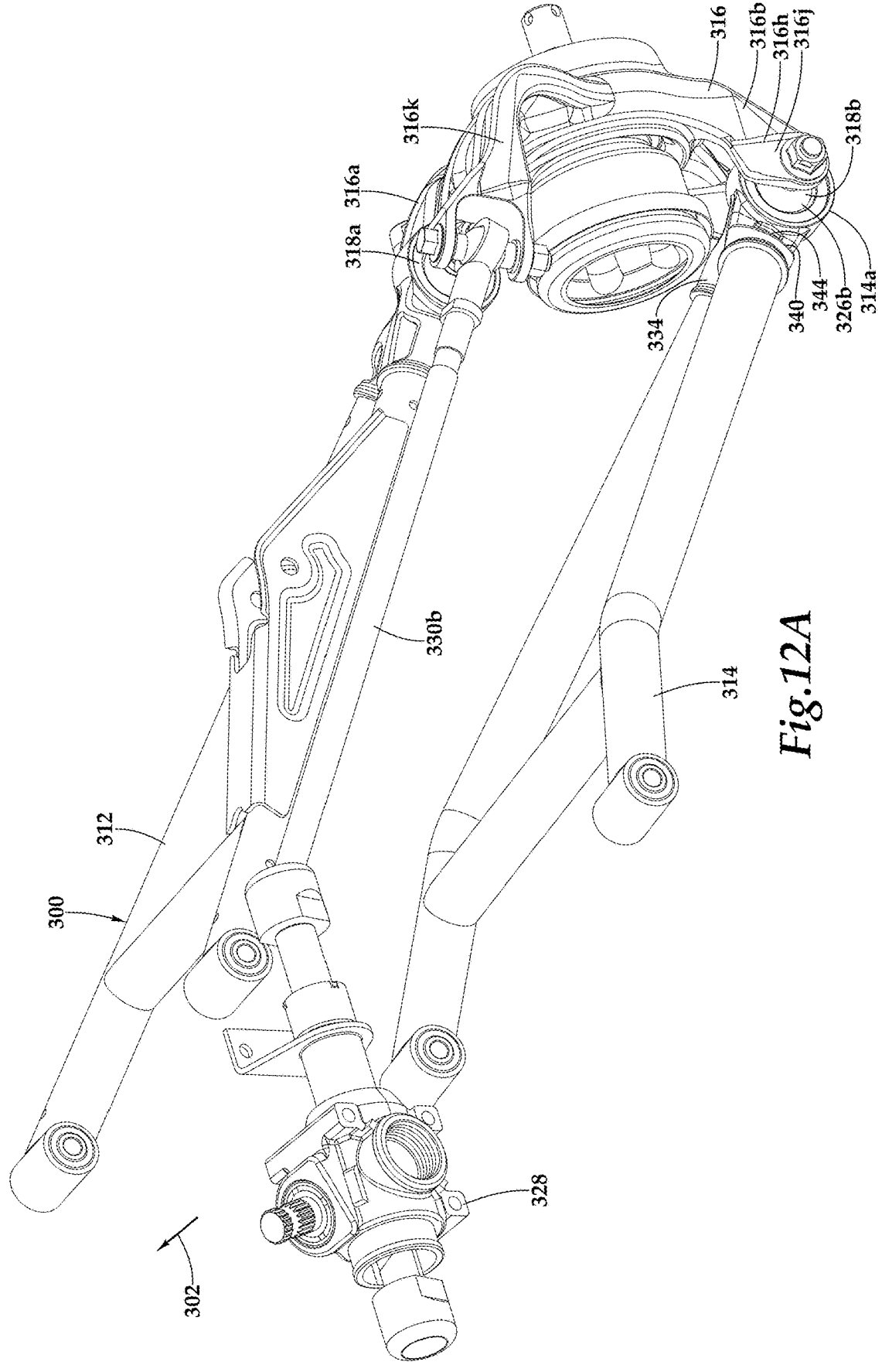
FIGS. 12A-12B are various views of a front suspension system for an off-road vehicle, the front suspension system including steering stops in accordance with embodiments of the present disclosure.
Figure 12B:
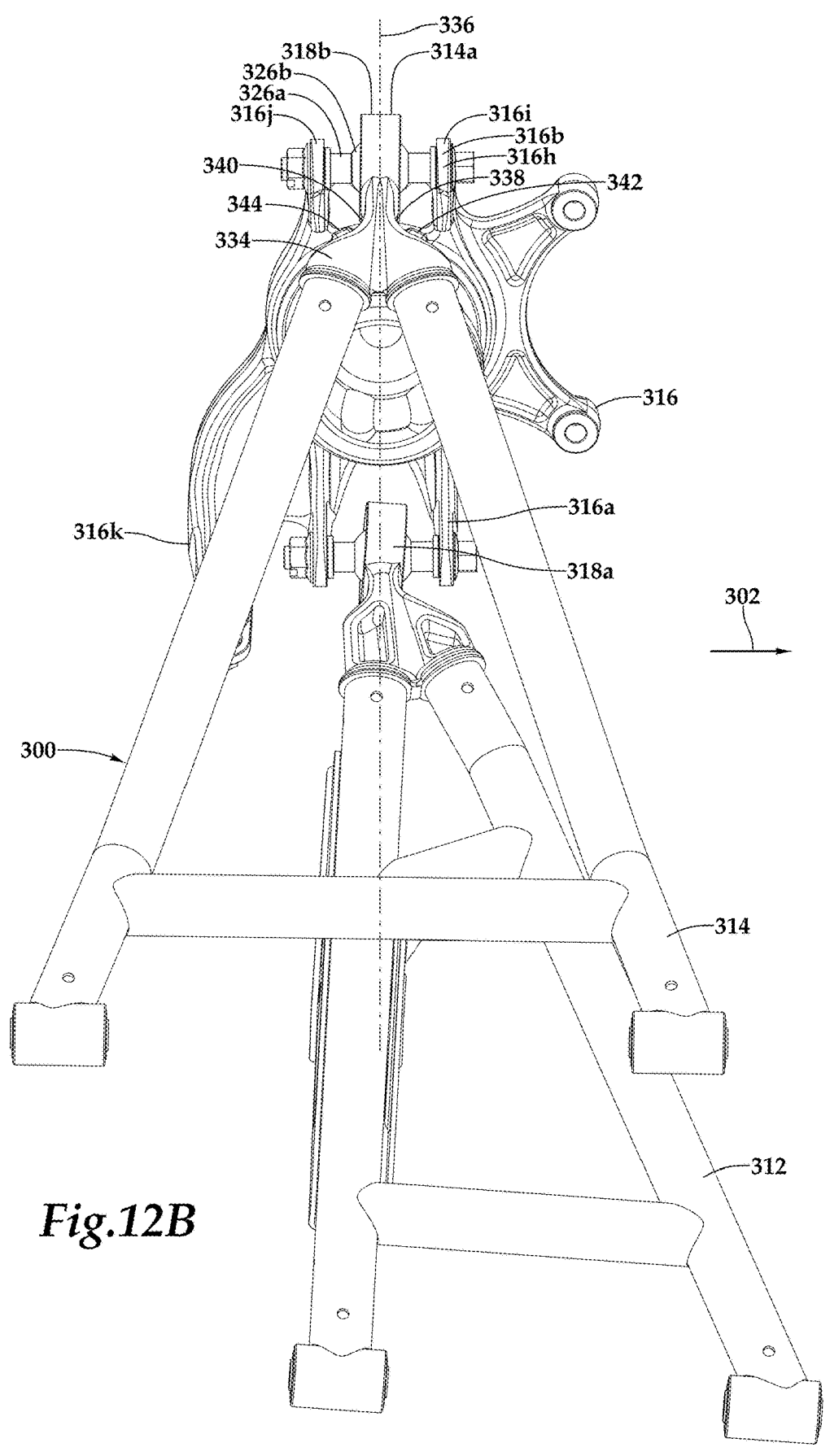

Referring additionally to FIGS. 12A-12B in the drawings, various views of the right side of front suspension system 300 in the dropout position are illustrated. FIG. 12A is an isometric view of the right side of front suspension system 300 with the forward direction of the off-road vehicle indicated by forward arrow 302. FIG. 12B is a bottom view of the right side of front suspension system 300 with the forward direction of the off-road vehicle indicated by forward arrow 302. The right side of front suspension system

300 is substantially similar to the left side of front suspension system 300 therefore, for sake of efficiency, certain features will be disclosed only with regard to the right side of front suspension system 300. One having ordinary skill in the art, however, will fully appreciate an understanding of the left side of front suspension system 300 based upon the disclosure herein of the right side of front suspension system 300. Right upper and lower control arms 312, 314 have outboard ends coupled to right knuckle 316. The outboard end of lower control arm 314 includes a knuckle fitting 334. In the illustrated embodiment, knuckle fitting 334 is depicted as a separate component coupled at the outboard end of lower control arm 314, although in other embodiments knuckle fitting 334 may be monolithic, or integral, with lower control arm 314. Knuckle 316 includes upper control arm connector arm 316a and lower control arm connector arm 316b to which the outboard ends of upper and lower control arms 312, 314 are rotatably coupled via spherical joints 318a, 318b, respectively. The inboard ends of control arms 312, 314 are pivotably coupled to the forward frame assembly of the off-road vehicle such as forward frame assembly 202 in FIGS. 6A-6D. Lower control arm connector arm 316b defines clevis 316h having leading and trailing prongs 316i, 316j. Bolt 326a has a leading end coupled to leading prong 316i of clevis 316h and a trailing end coupled to trailing prong 316j of clevis 316h to secure ball swivel 326b. Knuckle fitting 334, at the outboard-most end of lower control arm 314, includes annular casing 314a that receives ball swivel 326b to form spherical joint 318b. Thus, spherical joint 318b is interposed between leading and trailing prongs 316i, 316j of clevis 316h. Annular casing 314a is substantially aligned along a bisecting centerline 336 of lower control arm 314. The inboard end of tie rod 330b is coupled to steering rack assembly 328. The outboard end of tie rod 330b is coupled to the distal end of tie rod connector arm 316k of knuckle 316. As described in FIG. 4, front suspension system 300 is moveable between a plurality of vertical positions including a compressed position in which shock absorbers 320a, 320b are compressed and a dropout, or lockout, position in which shock absorbers 320a, 320b are fully extended. FIGS. 12A-12B show the right side of front suspension system 300 in the dropout position.

Figure 13B:
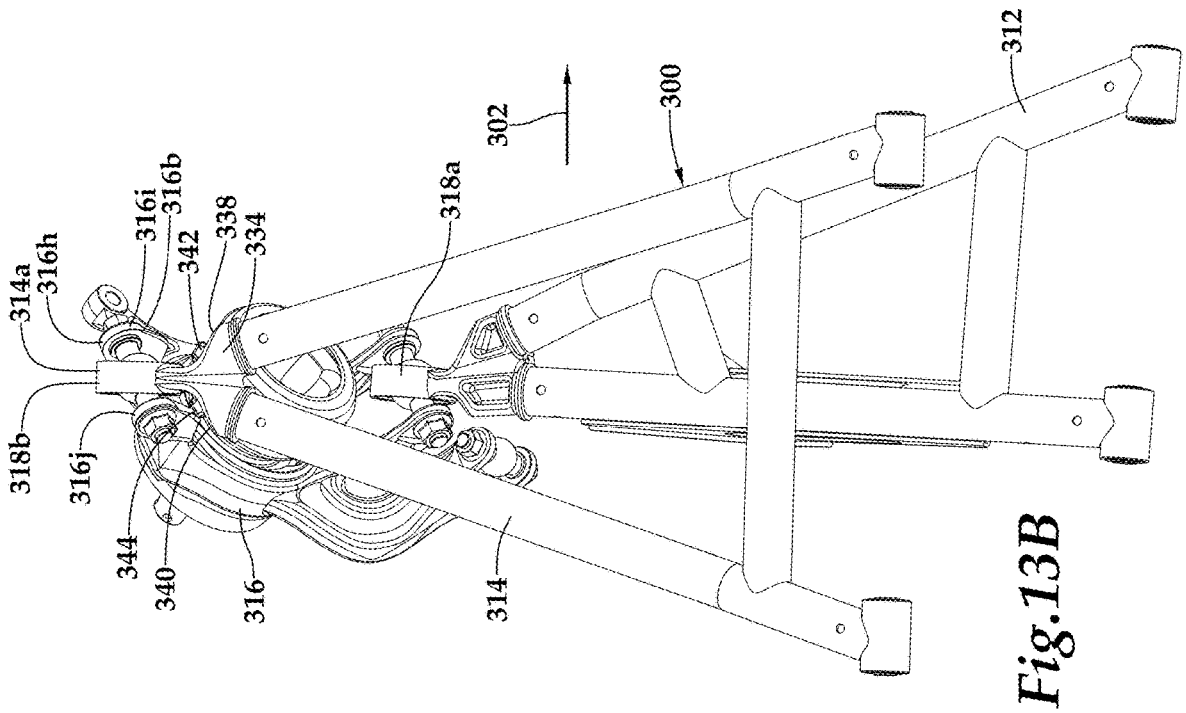
FIGS. 13A-13D are various views of a front suspension system for an off-road vehicle engaging steering stops in left and right turning positions in accordance with embodiments of the present disclosure.
Figure 13A:
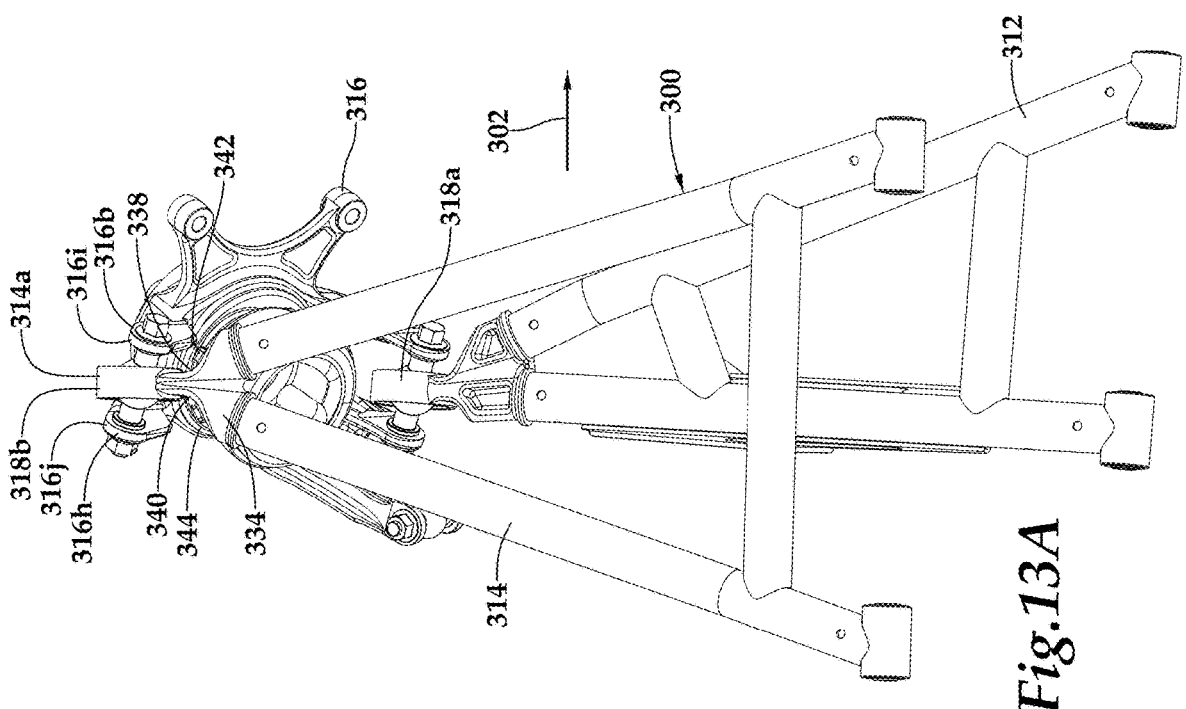
Figure 13C:
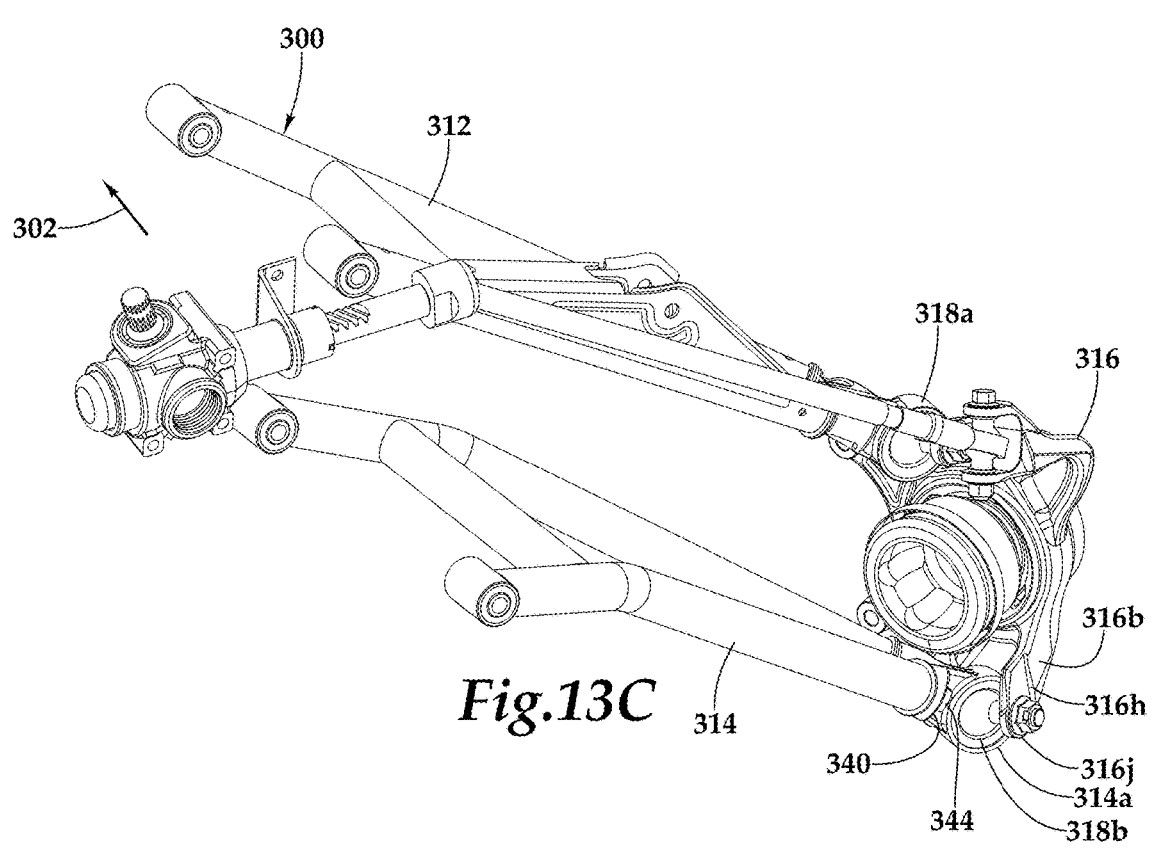
Figure 13D:
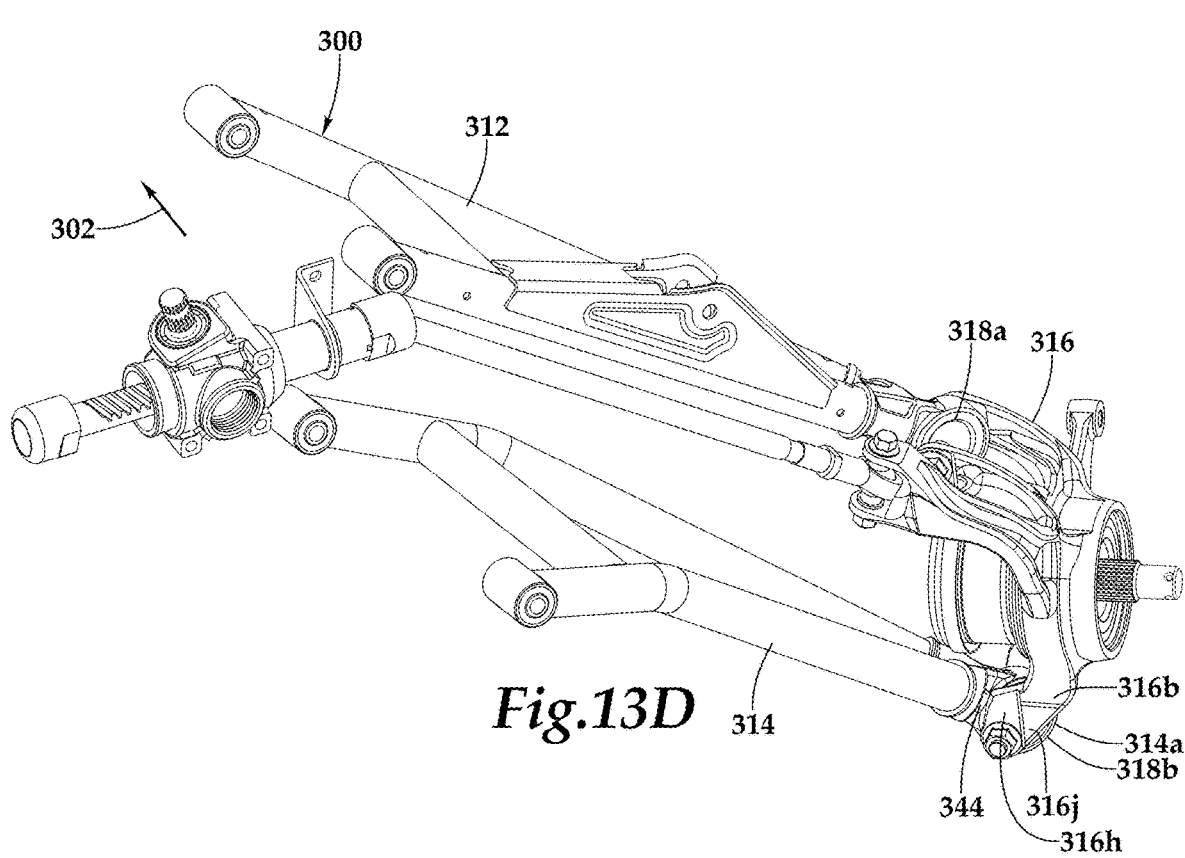

Referring additionally to FIGS. 13A-13D in the drawings, knuckle 316 is shown to have a pivoting range of motion between a plurality of positions in the dropout position of front suspension system 300 including the forward position shown in FIGS. 13A and 13C and the aft position shown in FIGS. 13B and 13D. FIGS. 13A-13B are bottom views of the right side of front suspension system 300 and FIGS. 13C-13D are isometric views of the right side of front suspension system 300, with the forward direction of the off-road vehicle indicated by forward arrow 302 for ease of reference. The forward position of knuckle 316 corresponds to a left turn position of the off-road vehicle and the aft position of knuckle 316 corresponds to a right turn position of the off-road vehicle. In some cases, knuckle 316 may naturally pivot as front suspension system 300 moves vertically from the compressed position shown in FIGS. 10A-10C to the dropout position shown in FIGS. 12A-12B and 13A-13D. Current off-road vehicles may fail to adequately protect the joints between the control arms and knuckles when the front suspension system is in the vertically lower dropout position, and current attempts to do so may limit the pivoting range of motion of the knuckles in a normal riding and compressed position of the front suspension system. Front suspension system 300 addresses these and other drawbacks of current off-road vehicles.

At the outboard end of lower control arm 314 but inboard of annular casing 314a, knuckle fitting 334 defines a leading ramp, or cutout, 338 forward of annular casing 314a and a trailing ramp 340 aft of annular casing 314a. Leading ramp 338 tapers away from annular casing 314a in the forward direction to define a generally forward and outboard-facing surface and trailing ramp 340 tapers away from annular casing 314a in the aft direction to define a generally aft and outboard-facing surface. Leading and trailing ramps 338, 340 increase the pivoting range of motion of knuckle 316 in both the compressed and dropout positions of front suspension system 300 by allowing leading and trailing prongs 316i, 316j of lower control arm connector arm 316b to pivot unhindered by the outboard end of lower control arm 314. More specifically, leading ramp 338 receives, or makes room for, leading prong 316i of clevis 316h when knuckle 316 is in the forward position and trailing ramp 340 receives trailing prong 316j of clevis 316h when knuckle 316 is in the aft position. While leading and trailing ramps 338, 340 facilitate the pivoting range of motion of knuckle 316, over-articulation of lower spherical joint 318b as well as upper spherical joint 318a in the dropout position of front suspension system 300 may cause spherical joints 318a, 318b to sustain damage or fail altogether.

To limit articulation of spherical joints 318a, 318b in the dropout position of front suspension system 300, knuckle fitting 334 at the outboard end of lower control arm 314 includes leading and trailing steering stops 342, 344. Leading steering stop 342 is positioned on the forward and outboard-facing surface defined by leading ramp 338 such that leading steering stop 342 is a bump-out that protrudes in a forward and outboard direction. Trailing steering stop 344 is positioned on the aft and outboard-facing surface defined by trailing ramp 340 such that trailing steering stop 344 is a bump-out that protrudes in an aft and outboard direction. Leading and trailing steering stops 342, 344 are positioned inboard of annular casing 314a and spherical joint 318b. Leading steering stop 342 is forward of annular casing 314a and trailing steering stop 344 is aft of annular casing 314a. In some embodiments, leading and trailing steering stops 342, 344 are monolithic, or integral, with knuckle fitting 334, although in other embodiments leading and trailing steering stops 342, 344 may be separate parts that are coupled to knuckle fitting 334. Leading and trailing steering stops 342, 344 limit the pivoting range of motion of knuckle 316 in the dropout position of front suspension system 300. As best seen in FIGS. 13A and 13C, leading steering stop 342 contacts leading prong 316i of clevis 316h of lower control arm connector arm 316b in the forward position of knuckle 316. As best seen in FIGS. 13B and 13D, trailing steering stop 344 contacts trailing prong 316j of clevis 316h of lower control arm connector arm 316b in the aft position of knuckle 316. Due to the pivot-limiting function of leading and trailing steering stops 342, 344, the forward and aft positions of knuckle 316 shown in FIGS. 13A-13D are the forwardmost and aftmost positions of knuckle 316 in the dropout position of front suspension system 300. In some embodiments, leading and trailing steering stops 342, 344 may include an elastomeric outer coating to protect leading and trailing prongs 316i, 316j from damage. The elastomeric outer coating may include rubber, plastic or any polymer or elastomer. Leading and trailing steering stops 342, 344 limit articulation of spherical joints 318a, 318b and act as a fail-safe to protect spherical joints 318a, 318b in the dropout position of front suspension system 300. Limiting the articulation of spherical joints 318a, 318b using leading and trailing steering stops 342, 344 in the manner described does not limit the pivotability of knuckle 316 in the compressed position of front suspension system 300, ensuring a full steering range of motion during normal riding operation. In alternative embodiments, leading and trailing steering stops 342, 344 may alternatively or additionally be included on the outboard end of upper control arm 312 inboard of spherical joint 318a.

Figure 14A:
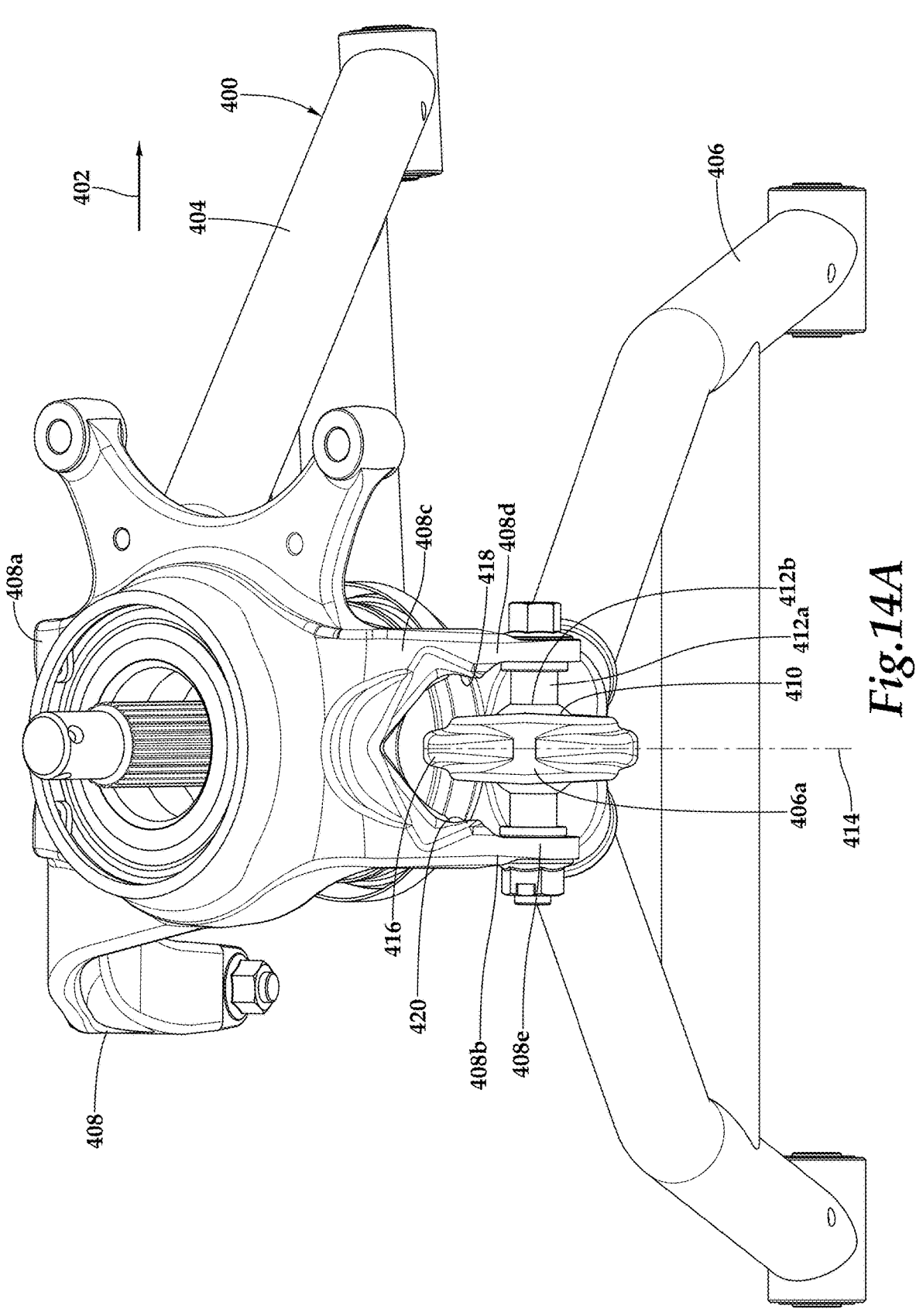
FIGS. 14A-14B are various views of a front suspension system for an off-road vehicle, the front suspension system including a steering fin and steering stops in accordance with embodiments of the present disclosure.
Figure 14B:
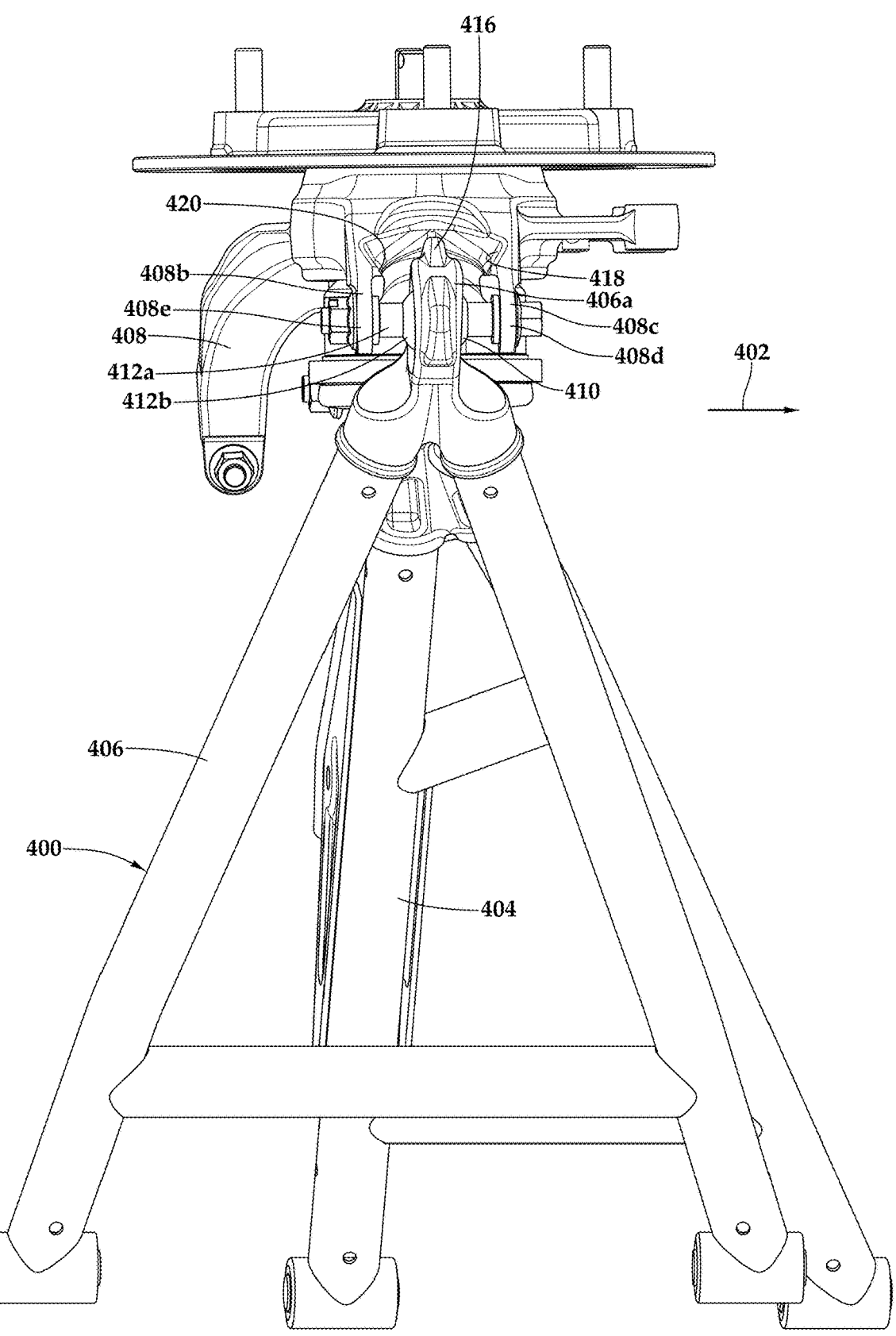

Referring to FIGS. 14A-14B in the drawings, alternative embodiments for limiting the pivoting range of motion of the knuckles of a front suspension system 400 in the dropout position are illustrated. FIG. 14A is a side view of the right side of front suspension system 400 with the forward direction of the off-road vehicle indicated by forward arrow 402. FIG. 14B is a bottom view of the right side of front suspension system 400 with the forward direction of the off-road vehicle indicated by forward arrow 402. The right side of front suspension system 400 is substantially similar to the left side of front suspension system 400 therefore, for sake of efficiency, certain features will be disclosed only with regard to the right side of front suspension system 400. One having ordinary skill in the art, however, will fully appreciate an understanding of the left side of front suspension system 400 based upon the disclosure herein of the right side of front suspension system 400. Right upper and lower control arms 404, 406 have outboard ends coupled to right knuckle 408. Knuckle 408 includes upper control arm connector arm 408a and lower control arm connector arm 408b to which the outboard ends of upper and lower control arms 404, 406 are rotatably coupled via an upper spherical joint (not shown) and lower spherical joint 410, respectively. The inboard ends of control arms 404, 406 are pivotally coupled to the forward frame assembly of the off-road vehicle such as forward frame assembly 202 in FIGS. 6A-6D. Lower control arm connector arm 408b defines clevis 408c having leading and trailing prongs 408d, 408e. Bolt 412a has a leading end coupled to leading prong 408d of clevis 408c and a trailing end coupled to trailing prong 408e of clevis 408c to secure ball swivel 412b. The outboard-most end of lower control arm 406 includes annular casing 406a, which receives ball swivel 412b to form spherical joint 410. Thus, spherical joint 410 is interposed between leading and trailing prongs 408d, 408e of clevis 408c. Annular casing 406a is substantially aligned along a bisecting centerline 414 of lower control arm 406. Front suspension system 400 is moveable between a plurality of vertical positions including a compressed position in which the front shock absorbers are compressed and a dropout position in which the front shock absorbers are fully extended. FIGS. 14A-14B show the right side of front suspension system 400 in the dropout position.

Figure 15B:
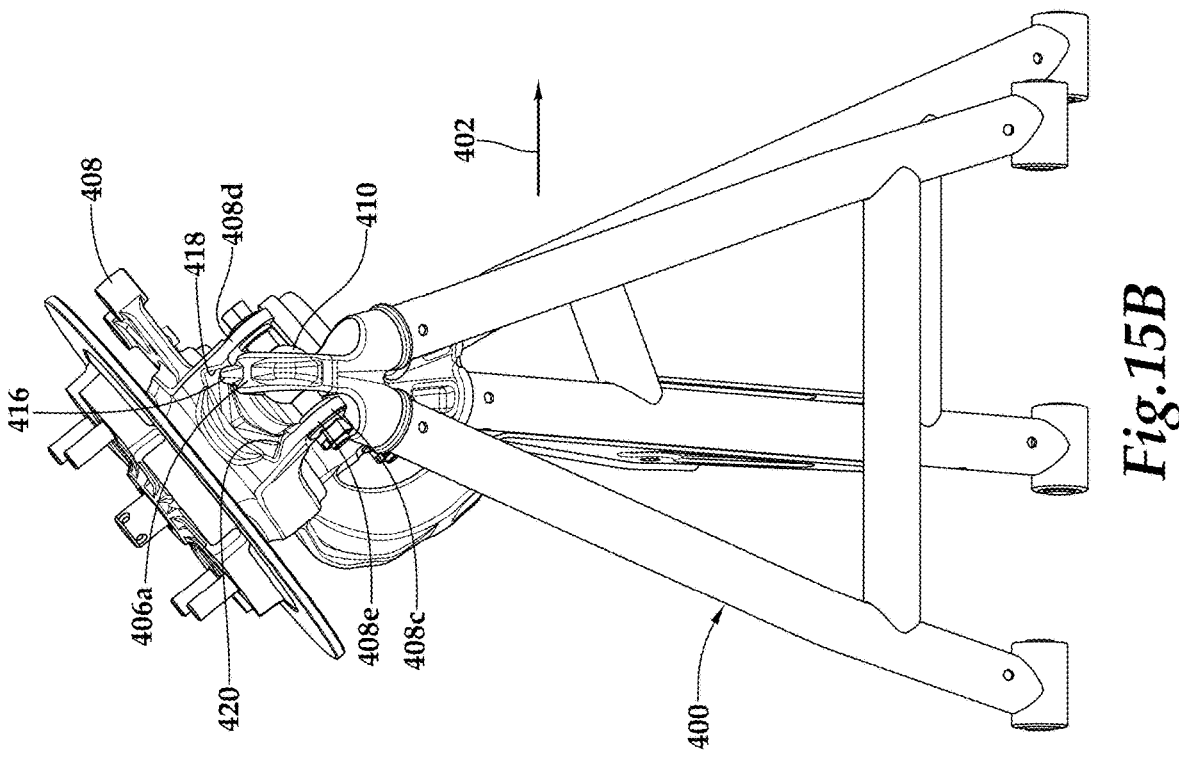
FIGS. 15A-15D are various views of a front suspension system for an off-road vehicle engaging a steering fin and steering stops in left and right turning positions in accordance with embodiments of the present disclosure.
Figure 15A:
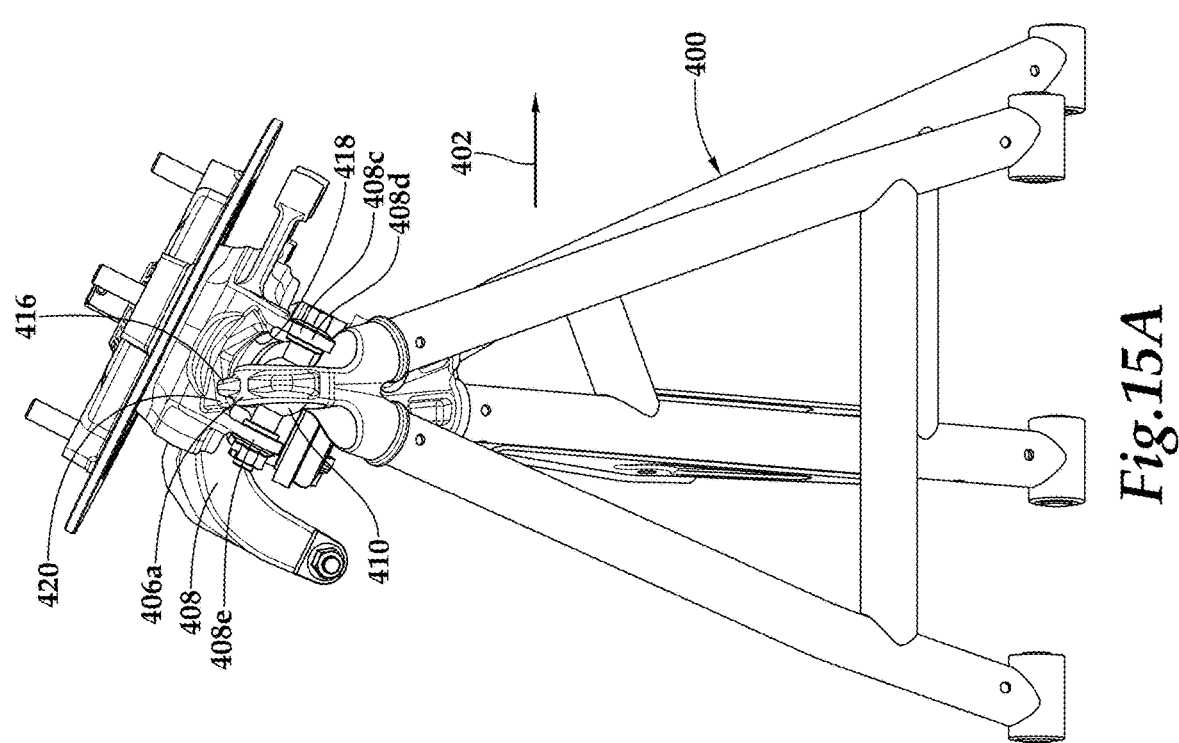
Figure 15C:
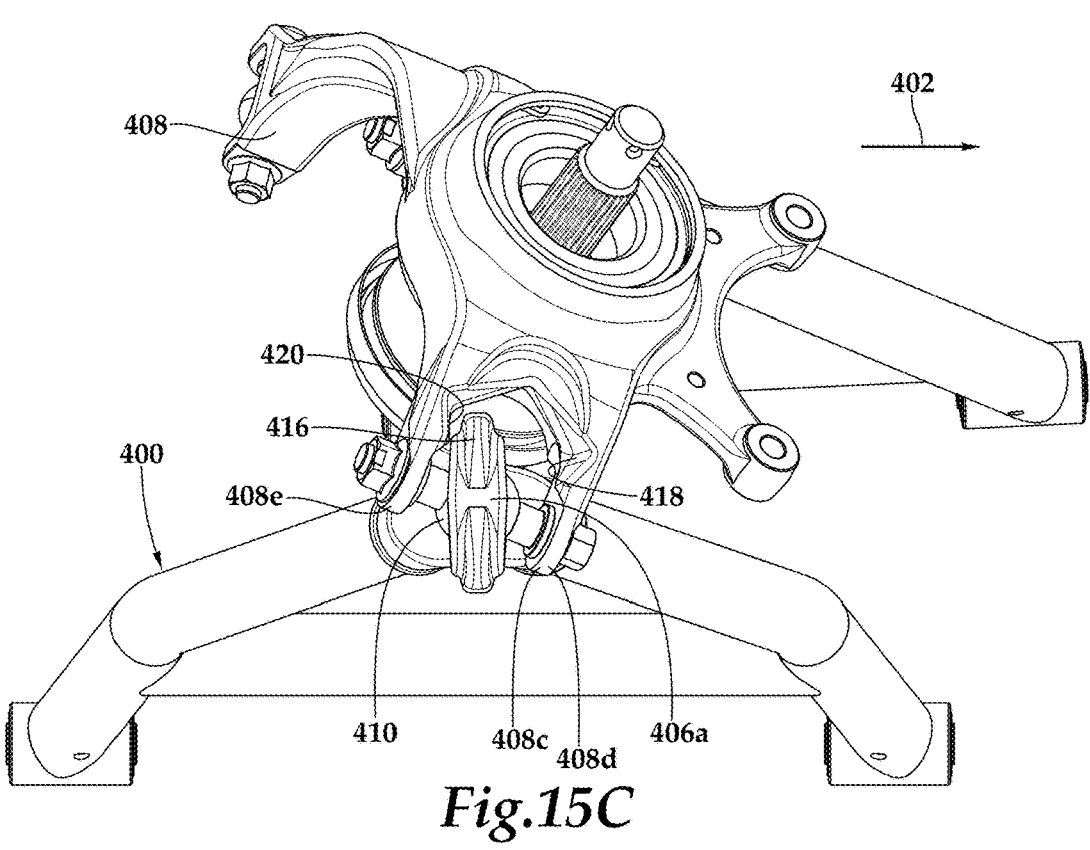
Figure 15D:
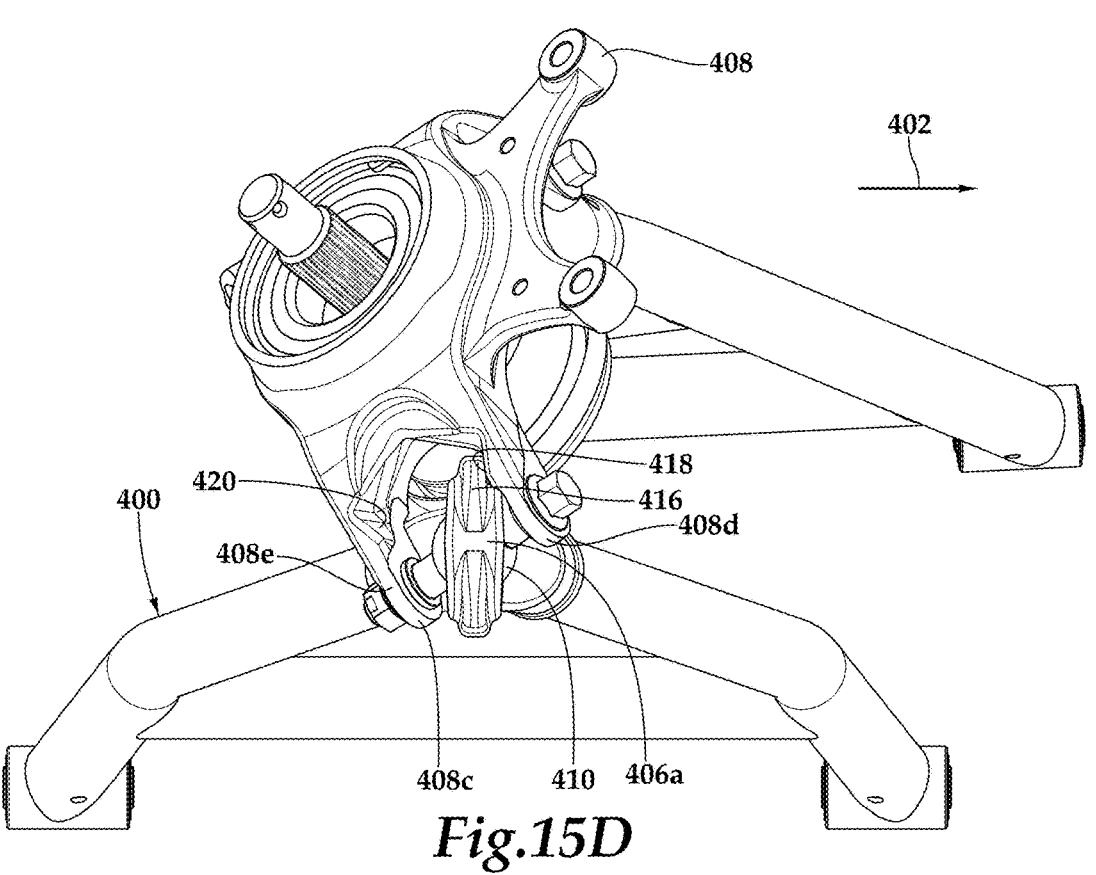

Referring additionally to FIGS. 15A-15D in the drawings, knuckle 408 is shown to have a pivoting range of motion between a plurality of positions in the dropout position of front suspension system 400 including the forward position shown in FIGS. 15A and 15C and the aft position shown in FIGS. 15B and 15D. FIGS. 15A-15B are bottom views of the right side of front suspension system 400 and FIGS. 15C-15D are side views of the right side of front suspension system 400, with the forward direction of the off-road vehicle indicated by forward arrow 402 for ease of reference. The forward position of knuckle 408 corresponds to a left turn position of the off-road vehicle and the aft position of knuckle 408 corresponds to a right turn position of the off-road vehicle. In some cases, knuckle 408 may naturally pivot as front suspension system 400 moves vertically from the compressed position to the dropout position.

To limit articulation of the upper spherical joint and lower spherical joint 410 in the dropout position of front suspension system 400, the upper outboard side of annular casing 406a includes a steering fin 416 and the inner sides of leading and trailing prongs 408d, 408e of clevis 408c define angled leading and trailing steering stops 418, 420. Steering fin 416 is positioned outboard of spherical joint 410. Steering fin 416 engages with leading and trailing steering stops 418, 420 to limit the pivoting range of motion of knuckle 408 in the dropout position of front suspension system 400. As best seen in FIGS. 15A and 15C, steering fin 416 contacts trailing steering stop 420 on the inner surface of trailing prong 408e in the forward position of knuckle 408. As best seen in FIGS. 15B and 15D, steering fin 416 contacts leading steering stop 418 on the inner surface of leading prong 408d in the aft position of knuckle 408. Due to the pivot-limiting function of steering fin 416 and leading and trailing steering stops 418, 420, the forward and aft positions of knuckle 408 shown in FIGS. 15A-15D are the forwardmost and aftmost positions of knuckle 408 in the dropout position of front suspension system 400. In some embodiments, steering fin 416 and/or leading and trailing steering stops 418, 420 may include an elastomeric outer coating such as rubber, plastic or other elastomer to protect leading and trailing prongs 408d, 408e from damage.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A steering and suspension system for an off-road vehicle, the steering and suspension system comprising:
   a steering rack assembly;
   a tie rod having inboard and outboard ends, the inboard end of the tie rod coupled to the steering rack assembly;
   a knuckle having a top side defining an upper control arm connector arm having a distal end forming an upper control arm clevis with leading and trailing prongs and an aft side defining a tie rod connector arm having a distal end forming a tie rod clevis with top and bottom prongs, the outboard end of the tie rod coupled between the top and bottom prongs, the knuckle having a support webbing extending aftward from the trailing prong of the upper control arm clevis to the tie rod connector arm outboard of the tie rod clevis; and
   an upper control arm having an outboard end coupled between the leading and trailing prongs;

wherein, the distal end of the tie rod connector arm is positioned such that the tie rod has a substantially same elevation as the upper control arm.

2. The steering and suspension system as recited in claim 1 wherein, the knuckle has a bottom side defining a lower control arm connector arm, the tie rod connector arm positioned closer to the upper control arm connector arm than the lower control arm connector arm.

3. The steering and suspension system as recited in claim 1 wherein, the support webbing is configured to provide structural support to the tie rod connector arm.

4. The steering and suspension system as recited in claim 1 wherein, the distal end of the tie rod connector arm is positioned such that the tie rod is substantially parallel with the upper control arm.

5. The steering and suspension system as recited in claim 1 wherein, the distal end of the tie rod connector arm is positioned such that the inboard end of the tie rod has a higher elevation than the outboard end of the tie rod forming a first slope;

wherein, an inboard end of the upper control arm has a higher elevation than the outboard end of the upper control arm forming a second slope; and wherein, the first slope is substantially equal to the second slope.

6. The steering and suspension system as recited in claim 1 wherein, the tie rod connector arm comprises a proximal segment protruding in an upward and aft direction and a distal segment protruding in an inboard direction.

7. The steering and suspension system as recited in claim 6 wherein, the tie rod connector arm further comprises an intermediate twisting segment between the proximal and distal segments of the tie rod connector arm.

8. The steering and suspension system as recited in claim 1 further comprising a bolt having a top end coupled to the top prong of the tie rod clevis and a bottom end coupled to the bottom prong of the tie rod clevis.

9. The steering and suspension system as recited in claim 8 wherein, the outboard end of the tie rod is coupled between the top and bottom prongs via a spherical joint including a ball swivel and an annular casing, the ball swivel secured between the top and bottom prongs of the tie rod clevis by the bolt, the annular casing defined by the outboard end of the tie rod.

10. The steering and suspension system as recited in claim 1 wherein, the tie rod clevis has a substantially same elevation as the upper control arm clevis.

11. The steering and suspension system as recited in claim 1 wherein, the upper control arm comprises an A-arm.

12. An off-road vehicle comprising:

a frame assembly including a front frame assembly; and a steering and suspension system supported by the front frame assembly, the steering and suspension system comprising:

a steering rack assembly;

a tie rod having inboard and outboard ends, the inboard end of the tie rod coupled to the steering rack assembly;

a knuckle having a top side defining an upper control arm connector arm having a distal end forming an upper control arm clevis with leading and trailing prongs and an aft side defining a tie rod connector arm having a distal end forming a tie rod clevis with top and bottom prongs, the outboard end of the tie rod coupled between the top and bottom prongs, the knuckle having a support webbing extending aftward from the trailing prong of the upper control arm clevis to the tie rod connector arm outboard of the tie rod clevis; and an upper control arm having an outboard end coupled between the leading and trailing prongs;

wherein, the distal end of the tie rod connector arm is positioned such that the tie rod has a substantially same elevation as the upper control arm.

13. The off-road vehicle as recited in claim 12 wherein, the knuckle comprises a center annulus defining a center hub aperture, the distal end of the tie rod connector arm positioned aft and inboard of the center annulus.

14. The off-road vehicle as recited in claim 13 wherein, the distal end of the tie rod connector arm has a higher elevation than the center annulus.

15. The off-road vehicle as recited in claim 13 wherein, the tie rod connector arm protrudes from an upper aft diagonal corner of the center annulus.

16. The off-road vehicle as recited in claim 13 wherein, the tie rod connector arm protrudes from an aft surface of the center annulus;

wherein, the top and bottom prongs point in an inboard direction; and wherein, the tie rod connector arm has a curved profile twisting substantially ninety degrees from the aft surface of the center annulus to the inboard direction of the top and bottom prongs.

17. The off-road vehicle as recited in claim 13 further comprising a half shaft having inboard and outboard ends, the center hub aperture receiving the outboard end of the half shaft.

18. The off-road vehicle as recited in claim 17 wherein, the distal end of the tie rod connector arm is positioned such that the inboard end of the tie rod has a higher elevation than the outboard end of the tie rod forming a first slope;

wherein, the inboard end of the half shaft has a higher elevation than the outboard end of the half shaft forming a second slope; and wherein, the first slope is substantially equal to the second slope.

19. The off-road vehicle as recited in claim 17 wherein, the distal end of the tie rod connector arm has a higher elevation than the outboard end of the half shaft.

20. The off-road vehicle as recited in claim 12 wherein, the tie rod connector arm comprises a proximal segment protruding in an upward and aft direction, a distal segment protruding in an inboard direction and an intermediate twisting segment between the proximal and distal segments of the tie rod connector arm.

* * * * *